(12) United States Patent
Frankovich

(10) Patent No.: US 8,545,068 B2
(45) Date of Patent: Oct. 1, 2013

(54) BICYCLE LIGHTING SYSTEMS AND METHODS

(71) Applicant: John Kent Frankovich, San Francisco, CA (US)

(72) Inventor: John Kent Frankovich, San Francisco, CA (US)

(73) Assignee: Revolights, Inc., Emeryville, CA (US)

( * ) Notice: Subject to any disclaimer, the term of this patent is extended or adjusted under 35 U.S.C. 154(b) by 0 days.

(21) Appl. No.: 13/718,751

(22) Filed: Dec. 18, 2012

(65) Prior Publication Data

US 2013/0107554 A1    May 2, 2013

Related U.S. Application Data

(63) Continuation of application No. 13/342,894, filed on Jan. 3, 2012, now Pat. No. 8,337,060.

(60) Provisional application No. 61/559,055, filed on Nov. 12, 2011, provisional application No. 61/508,184, filed on Jul. 15, 2011.

(51) Int. Cl.
*B62J 6/00* (2006.01)
*B60Q 1/11* (2006.01)

(52) U.S. Cl.
USPC ........... 362/473; 362/192; 362/459; 362/464; 362/500; 340/426.33; 340/432; 340/444; 340/459; 340/815.45; 315/76; 315/77; 315/80

(58) Field of Classification Search
USPC .................. 315/76, 77, 80; 340/426.33, 432, 340/444, 459, 815.45; 362/192, 459, 464, 362/473, 500
See application file for complete search history.

(56) References Cited

U.S. PATENT DOCUMENTS

| | | | |
|---|---|---|---|
| 2,788,763 | A | 4/1957 | Ries |
| 3,764,976 | A | 10/1973 | Mac |
| 3,897,409 | A | 7/1975 | Huper et al. |
| 3,972,302 | A | 8/1976 | Sherman |
| 3,982,771 | A | 9/1976 | Tropeano |
| 3,987,409 | A | 10/1976 | Freeman |
| 4,049,959 | A | 9/1977 | Ledterman |

(Continued)

FOREIGN PATENT DOCUMENTS

| | | |
|---|---|---|
| GB | 2345529 A | 7/2000 |
| GB | 2382211 A | 5/2003 |

(Continued)

OTHER PUBLICATIONS

Mini Monkey Light—8 Bit Bike Light by MonkeyLectric, http://www.kickstarter.com, Oct. 29, 2011.*

(Continued)

*Primary Examiner* — Douglas W Owens
*Assistant Examiner* — Thai Pham
(74) *Attorney, Agent, or Firm* — Jeffrey Schox; Diana Lin

(57) ABSTRACT

Systems and methods for providing adequate lighting and sighting for a bicycle are disclosed. A lighting system that includes an illumination ring configured to be coupled to a wheel is also disclosed. The illumination ring is configured to simultaneously project light forward and to the side of a front wheel and to project light rearward of and to the side of a rear wheel. The illumination ring may be mounted to or integrated with the bicycle wheel. Methods of controlling light sources on the illumination ring are also disclosed.

20 Claims, 52 Drawing Sheets

(56) References Cited

U.S. PATENT DOCUMENTS

| | | |
|---|---|---|
| 4,088,882 A | 5/1978 | Lewis |
| 4,135,229 A | 1/1979 | Modurkay |
| 4,204,191 A | 5/1980 | Daniels |
| 4,225,848 A | 9/1980 | Roberts |
| 4,321,883 A | 3/1982 | Ruppa |
| 4,483,586 A | 11/1984 | Sisto |
| 4,575,189 A | 3/1986 | Johnson |
| 4,586,454 A | 5/1986 | Hedquist et al. |
| 4,763,230 A | 8/1988 | Cummings et al. |
| 4,787,014 A | 11/1988 | Wodder et al. |
| 4,860,177 A | 8/1989 | Simms |
| 4,875,142 A | 10/1989 | Spector |
| 5,121,305 A | 6/1992 | Deed et al. |
| 5,283,547 A | 2/1994 | Leon |
| 5,584,562 A | 12/1996 | Geran |
| 5,652,677 A | 7/1997 | Burison |
| 5,800,039 A | 9/1998 | Lee |
| 5,903,224 A | 5/1999 | Reynolds |
| 6,072,386 A | 6/2000 | Yu |
| 6,170,968 B1 | 1/2001 | Caswell |
| 6,227,688 B1 | 5/2001 | Taylor et al. |
| 6,241,371 B1 | 6/2001 | Dai |
| 6,247,548 B1 | 6/2001 | Hayashi et al. |
| 6,265,984 B1 | 7/2001 | Molinaroli |
| 6,286,982 B1 | 9/2001 | Tashiro |
| 6,359,551 B1 | 3/2002 | Suda |
| 6,492,963 B1 | 12/2002 | Hoch |
| 6,501,199 B2 | 12/2002 | Hung |
| 6,565,242 B2 | 5/2003 | Dai |
| 6,598,894 B1 | 7/2003 | Fujii et al. |
| 6,805,473 B2 | 10/2004 | Beard |
| 6,822,357 B2 | 11/2004 | Hung |
| 6,824,284 B2 | 11/2004 | Chinniah et al. |
| 7,021,800 B2 | 4/2006 | Roberts |
| 7,046,131 B2 | 5/2006 | Todorox |
| 7,063,391 B2 | 6/2006 | Peng |
| 7,096,046 B2 | 8/2006 | Shapiro et al. |
| 7,417,555 B2 | 8/2008 | Chivarov et al. |
| 7,438,454 B2 | 10/2008 | Chinniah et al. |
| 7,477,208 B2 | 1/2009 | Matlock et al. |
| 7,488,100 B2 | 2/2009 | Roberts |
| 2002/0163817 A1 | 11/2002 | Bukowsky |
| 2003/0112632 A1 | 6/2003 | Forsythe et al. |
| 2003/0169594 A1 | 9/2003 | Khan |
| 2004/0114383 A1 | 6/2004 | Beard |
| 2005/0047155 A1 | 3/2005 | Samuel |
| 2006/0158890 A1 | 7/2006 | Freedman |
| 2007/0014119 A1 | 1/2007 | Burkett |
| 2007/0035956 A1 | 2/2007 | Topps |
| 2007/0063831 A1 | 3/2007 | Perkins et al. |
| 2007/0171664 A1 | 7/2007 | Shih et al. |
| 2007/0285934 A1 | 12/2007 | Carillo |
| 2008/0023934 A1 | 1/2008 | Van Houweling |
| 2008/0136660 A1 | 6/2008 | Bailey |
| 2008/0219014 A1 | 9/2008 | Loibl |
| 2009/0082914 A1 | 3/2009 | Yuan |

FOREIGN PATENT DOCUMENTS

| | | |
|---|---|---|
| GB | 2409440 A | 6/2005 |
| WO | 0133700 A1 | 5/2001 |
| WO | 2008071198 A | 6/2008 |

OTHER PUBLICATIONS

MonkeyLectric "Mini Monkey Light—8-Bit Bike Light" kickstarter.com, Oct. 29, 2011.

* cited by examiner

Section A-A

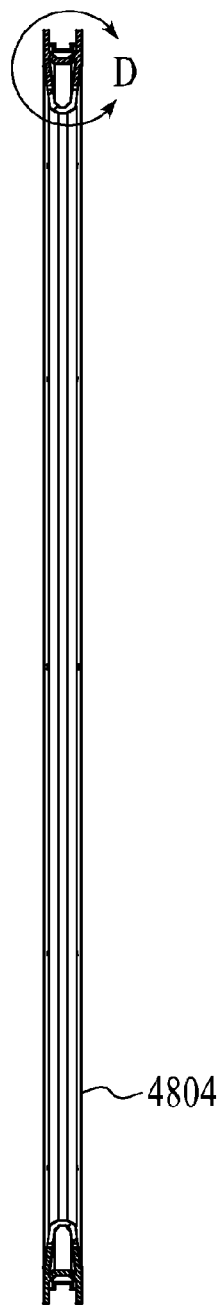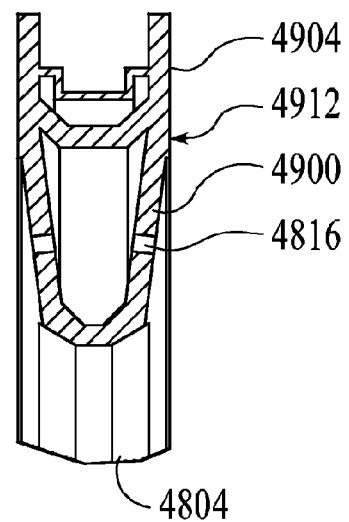
Section C-C
FIG. 49A
Detail D
FIG. 49B

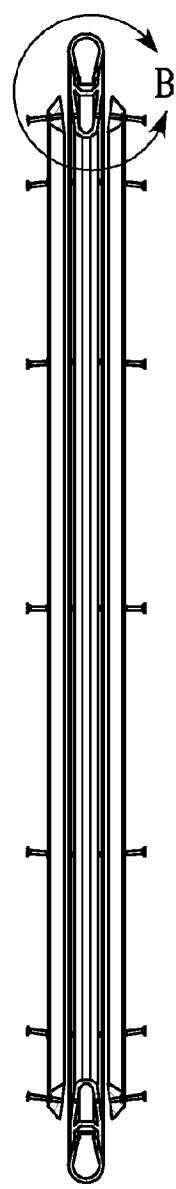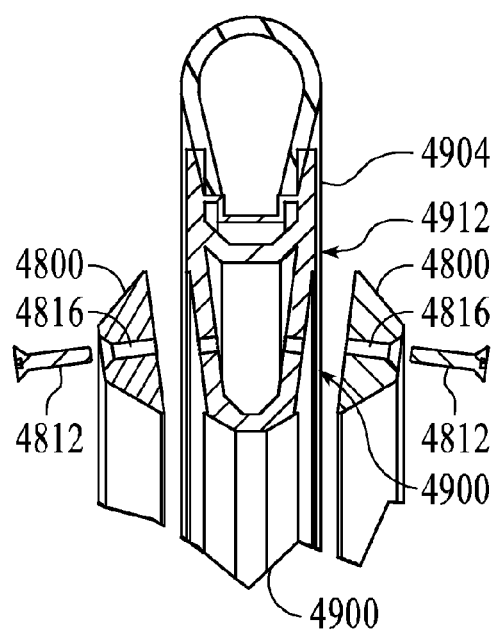
Section A-A
FIG. 50A
Detail B
FIG. 50B

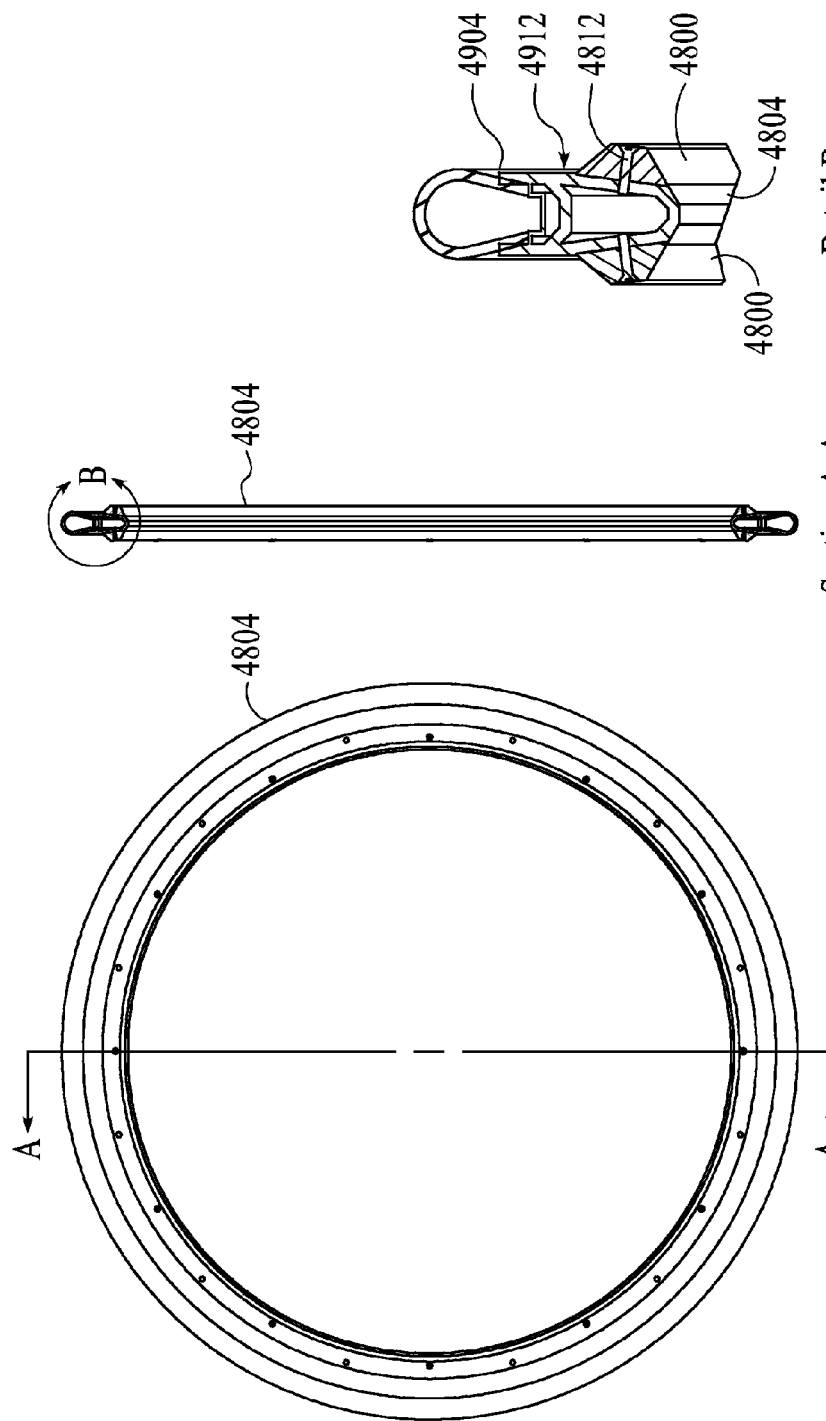

BICYCLE LIGHTING SYSTEMS AND METHODS

PRIORITY

The present application claims priority to U.S. Provisional Application No. 61/508,184, filed Jul. 15, 2011, and entitled "Intelligent Bicycle Wheel Mounted Lighting System Capable of Forward Path Illumination While Maintaining 360 Degree Visibility," and U.S. Provisional Application No. 61/559,055, filed Nov. 12, 2011, and entitled "Novel Clips for Attaching Illumination Ring to a Bicycle Wheel," the entireties of which are hereby incorporated by reference.

BACKGROUND

1. Field

This invention relates to bicycle lighting systems and methods and, more particularly, to an illumination ring couplable to a bicycle wheel, systems for coupling the illumination ring to the bicycle wheel and methods of providing illumination on a bicycle.

2. Related Art

The two most frequent causes for the 52,000 reported bicycle accidents in 2008 were collisions with motor vehicles (58%) and individual falls (30%). Of the 716 reported fatalities, 69% occurred in urban areas and 39% were between the hours of 5 p.m. and midnight. Nearly 70% of all nighttime bicycle-car collisions are due to inadequate side visibility.

Bicycle lights are used by many bicycle riders to improve their safety and/or visibility. Bicycle lights contribute to rider safety in two ways: lighting and sighting. Lighting allows riders to safely navigate at night by illuminating their forward path. Sighting increases the rider's visibility, which signals their presence and location to those sharing the road.

Currently, no bicycle light provides both sufficient lighting and sighting. Most bicycle lights are positioned on the bicycle handlebars and provide light on the ground in front of the bicycle. These lights, however, project light from the handlebars to a particular spot on the ground or directly in front of the rider and do not provide adequate lighting or sighting because they only project light in one direction and only illuminate a limited spot in front of the rider. Reflective bicycle lights are also sometimes positioned on the back of the bicycle so that others can see the rider from behind; these lights, similarly, only project light in one direction. Furthermore, neither the handlebar lights or reflective back lights provide side lighting (i.e., inadequate sighting from the side of the bicycle). Thus, there is a need for improved bicycle lighting systems.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to an aspect of the invention, a lighting system is provided that includes an illumination ring configured to be coupled to a wheel, the illumination ring to simultaneously project light forward and to the side of the wheel. According to another aspect of the invention, a lighting system is provided that includes an illumination ring configured to be coupled to a wheel, the illumination ring to simultaneously project light backward and to the side of the wheel.

The illumination ring may include a plurality of lights. The lights may be light emitting diodes. The lights may be electroluminescent lights. The lights may be equally spaced along a circumference of the ring.

The wheel may be a bicycle wheel. The diameter of the ring may be similar to the diameter of the wheel. The ring may be integrated with a rim of the wheel.

The lighting system may further include a plurality of mounts to mount the ring to the wheel. The plurality of mounts may each comprise a first portion securable to a spoke of the wheel and a second portion to securable to the illumination ring.

The ring may be mounted to the wheel so that a plane through the circumference of the ring is offset relative to a plane through the circumference of the wheel.

The lighting system may further include a controller. The controller may be coupled to the illumination ring to control the light projected by the illumination ring. The controller may be coupled to the bicycle wheel to control the light projected by the illumination ring.

The lighting system may further include an index sensor to sense a rotation of the wheel, and the controller may receive data from the index sensor and calculate a period of rotation or determines a reference position of the wheel. The index sensor may be a hall effect sensor coupled to the illumination ring and a magnet coupled to a fixed frame coupled to the wheel. The lighting may further include an accelerometer, and the controller may receive data from the accelerometer to determine a velocity of the wheel. The controller may determine whether to turn lights of the illumination ring on or off based on the reference position of the wheel and the velocity.

The lighting system may further include an accelerometer, and the controller may receive data from the accelerometer to determine a velocity of the wheel and determines whether to turn lights of the illumination ring on or off based on a reference position of the wheel and the velocity. The lighting system may further include an accelerometer that estimates a reference position from gravity, and the controller may receive data from the accelerometer to determine a velocity of the wheel and the reference position and determines whether to turn lights of the illumination ring on or off based on the reference position of the wheel and the velocity.

In some embodiments, at most half of the plurality of lights may be on during rotation of the wheel. In some embodiments, at most a sixty degree arc of lights of the plurality of lights on the illumination ring may be on during rotation of the wheel. The illumination ring may include twelve lights, and at most five adjacent lights may be on during rotation of the wheel. A portion of the plurality of lights may be on at full power and the other lights of the plurality of lights may be on at a power that is less than full power during rotation of the wheel.

The wheel may be a bicycle wheel, and the illumination ring may be mounted to the bicycle wheel between the bicycle wheel and a fork of the bicycle frame.

The illumination ring may be a rolled aluminum sheet metal ring.

According to a further aspect of the invention, a lighting system is provided that includes a ring configured to be coupled to a wheel; and a plurality of lights positioned on the ring to provide a continuous arc of light to illuminate light at least radially in front of the wheel.

The ring may be integrated with the rim of the wheel. The diameter of the ring may be similar to the diameter of the wheel. The wheel may be a bicycle wheel.

The plurality of lights may provide the continuous arc of light by illuminating at least two neighboring lights of the plurality of lights at any given time. The lights may be light emitting diodes. The lights may be electroluminescent lights. The lights may be equally spaced along a circumference of the ring.

The lighting system may further include a controller mounted to the ring and coupled to the plurality of lights to control a state of each of the plurality of lights. The lighting system may further include an index sensor to sense a rotation of the wheel, and the controller may receive data from the index sensor and calculate a period of rotation or determine a reference position of the wheel. The index sensor may be a hall effect sensor coupled to the illumination ring and a magnet coupled to a fixed frame coupled to the wheel.

The lighting system may further include an accelerometer, and the controller may receive data from the accelerometer to determine a velocity of the wheel. The controller may determine whether to turn each of the plurality of lights on or off based on the reference position of the wheel and the velocity. The lighting may further include an accelerometer, and the controller may receive data from the accelerometer to determine a velocity of the wheel and determine whether to turn each of the plurality of lights on or off based on the reference position of the wheel and the velocity.

In some embodiments, at most half of the plurality of lights may be on during rotation of the wheel. In some embodiments, at most a sixty degree arc of lights of the plurality of lights may be on during rotation of the wheel. The plurality of lights may be twelve lights, and at most five adjacent lights may be on during rotation of the wheel. A portion of the plurality of lights may be on at full power and the other lights of the plurality of lights may be on at a power that is less than full power during rotation of the wheel.

The wheel may be a bicycle wheel, and the illumination ring may be mounted to the bicycle wheel between the bicycle wheel and a fork of the bicycle frame.

The illumination ring may be a rolled aluminum sheet metal ring.

The lighting system may further include a plurality of mounts to mount the ring to the wheel. The plurality of mounts may each include a first portion securable to a spoke of the wheel and a second portion to securable to the ring. The ring may be mounted to the wheel so that a plane through the circumference of the ring is offset relative to a plane through the circumference of the wheel. The plurality of lights may be mounted to the ring.

According to a further embodiment of the invention, a lighting system for a wheel is provided that includes a plurality of lights positioned on the wheel and configured to project a continuous arc of light when the wheel is moving.

The plurality of lights may be mounted in a rim of the wheel. The plurality of lights may be coupled to a support, and the support may be mounted to the wheel.

The lighting system may further include a controller coupled to the plurality of lights to control the projection of light from each of the plurality of lights so that a continuous arc of light is projected when the wheel is moving.

The wheel may have a circumference, and the lights may be positioned near the circumference of the wheel or at the circumference of the wheel.

The wheel may have a rim, a hub, and a plurality of spokes connecting the hub and the rim, and the plurality of lights may be positioned on the plurality of spokes, and a power source may be coupled to the plurality of lights and positioned in the hub.

The lighting may further include a power source on the illumination ring. The power source may include a plurality of induction coils. The wheel may be a bicycle wheel coupled to a frame, and a magnet may be coupled to the frame.

According to another aspect of the invention, a lighting system is provided for a wheel, the wheel comprising a tire, the tire comprising a tube having a cross-sectional radius, the lighting system including a plurality of lights positioned on the wheel so that the plurality of lights are offset by a distance from a plane through the circumference of the wheel, the distance being at least equal to the cross-sectional radius. The distance may be greater than the cross-sectional radius.

The lighting system may further include a support, the plurality of lights positioned on the support, and wherein the support is mounted to the wheel so that the plurality of lights are offset relative to a plane through the circumference of the wheel. The lighting may further include a ring, the plurality of lights may be positioned on the ring, and the ring may be mounted to the wheel so that a plane through a circumference of the ring is offset relative to a plane through the circumference of the wheel.

The wheel may have a rim, and the plurality of lights may be mounted in the rim. The plurality of lights may be integrated with the rim. The wheel may have a plurality of spokes, and each of the plurality of lights may be mounted to one of the plurality of spokes. The wheel may have a rim, a hub, and a plurality of spokes connecting the hub and the rim, the plurality of lights may be positioned on the plurality of spokes, and a power source may be coupled to the plurality of lights and positioned in the hub.

The lighting system may further include a power source on the illumination ring. The power source may include a plurality of induction coils. The wheel may be a bicycle wheel coupled to a frame, and the lighting system may further include a magnet coupled to the frame.

According to yet another aspect of the invention, a method of projecting light from a lighting system is provided, the lighting system including a plurality of lights and being coupled to a wheel. The method includes sensing a reference position of the wheel; determining a rotational period of the wheel; determining a light pattern for the lighting system; and controlling an on/off state of each of the plurality of lights based on at least the rotational period and the light pattern.

The method may further include switching the on/off state of at least one of the plurality of lights if time is greater than the rotational period divided by the number of the plurality of lights. The method may further include repeating the switching step. The method may further include sensing acceleration data of the wheel; and adjusting the rotational period based on the acceleration data. The method may further include sensing movement of the wheel before sensing a reference position of the wheel. The method may further include controlling an on/off state of each of the plurality of lights based on a stationary light pattern if wheel is not moving.

According to a still further aspect of the invention, a mounting system for securing a lighting system to a bicycle wheel is provided that includes a plurality of clips, each clip comprising a first portion securable to a spoke of the bicycle wheel and a second portion to support a ring comprising a plurality of lights.

The first portion may include an opening for receiving the spoke and a mechanical fastener for securing the spoke in the opening. The mechanical fastener may be a screw. The second portion may include a friction interface.

According to another aspect of the invention, a mounting system for securing a lighting system to a bicycle wheel is provided that includes a plurality of clips, each clip comprising a first portion securable to a rim of the bicycle wheel and a second portion to support a ring comprising a plurality of lights. The first portion may include an opening engageable with the rim and a mechanical fastener for securing the spoke in the opening. The mechanical fastener may be a screw. The second portion may include a friction interface.

According to another aspect of the invention, a lighting system is provided that includes a light source coupled to a wheel; and a plurality of induction coils coupled to the wheel and in communication with the light source, the plurality of induction coils to generate power electromagnetically. The light source may include a plurality of lights positioned on a ring, and the plurality of induction coils may be embedded in the ring. The light source may include a plurality of lights mounted to a ring, and the plurality of induction coils may be mounted to the ring, the ring mounted to the wheel. The wheel may have a rim, and the light source may include a plurality of lights, the plurality of lights may be coupled to the rim, and the plurality of induction coils may be embedded in the rim. The wheel may be a bicycle wheel coupled to a frame, and the lighting system may further include a magnet coupled to the frame.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 49A is a cross-sectional view of the bicycle lighting system according to one embodiment of the invention.

FIG. 49B is a detailed cross-sectional view of the bicycle lighting system according to one embodiment of the invention.

FIG. 50A is a cross-sectional view of the bicycle lighting system according to one embodiment of the invention.

FIG. 50B is a detailed cross-sectional end view of the bicycle lighting system according to one embodiment of the invention.

FIG. 51A is an end view of the bicycle rim according to one embodiment of the invention.

FIG. 51B is a cross-sectional end view of the bicycle rim according to one embodiment of the invention.

FIG. 51C is a detailed cross-sectional end view of the bicycle rim according to one embodiment of the invention.

DETAILED DESCRIPTION

Embodiments of the invention are directed to a bicycle lighting system and method that provides both adequate lighting and sighting. Embodiments of the invention provide cyclists with superior lighting by fully illuminating the path in front of them. By moving the light source closer to the ground (i.e., by providing the light source one the wheels), embodiments of the invention enable cyclists to safely avoid potholes, debris, and other previously unseen dangers. The bicycle lighting system also functions to provide a swath of light in front of the bicycle, the light luminosity being of sufficient quantity (i.e. high enough) to illuminate the path in front of the rider. Furthermore, the bicycle lighting system provides a substantially visually continuous arc of light from the wheel. Unlike traditional bicycle lights, which project light in only one direction, embodiments of the invention cast 360 degrees of illumination (projecting light in front of the rider, to the back of the rider, and to the sides of the rider), making it much easier for others to sight the rider. The bicycle lighting systems and methods of the invention significantly improve rider safety.

Figure 1:
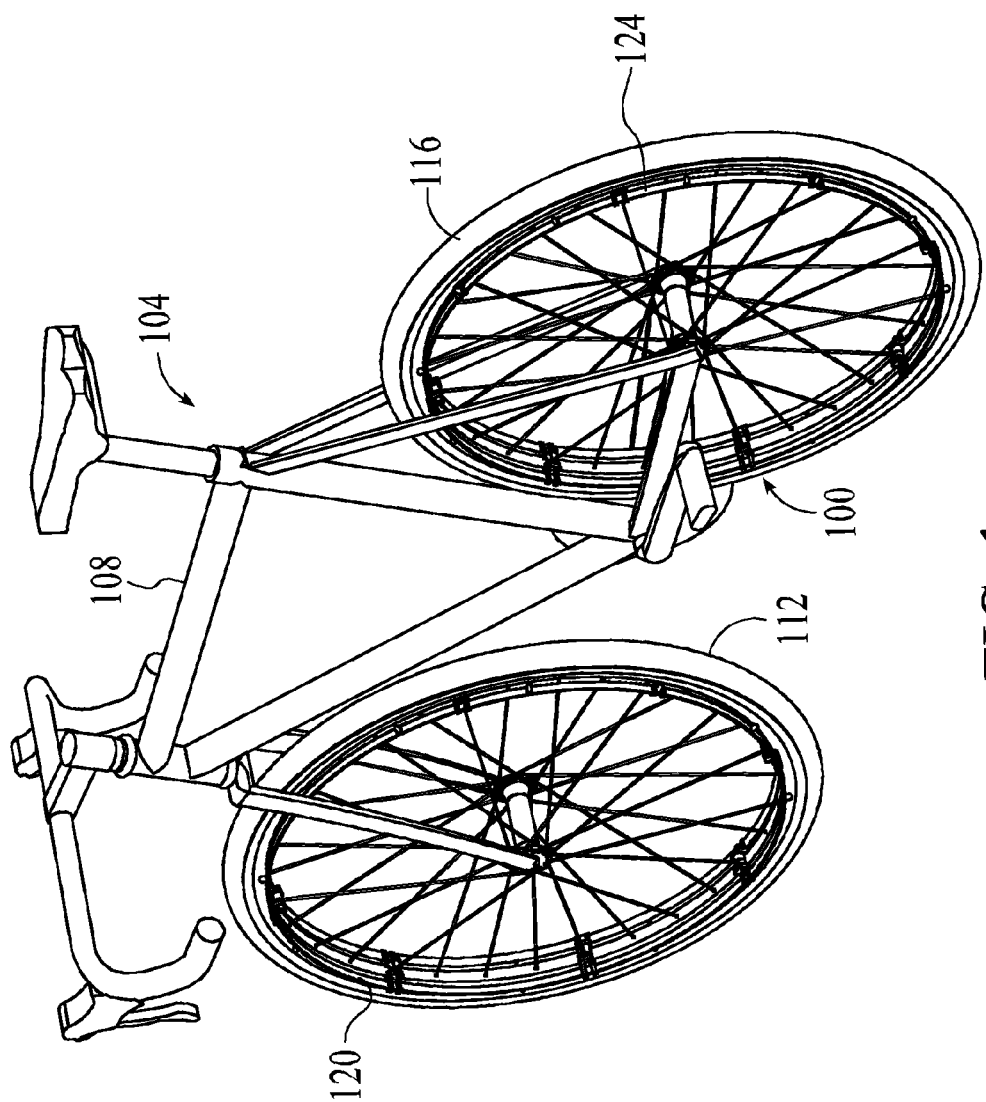
FIG. 1 is a rear perspective view of a bicycle with a lighting system according to one embodiment of the invention.
Figure 2:
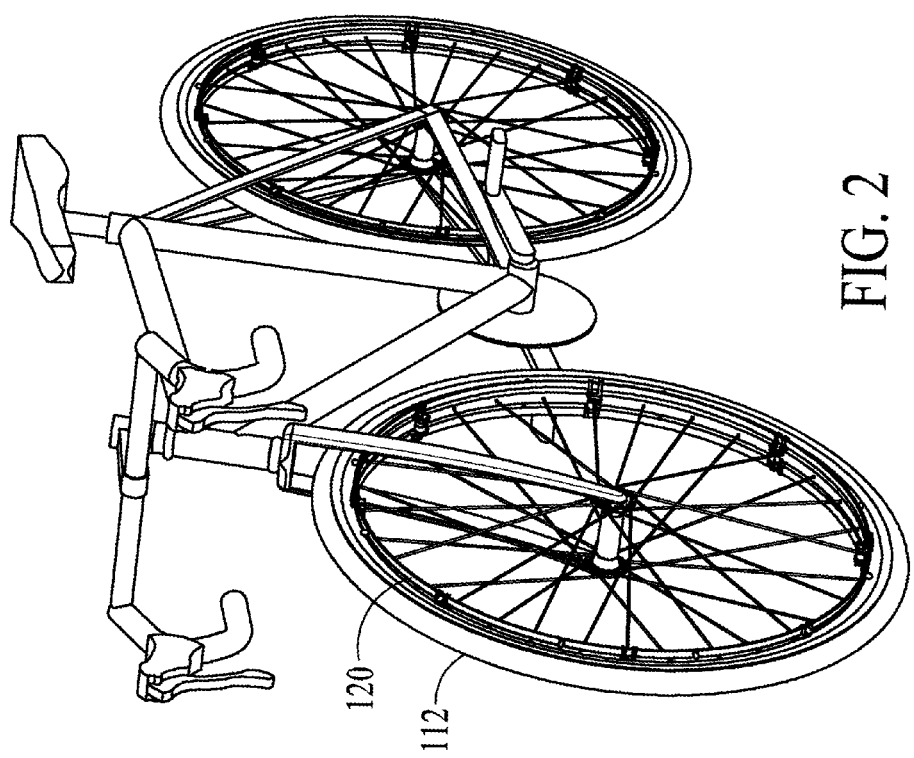
FIG. 2 is a side view of the bicycle with a lighting system according to one embodiment of the invention.

FIGS. 1 and 2 show one embodiment of a bicycle lighting system 100 of the invention. The bicycle lighting system 100 is coupled to a bicycle 104. The bicycle 104 includes a frame 108, a front wheel 112 and a rear wheel 116. The bicycle lighting system 100 includes a front lighting apparatus 120 and a rear lighting apparatus 124. The front lighting apparatus 120 is coupled to the front wheel 112 and the rear lighting apparatus 124 is coupled to the rear wheel 116.

Figure 3:
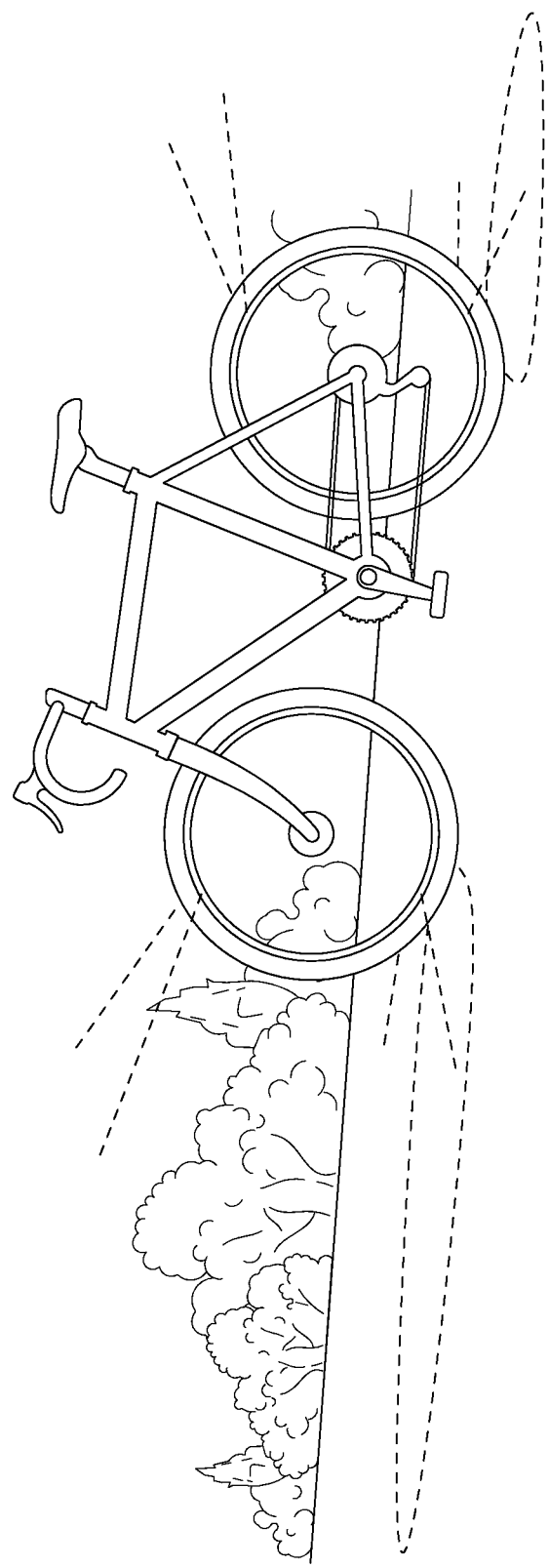
FIG. 3 is a side view of the bicycle with a lighting system according to one embodiment of the invention.

The lighting apparatuses 120, 124 shown in FIGS. 1 and 2 each include twelve lights. It will be appreciated that the lighting apparatuses 120, 124 may include any number of lights including fewer than twelve lights or more than twelve lights, and that the front lighting apparatus 120 and rear lighting apparatus 124 may have the same number of lights or a different number of lights. In one embodiment, the lights are light emitting diodes (LEDs). It will be appreciated that any suitable light source may be used, such as, for example, electroluminescent lights, and the like. In some embodiments, the lights are equally spaced along the circumference of the wheels 112, 116. The lights are positioned on the wheels 112, 116 so as to be able to project their light radially in front of and to the side of the front wheel 112 and project their light radially behind and to the side of the rear wheel 116. As shown in FIG. 3, in some embodiments, at any given moment, only the lights in the forward direction of the front wheel and only the lights in the rear direction of the rear wheel are illuminated. As will be described in further detail hereinafter, a controller coupled to the lighting apparatuses 120, 124 may time the blinking of each light so the lights are only in the "on" state when the lights are forward facing in the case of the front wheel 112 or rear facing in the case of the rear wheel 116.

FIG. 3 illustrates the bicycle lighting system 100, in operation. As shown in FIG. 3, the bicycle lighting system 100 is visible in front of the bicycle and behind the bicycle, with very little (or no light) blocked by the wheels (at least in an amount sufficient to illuminate the path in front of the bicycle). As shown in FIG. 3, the bicycle lighting system 100 is also visible from the side.

Although the lights are positioned so that they are equally spaced along the circumference of the wheels and are only in the "on" state when the lights are forward facing or rearward facing, the light from the lighting apparatus 120, 124 appears as a continuous arcs of light to an observer as shown in FIG. 3. In FIG. 3, the arcs of light of the lighting apparatuses 120, 124 are arcs that have an arc angle of about 120 degrees. It will be appreciated that the arc angle may be less than or greater than 120 degrees, and, may be any value or range of values between about 20 degrees and about 180 degrees.

The lighting system 100 is positioned on the wheel so that lights on the lighting system 100 are offset from the wheels 112, 116. By offsetting the lights from the wheels 112, 116, little or no light is blocked by the wheel itself, which improves both the front/rear radial and side light projection, and, therefore, improved visibility and illumination. In particular, the wheels 112, 116 include a tubular tire having a cross-sectional radius. The lights are positioned on the wheel so they are offset by a distance from a plane through the circumference of the wheel that is equal to or greater than the cross-sectional radius. In embodiments in which the lighting system includes illumination rings, the ring may be mounted to the wheel so that a plane through a circumference of the ring is offset by a distance from a plane through the circumference of the wheel.

Figure 4A:
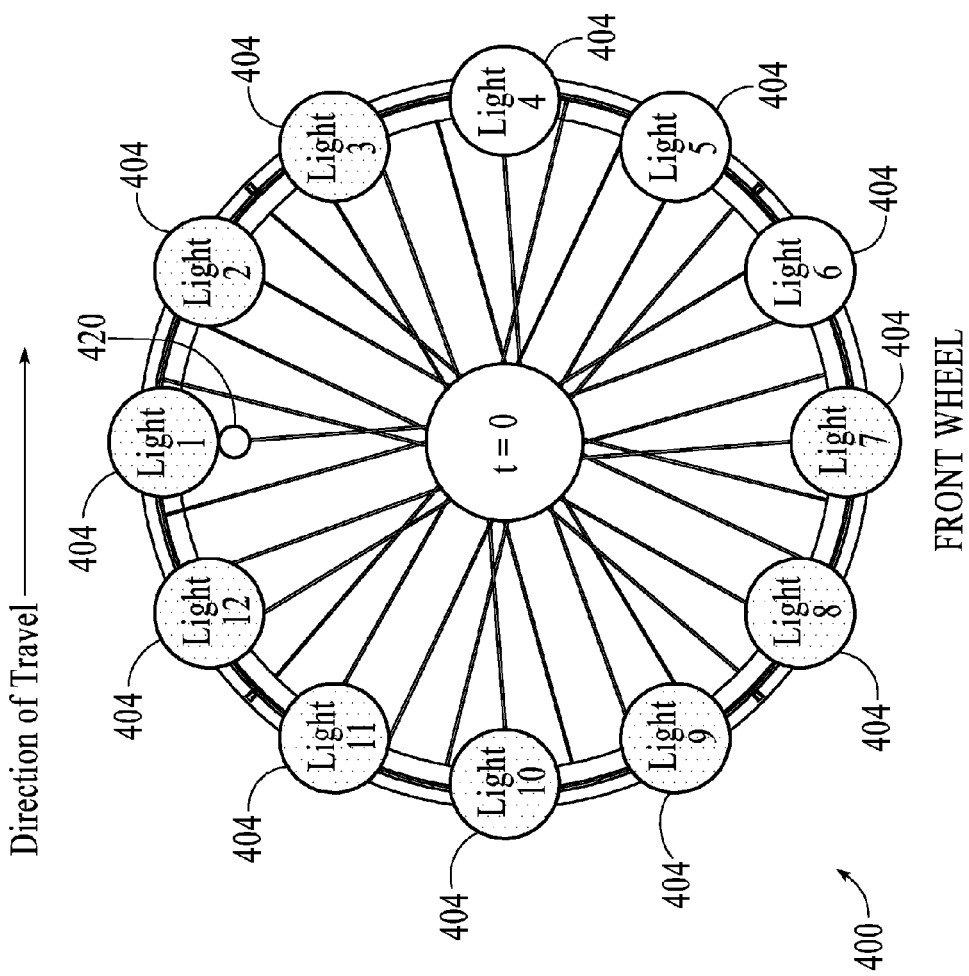
FIGS. 4A-4C are schematic drawings illustrating the lighting system according to one embodiment of the invention.
Figure 4B:
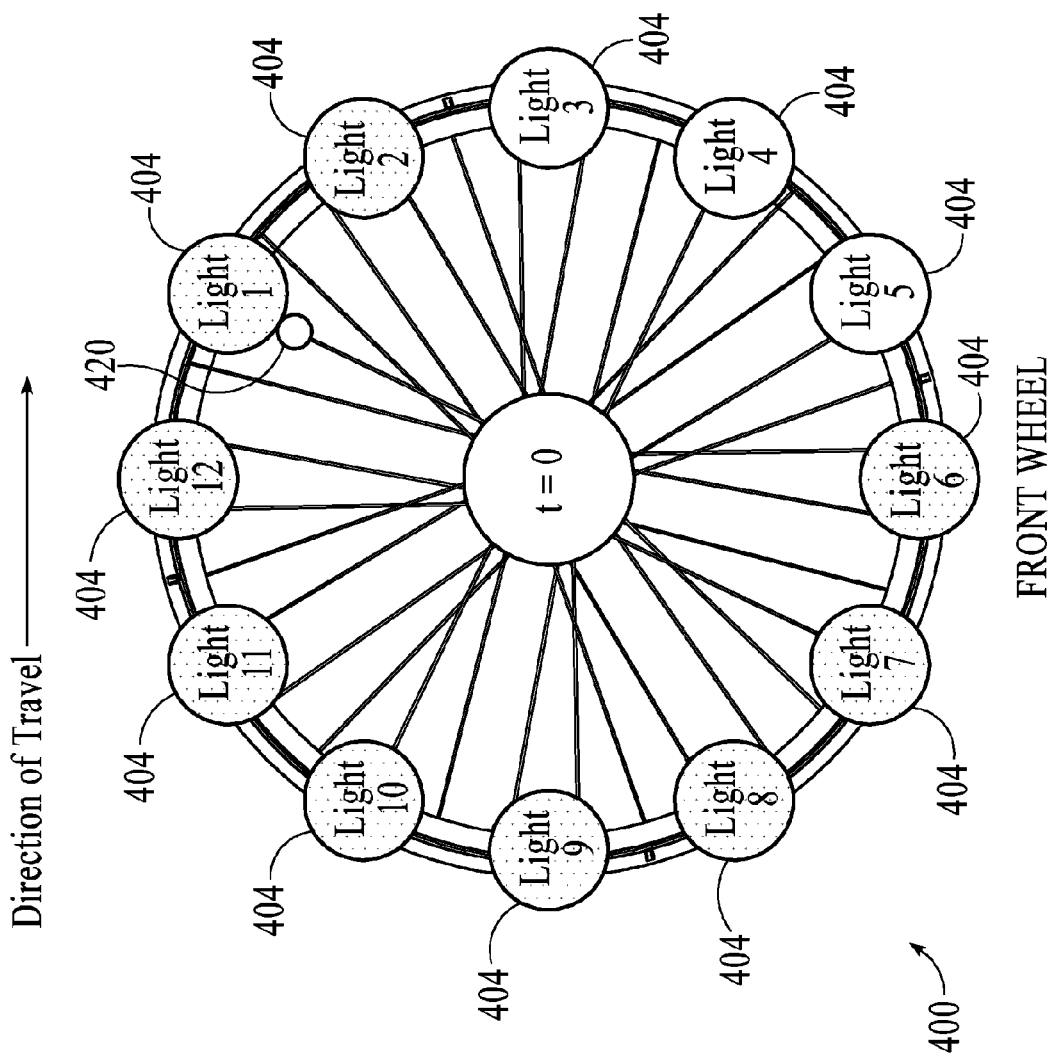
Figure 4C:
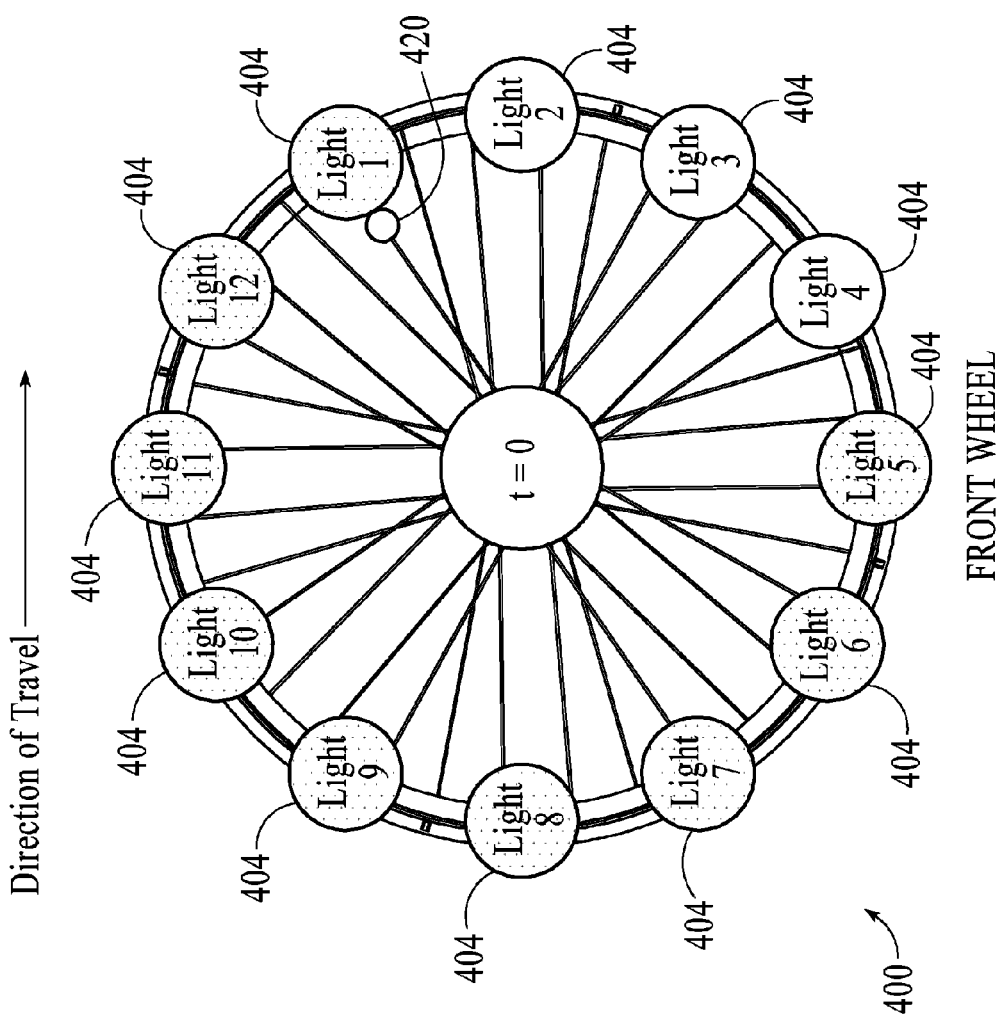

FIGS. 4A-4C are diagrams illustrating the operation of the bicycle lighting system in accordance with one embodiment of the invention. As shown in FIGS. 4A-C, a wheel 400 includes a series of lights 404 (Light 1 through Light 12). Although the wheel 400 includes twelve lights in FIGS. 4A-4C, it will be appreciated that the wheel may include fewer than or more than twelve lights. The description of operation described with reference to FIGS. 4A-C assumes that the wheel 400 is moving left to right at an approximately constant velocity. In addition, the description below is provided with respect to the front wheel 112. It will be appreciated that the operation can be easily adapted for rear wheel 116.

In FIGS. 4A-C, at a given time, only a portion of lights 404 that are located at the bottom, front edge of the wheel are in the "on" state. Because only these lights are "on", the ground and the area in front of the bicycle are illuminated. The table next to the wheel shows the "on"/"off" state of each of the twelve lights 404 (Light 1 though Light 12) in accordance with one example of the invention.

In FIGS. 4A-4C, three adjacent lights 404 are in an on state while the other lights are in an off state at any given time. It will be appreciated that number of lights in the on state need not be three adjacent lights as shown in FIGS. 4A-4C. The number of lights in the on state may be less than three adjacent lights or more than four adjacent lights. In addition, the lights in the on state need not be adjacent to one another. In addition, the on/off state of the lights may vary as a function of time or event, such as braking or acceleration, user choice, etc. In addition, the lights do not need be solidly on or off. For example, the lights may blink in various patterns as the lights go through the on and off combinations. In another example, the lights may vary in intensity (i.e., some lights may be at maximum luminescence, while others may be at a luminescence that is less than the maximum). As explained above, three adjacent lights in the on state appears to an observer of the bicycle as an arc of light when the bicycle is in motion.

As shown in FIG. 4A, the wheel may also include an index sensor 420 (in combination with an emitter) that can be used to determine the timing the wheel rotation and/or for indexing a wheel orientation. For example, every time the wheel completes a rotation, the index sensor may pass an emitter on a stationary portion of the bicycle (i.e., on the bicycle frame). The controller of the bicycle lighting system may receive a signal from the index sensor 420 when it passes the emitter, indicating that the index sensor 420 is at a reference position (i.e., the location of the emitter). The amount of time it takes the index sensor 420 to pass the reference position is recorded as a period of rotation of the bicycle. As will be described in further detail hereinafter, the period of rotation can be used to control the an on/off state of the lights 404.

In some embodiments, the index sensor is a hall-effect sensor. In embodiments in which the index sensor is a hall-effect sensor, a magnet may also be attached to the fork of the bicycle, which acts as a stimulus for the sensor. Each time the sensor passes by the magnet, the controller may receive a signal. It will be appreciated that the index sensor need not be a hall-effect sensor and may be any other sensing elements that can sense a position (e.g., a contact switch, etc.).

FIG. 4A illustrates the wheel 400 at an exemplary starting reference position. In FIG. 4A, only lights 4, 5 and 6 are in the "on" state. As explained above, when lights 4, 5 and 6 are in the on state, they appear to an observer of the wheel as a continuous arc of light. A wheel with twelve lights that only has three adjacent lights in the on state appears as an arc having an about 90 degree arc angle. It will be appreciated that the arc angle may be less than or greater than 90 degrees, and, may be any value or range of values between about 20 degrees and about 180 degrees.

FIG. 4B illustrates the wheel 400 at a time subsequent to that shown in FIG. 4A. In particular, FIG. 4B illustrates the combination of lights turned on and lights turned off at time=P/n, where P is the measured period of rotation and n is the number of lights. In the example shown in FIG. 4B, the time shown is P/12 and corresponds to a rotation of 30 degrees from the reference position shown in FIG. 4A. In operation, the switch from the on/off state of lights shown in FIG. 4A to the on/off state of lights shown in FIG. 4B occurs at time, t=P/n. In particular, with reference to FIGS. 4A and 4B, the combination of lights in the on state changes from lights 4, 5 and 6 to lights 3, 4, and 5 at time, t=P/12.

FIG. 4C illustrates the wheel 400 at a time subsequent to that shown in FIG. 4A. In particular, FIG. 4C illustrates the on/off state of the lights at time, t=2P/n (e.g., 2*(P/12)) and at a rotation from the reference position of about 60 degrees. For example, with reference to FIGS. 4B and 4C, the combination of lights in the on state changes from lights 4, 5 and 6 to lights 2, 3 and 4 at time, t=2P/n. It will be appreciated that, in this example, the switching of lights in the on state continues until all combinations of three lights have been in the on state throughout the rotation of the wheel, at which time the lighting pattern repeats itself beginning at the combination of lights shown in FIG. 4A. In the embodiment shown in FIGS. 4A-4C, upon achieving the reference "start" position in FIG. 4A, the lights are reset to illuminate Lights 4, 5 and 6. In other words, the bicycle lighting system may be calibrated in such a way that, upon passing the reference position, the cascade of lights in the on state is set to begin about a specific light position.

When the bicycle is moving the combination of the four adjacent lights being in the on state as shown in FIGS. 4A-4C appears as a continuous arc of light to an observer, as shown, for example, in FIGS. 1-3. The location of the arc appears to be the same location to the observer (e.g., the same area in front of or to the rear of the bicycle wheel appears to be illuminated).

The state (or status) of the lights corresponds to an illumination pattern. Illumination pattern as used herein refers to the particular combination of lights that are in the on/off state or high/low state. For example, an illumination pattern may be four adjacent lights are on, while the remaining lights are off as described above with reference to FIGS. 4A-4C. In another example, an illumination pattern may be four adjacent lights are high (e.g., maximum luminescence), while the remaining lights are low (e.g., less than maximum luminescence). In one example, the illumination pattern may be that each light is turned on at 70 degrees of rotation and turned off at 100 degrees of rotation from a reference position. In one example, the illumination pattern may be that each light is turned on at 80 degrees of rotation and turned off at 90 degrees of rotation from the reference position.

In one embodiment, the illumination pattern when the bicycle is stationary may be different than for example the illumination pattern when the bicycle is moving at a constant velocity. Similarly, the illumination pattern may differ when the bicycle is undergoing accelerations and/or decelerations. Alternatively, the illumination pattern may be consistent (e.g., a continuous arc of lights when the bicycle is stationary, moving at a constant velocity, accelerating and decelerating). In some embodiments, the illumination pattern may differ depending on whether the user is making a left turn or a right turn (e.g., similar to a left turn or right hand turn signal in a vehicle). In these embodiments, the lighting system may include a thumb switch so that the user can control the lighting system to indicate their intent to make a left turn or a right turn. In other embodiments, the number of lights that are on may be higher when the bicycle is moving slowly.

Figure 5:
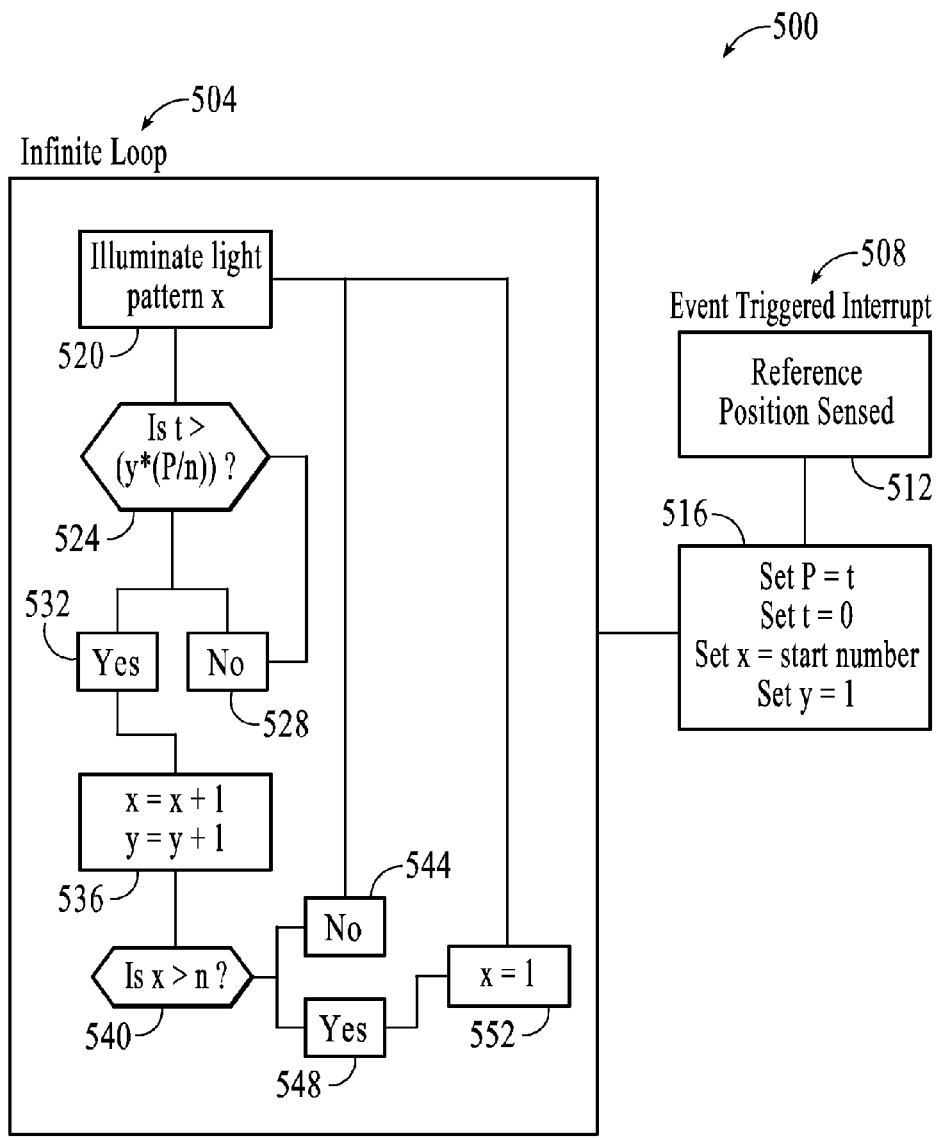
FIG. 5 is a flow diagram illustrating an algorithm for controlling the lighting system according to one embodiment of the invention.

FIG. 5 is a flow diagram illustrating a method of controlling the light sources of the bicycle lighting system 500 in accordance with one embodiment of the invention. It will be appreciated that the method 500 may vary from that shown in FIG. 5, including fewer or additional steps and a different order. In one embodiment, the method 500 is implemented as a computer readable medium (software) that is executed by a controller that is part of the bicycle lighting system 100. In one particular embodiment, the method 500 is written as C code. It will be appreciated that the method 500 may be implemented in other computer readable media formats as known to those of skill in the art.

In some embodiments, the method 500 is a loop 504 with an event driven interrupt 508. In FIG. 5, the interrupt 508 is triggered when a reference position is sensed 512. For example, the reference position may be sensed 512 by an index sensor (e.g., a hall-effect sensor) sensing a reference position (e.g., a magnet placed on the fork of the bicycle frame for the front wheel and on the bicycle frame for the back wheel).

A control algorithm 516 is implemented when the reference position is sensed 512. In some embodiments, the control algorithm 516 sets certain values. For example, the control algorithm 516 may set the timer, t, to 0 when the interrupt 508 is triggered. The control algorithm 516 may also set other values include an illumination pattern, x, and an integer, y. When the reference position is sensed 512 a second time, the interrupt 508 is again triggered. The control algorithm 516 calculates the period of rotation P based on the timer value (difference between t when the second reference position is sensed and 0). The pattern number, x, is set to a start position value. An exemplary start pattern is the pattern shown in FIG. 4A (lights 1, 2, 3, 8, 9, 10, 11, and 12 are in the off state and lights 4, 5 and 6 are in the on state). The integer y is also set to 1, which tracks the number of pattern changes that have occurred.

The values calculated by the control algorithm 516 are then used in the loop 504 to control the light states. In some embodiments, the loop 504 beings by using a look-up table to determine the control states for each of the lights based on the pattern, x, value. The lights (e.g., lights 404) are then illuminated in accordance with the light pattern, x (step 520). The program loops until the timer counts past the first pattern switch time. In some embodiments, the pattern switch time is calculated based on the integer, y, the period, P, and the number of lights, n (step 524). In one embodiment, the pattern switch time is calculated based according to the formula: y*P/n. If the time is not greater than the pattern switch time (528), the method continues with step 524 until the time counts to the pattern switch time (532). When the time, t, is greater than the switch time, the pattern number, x, and the integer, y, are incremented (step 536). The method 500 continues by determining whether the pattern number, x, is less than the number of lights, n (step 540). If no (block 544), the process continues to step 520. The process in the loop 504 repeats until the value of x is greater than (block 548), in which case the value of x is reset to 1 (block 552), which also results in the process in the loop 504 repeating.

Figure 6:
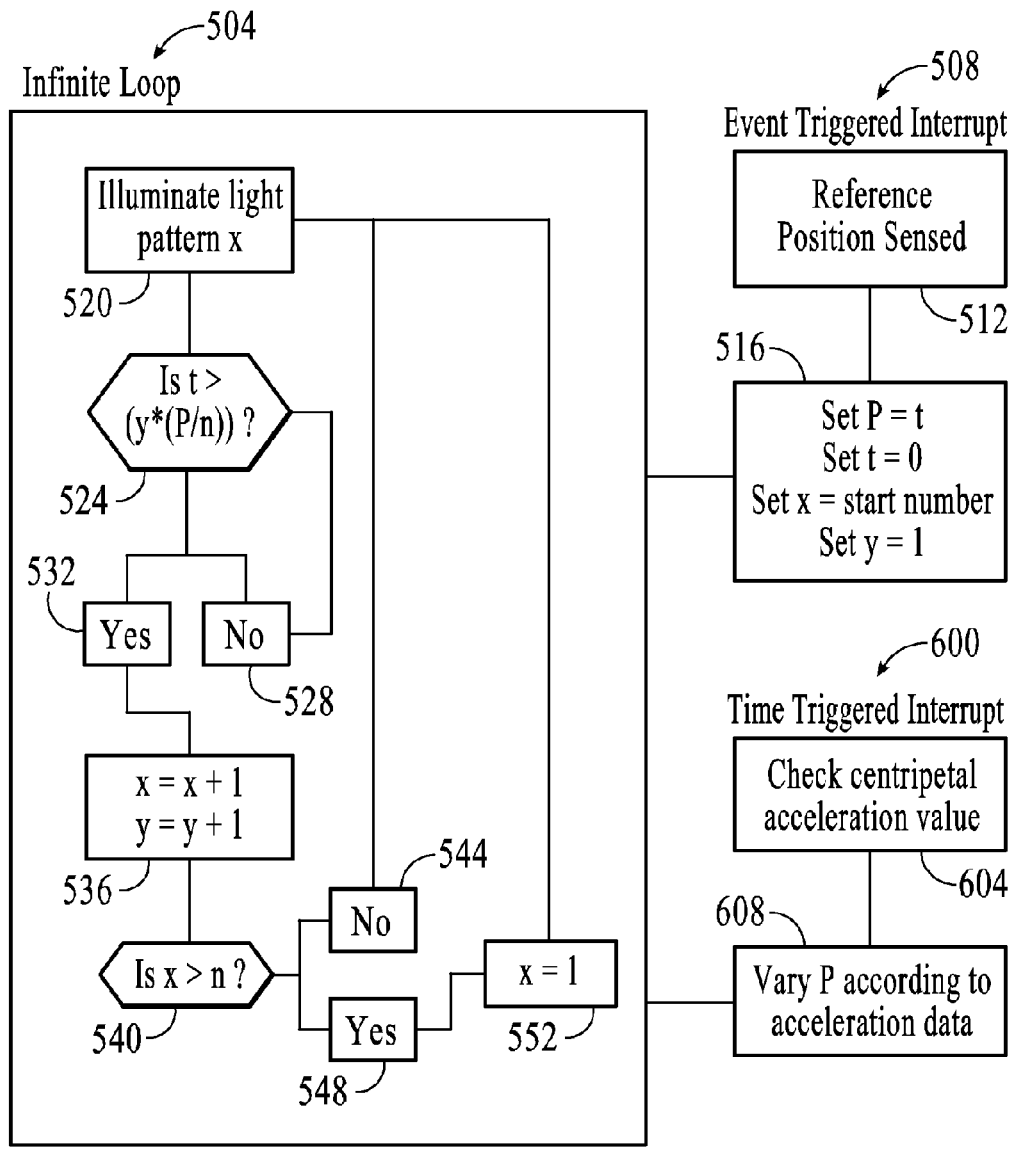
FIG. 6 is a flow diagram illustrating an algorithm for controlling the lighting system according to one embodiment of the invention.

The process 500 is particularly effective when the rotational velocity of the wheel is constant. The process 500 may be modified, as shown in FIG. 6, to accommodate for drift of the light location on the wheel that can occur during bicycle accelerations or decelerations (i.e., a non-constant velocity). In some embodiments, the process shown in FIG. 6 is only implemented during high accelerations or decelerations.

As shown in FIG. 6, the process may further include a method for measuring wheel velocity 600 that can be used to adjust the value of P in the loop 504. In some embodiments, an accelerometer is placed at a location on the wheel. The accelerometer (or other velocity sensing device) can be used to check a centripetal acceleration value 604. The centripetal acceleration value 604 can then be used to vary the value of the rotational period P 608.

In some embodiments, the accelerometer can also be used to estimate a reference position from gravity. By estimating the reference position with the accelerometer, a sinusoidal variation is introduced into the centripetal acceleration value. The accelerometer may be used alone or in combination with the hall-effect/magnet sensor (or other indexing system). In some embodiments, the accelerometer is used to determine if the wheel(s) are moving. In particular, the accelerometer can sense the direction of gravity when the bicycle is not moving and infer "forward" and "backward" from the gravity vector.

Figure 7:
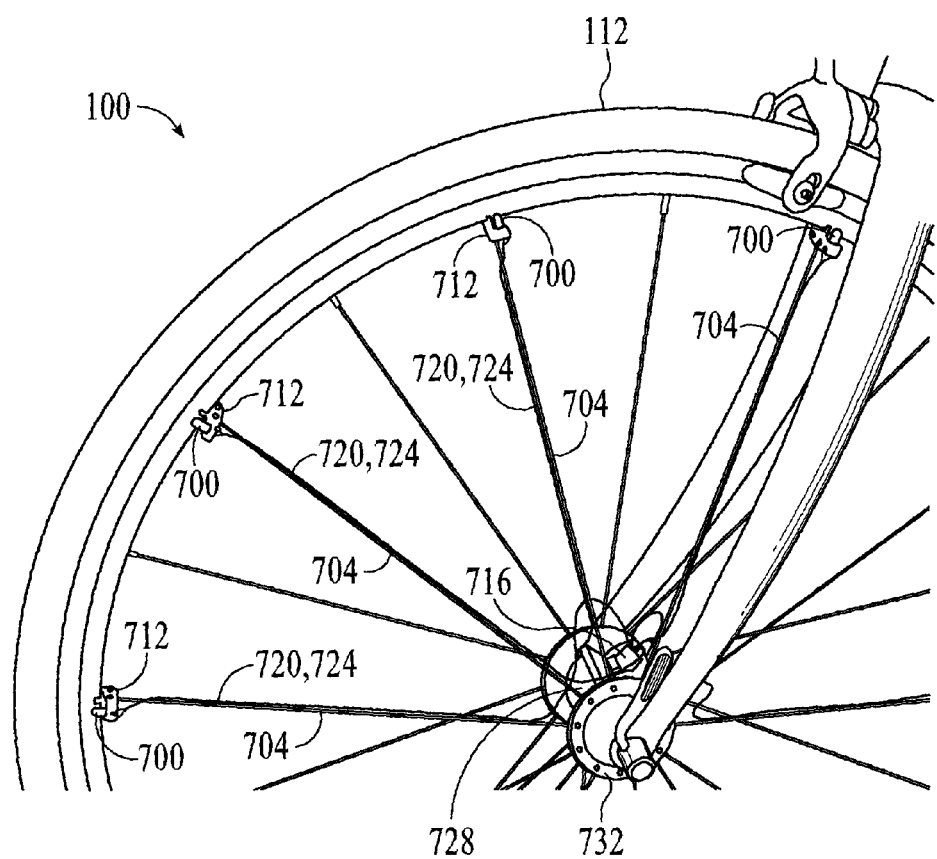
FIG. 7 is a detailed side view of the bicycle lighting system installed on a bicycle according to one embodiment of the invention.

FIGS. 7-10 illustrate a bicycle lighting system 100 in accordance with one embodiment of the invention. As shown in FIG. 7, the bicycle lighting system 100 is mounted to the bicycle wheel 112. In particular, the bicycle lighting system 100 shown in FIG. 7 includes multiple lights 700 that are mounted individually to spokes 704 of the bicycle wheel 112. In the embodiment shown in FIG. 7, twelve lights 700 are positioned equally around the circumference of the bicycle wheel 112. It will be appreciated that the bicycle lighting system 100 may have fewer than or more than twelve lights 700 and that the lights need not be positioned equally around the circumference of the bicycle wheel 112. As shown in detail in FIGS. 7, 9 and 10, the lights 700 are mounted to the spokes 704 using a clip 712.

Figure 8:
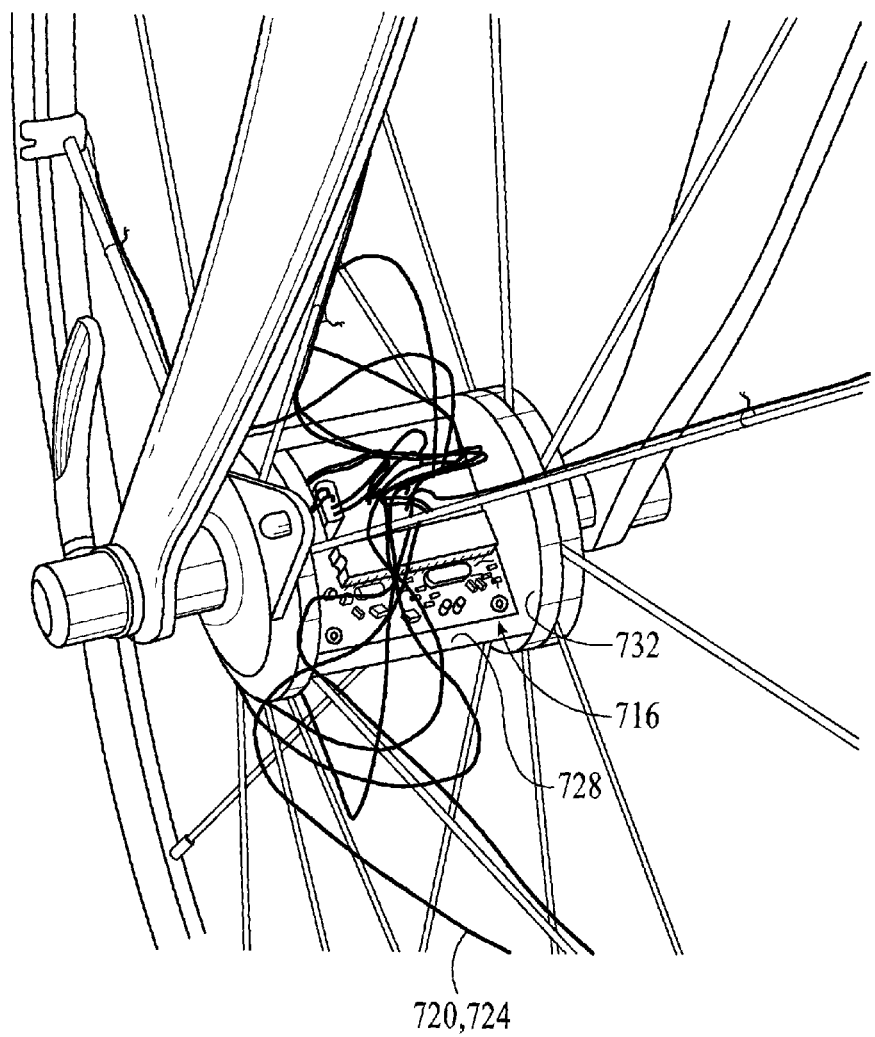
FIG. 8 is a detailed view of a control system of the bicycle lighting system installed on a bicycle according to one embodiment of the invention.

Each light 700 is radially wired individually to a main control circuit board 716 via wires 720, 724 (i.e., a power/ground wire pair). The main control circuit board 716 is mounted in the hub 728 of the bicycle wheel 112, 116, as shown in FIGS. 7 and 8. As shown in FIG. 8, the main control circuit board 716 fits within the hub 728. The control circuit board 716 is a controller that is configured to control the on/off state of each of the lights 700 by controlling the voltage supplied to the lights 700 via the power wire 720. In some embodiments, the control circuit board controls the on/off state of the lights 700 in accordance with the methods described above with reference to, for example, FIGS. 5 and 6.

In some embodiments, a battery (not shown) is coupled to the circuit board 716 and also mounted in the hub 728. In one embodiment, the control circuit board 716 is mounted on a housing 732 that is made from a laser cut polypropylene sheet, and, in one embodiment, the battery is a 9V battery. It will be appreciated that, however, the power source for the lights need not be a battery and can be any feasible source of electricity.

Figure 9:
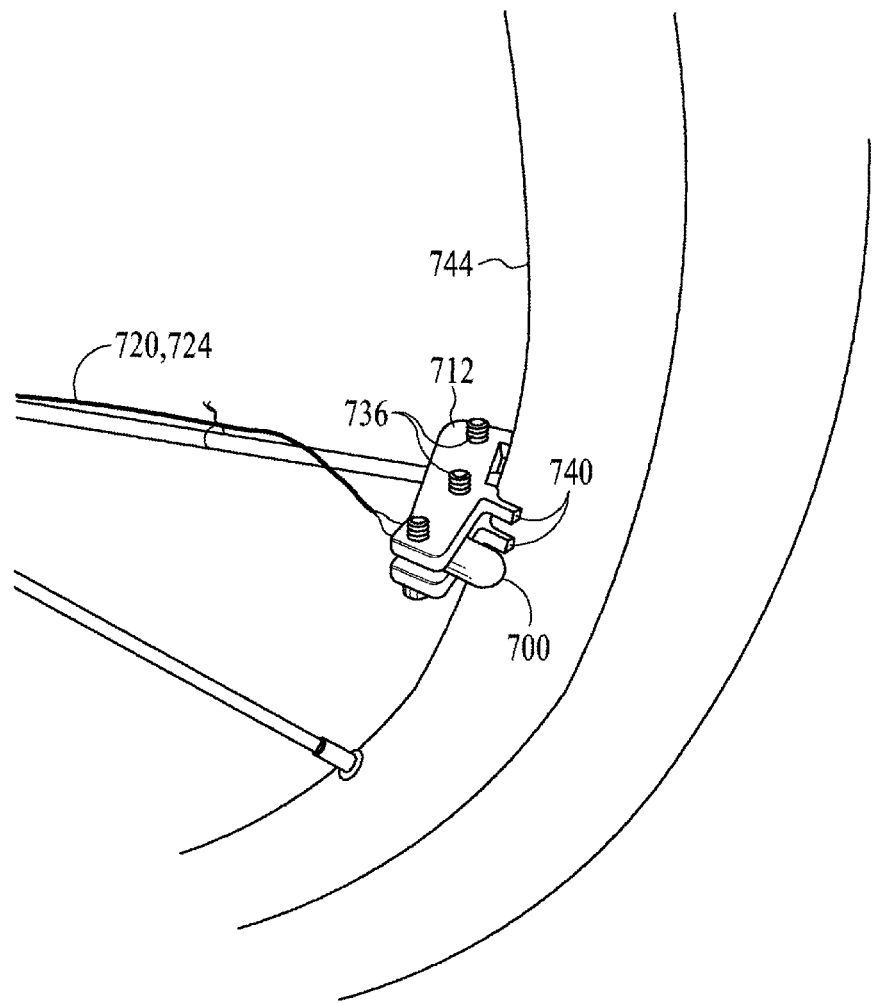
FIG. 9 is a detailed perspective view of a light installed on the bicycle wheel spoke according to one embodiment of the invention.
Figure 10:
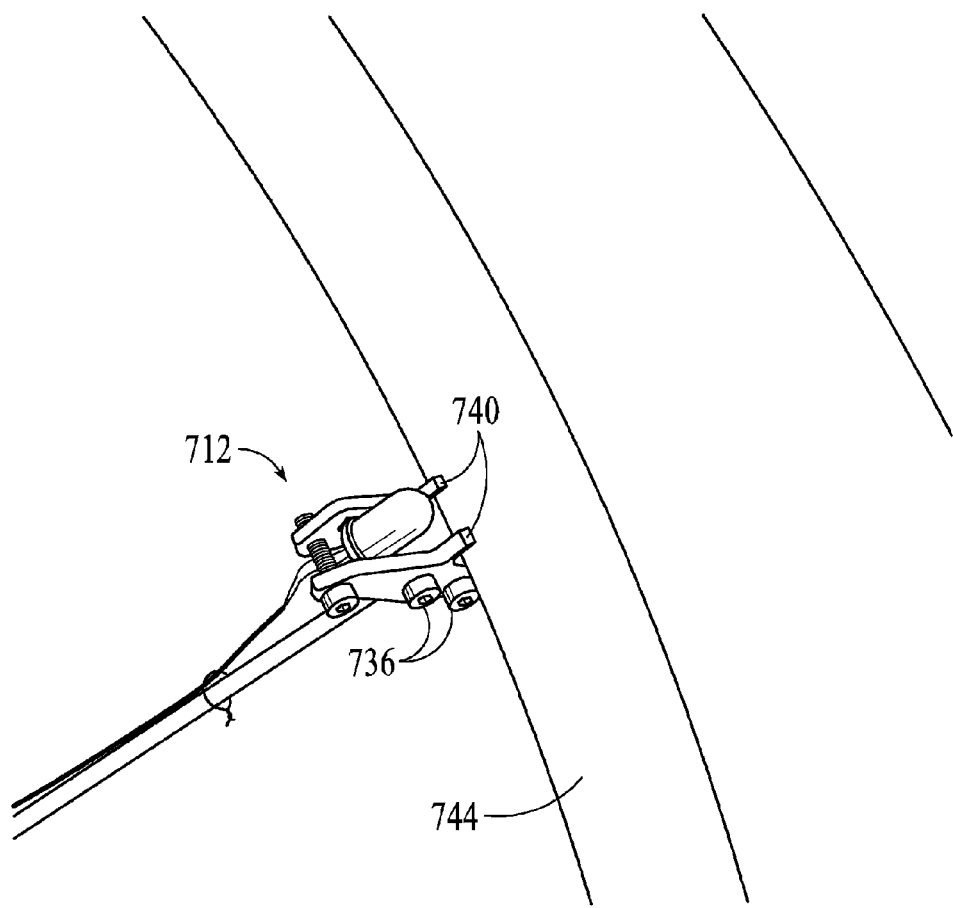
FIG. 10 is a detailed perspective view of the light of FIG. 9 according to one embodiment of the invention.

FIGS. 9 and 10 are detailed views of the clip 712 that is used to mount the lights 700 to the wheel 112, 116. The light 700 shown in FIGS. 9 and 10 is a light emitting diode (LED). It will be appreciated, however, that other light sources may be used for the light 700 as described above. The clip 712 provides a clamping force to the spoke that is applied by tightening of a pair of screws 736. The clip 712 may also include ridges 740 to claim and/or align the clip 712 with the rim 744 of the bicycle wheel 112, 116.

The light 704 is affixed to the clip 712 via any coupling mechanism, including, for example, mechanical fasteners (e.g., screws, bolts, etc.), an adhesive, an interference or friction fit, etc. In some embodiments, the light 700 is affixed to the clip 712 and/or the clip 712 is mounted to the wheel 112, 116, so that the light 700 extends away from the center plane of the wheel 112. The light 700 may extend away from or be offset from the center plane of the wheel 112, 116 a distance sufficient to allow for light to be projected in front of the wheel 112 (without being blocked by the wheel itself) and to be projected behind the wheel 112 (without being blocked by the wheel itself).

Figure 11:
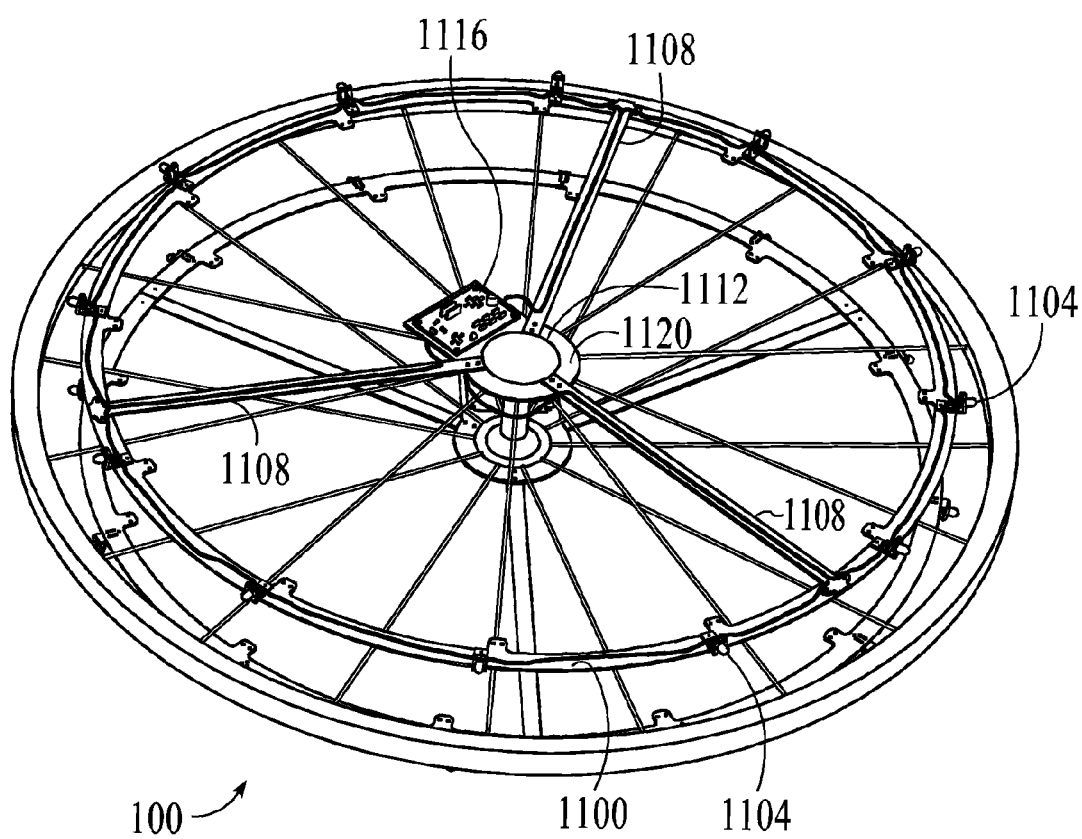
FIG. 11 is a perspective view of a ring of lights of the bicycle light system installed on a bicycle wheel according to one embodiment of the invention.
Figure 12:
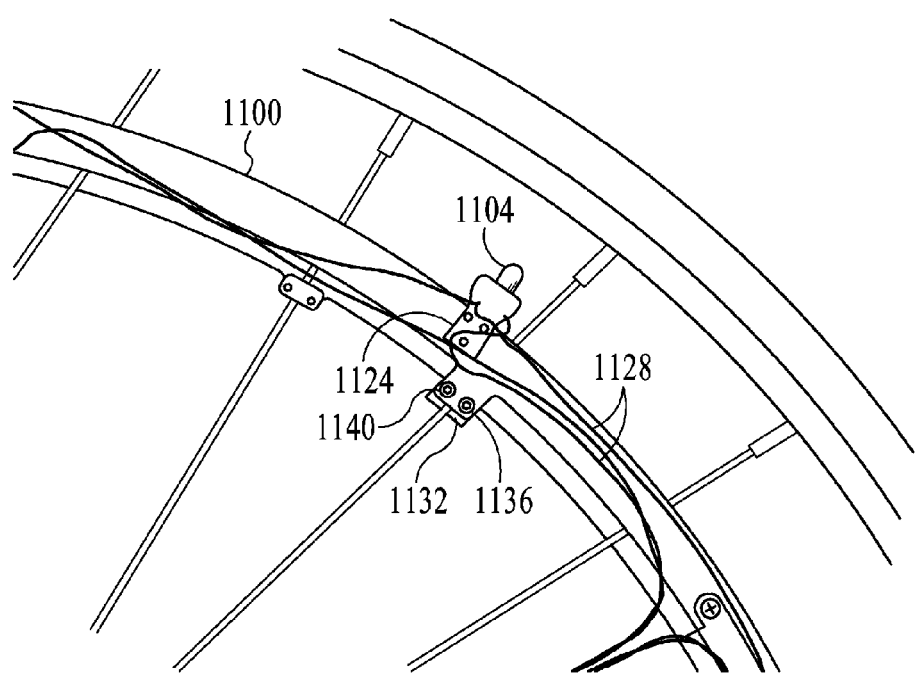
FIG. 12 is a detailed perspective view of the light on the ring installed on the bicycle wheel according to one embodiment of the invention.

FIGS. 11-12 illustrates the bicycle lighting system 100 in accordance with another embodiment of the invention. In the embodiment shown in FIGS. 11-12, the bicycle light system 100 includes a ring 1100. In some embodiments, the ring 1100 is a continuous ring made from three arc segments cut from a polypropylene sheet.

Multiple lights 1104 are positioned on the ring 1100. In some embodiments, the lights 1104 are positioned equally around the circumference of the bicycle wheel 112, 116. It will be appreciated that any number of lights 1104 may be positioned on the ring, including, for example, any number or range of numbers between about four lights and about fifty lights, and, more particularly, between about eight lights and about sixteen lights. It will be appreciated that the number of lights 1104 may be less than four lights or more than fifty lights. It will also be appreciated that the lights need not be positioned equally around the circumference of the bicycle wheel 112, 116.

In some embodiments, the bicycle lighting system 100 also includes three spokes 1108, a central disc 1112 and a controller 1116. The spokes 1108 are connected to the ring 1100 and the central disc 1112. In one embodiment, the spokes 1108 and central disk 1112 are also cut from a polypropylene sheet. The central disc 1112 may be mounted to the hub of the wheel 112, 116, and/or the spokes 1108 may be mounted to spokes of the wheel 112, 116 to center the ring 1100 on the wheel 112, 116.

As shown in FIG. 11, the controller 1116 is positioned in the hub 1120 of the bicycle wheel and is coupled to the lights 1104 via the central disk 1112 and spokes 1108. Wires 1128 (FIG. 12) connect the anode and cathode of the lights 1104 to the controller 1116. In some embodiments, a common ground wire runs to each of the lights, and a voltage source wire is connected to each of the lights and is controlled by the controller 1116. The controller 1116 is configured to control the on/off state of each of the lights 1104 by controlling the voltage supplied to the lights 1104 via the power wire 1128. In some embodiments, the controller 1116 controls the on/off state of the lights 1104 in accordance with the methods described above with reference to, for example, FIGS. 5 and 6.

FIG. 12 is a detailed view of the lights 1104 showing the mounting of the lights 1104 to the ring 1100. FIG. 12 also illustrates the mounting of the ring 1100 to the wheel 112, 116 in further detail. As shown in FIG. 12, in some embodiments, the lights 1104 are connected to the ring 1100 using a living hinge based folding bracket 1124. The bracket 1124 captures and secures the light 1104, and, in some embodiments, the light 1104 may also or alternatively be mechanically secured to the bracket 1124 (e.g., via screws, bolts, adhesives, etc.). As shown in FIG. 12, the ring 1100 is secured to the bicycle wheel 112 using multiple clamps 1132. Each clamp 1132 includes a body portion 1136 and screws 1140, which engage the body portion 1136, to apply a clamping force around the spokes of the wheel 112, 116.

Figure 13:
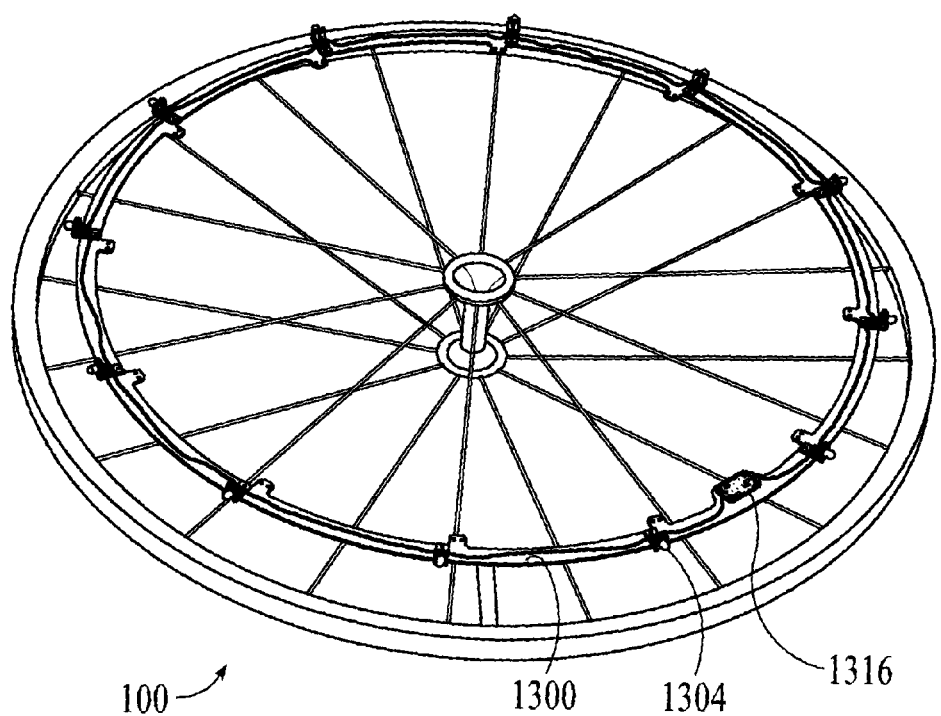
FIG. 13 is a perspective view of the bicycle light system according to one embodiment of the invention.
Figure 14:
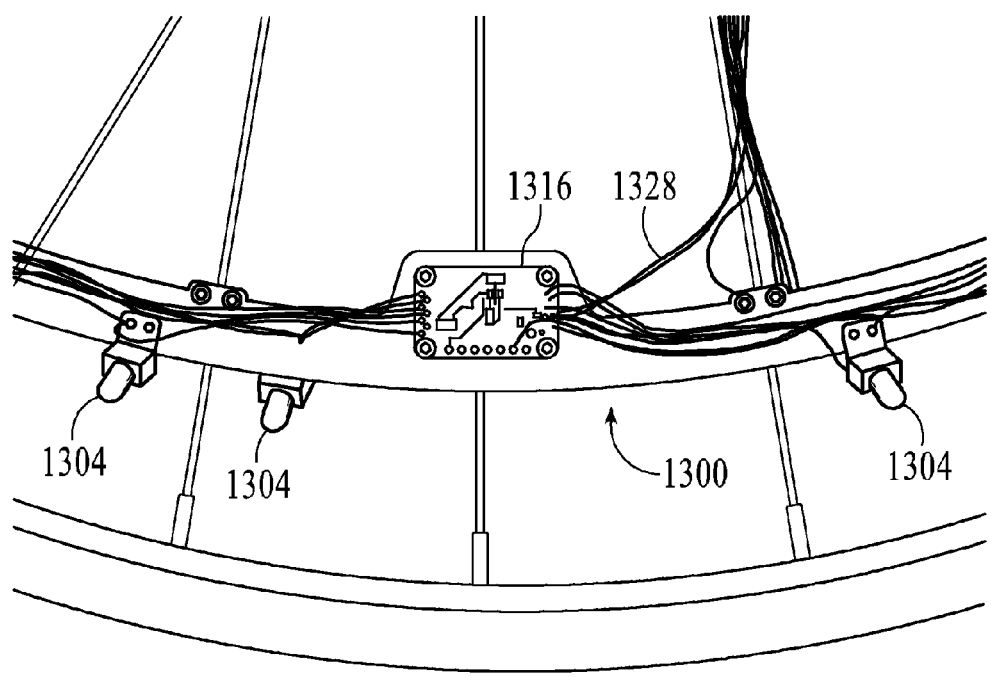
FIG. 14 is a detailed perspective view of controller and light of the bicycle light system according to one embodiment of the invention.

FIGS. 13-14 illustrate the bicycle lighting system 100 in accordance with another embodiment of the invention. In the embodiment shown in FIGS. 13-14, the bicycle light system 100 includes a ring 1300. In some embodiments, the ring 1300 is a continuous ring made from three arc segments cut from a polypropylene sheet.

Multiple lights 1304 are positioned on the ring 1300. In some embodiments, the lights 1304 are positioned equally around the circumference of the bicycle wheel 112, 116. It will be appreciated that any number of lights 1304 may be positioned on the ring, including, for example, any number or range of numbers between about four lights and about fifty lights, and, more particularly, between about eight lights and about sixteen lights. It will be appreciated that the number of lights 1304 may be less than four lights or more than fifty lights. It will also be appreciated that the lights need not be positioned equally around the circumference of the bicycle wheel 112, 116.

The bicycle lighting system 100 also includes a controller 1316. As shown in FIG. 13, the controller 1316 is positioned on the ring 1300. Wires 1328 (FIG. 14) connect the anode and cathode of the lights 1304 to the controller 1316. In some embodiments, a common ground wire runs to each of the lights, and a voltage source wire is connected to each of the lights and is controlled by the controller 1316. The controller 1316 is configured to control the on/off state of each of the lights 1304 by controlling the voltage supplied to the lights 1304 via the power wire 1328. In some embodiments, the controller 1316 controls the on/off state of the lights 1304 in accordance with the methods described above with reference to, for example, FIGS. 5 and 6. The ring 1300 may be mounted to the wheel 112, 116 using clamps as described above with reference to FIGS. 11-12.

Mounting the controller 1316 to the ring 1300 has several advantages. In some embodiments, the controller 1316 includes an accelerometer (e.g., an accelerometer integrated circuit (IC). In these embodiments, the refresh rate of the light timing, as described above with reference to FIG. 6, may be improved because the accelerometer is separated a distance from the axis of rotation. Similarly, in some embodiments, the controller 1316 includes the index sensor (e.g., a hall effect sensor on the controller circuit board and a magnet attached to the fork of the bicycle). The sensitivity of the index sensor is improved because the sensor is mounted a distance away from the axis of rotation.

In some embodiments, a battery or other power source may be positioned in the hub of the wheel 112, 116. In these embodiments, wires coupled to one of the spokes of the wheel may be used to couple the controller 1316 to the battery (or other power source), as shown in FIG. 14.

FIGS. 15-18 illustrate the bicycle lighting system 100 in accordance with another embodiment of the invention. The bicycle lighting system 100 shown in FIGS. 15-16 includes an illumination ring 1500, which is shown detached from the wheel 112, 116 in FIG. 15. The illumination ring 1500 shown in FIGS. 15-18 is more rigid than the rings 1100, 1300 described above. In one embodiment, the ring 1500 is sufficiently rigid that is maintains its structure and shape when detached from the wheel 112, 116. The ring 1500 provides a support structure for the lights 1504. The rigidity of the ring 1500 allows for the thickness and width of the ring 1500 to be reduced. In some embodiments, the ring 1500 is a rolled aluminum sheet metal ring. It will be appreciated that the ring 1500 may be made of other metals or hard plastics that provide sufficient rigidity.

Multiple lights 1504 are positioned on the ring 1500. In some embodiments, the lights 1504 are positioned equally around the circumference of the bicycle wheel 112, 116. It will be appreciated that any number of lights 1504 may be positioned on the ring, including, for example, any number or range of numbers between about four lights and about fifty lights, and, more particularly, between about eight lights and about sixteen lights. It will be appreciated that the number of lights 1504 may be less than four lights or more than fifty lights. It will also be appreciated that the lights need not be positioned equally around the circumference of the bicycle wheel 112, 116.

In some embodiments, the lights 1504 are affixed to the ring 1500 using a mechanical fastener (e.g., screws, bolts, etc.) or adhesives. In some embodiments, the ring 1500 may include openings for each of the lights 1504, and the lights 1504 are secured in the openings by, for example, a friction fit or interference fit. It will be appreciated that other means may be used to secure the lights 1504 to the ring 1500. The ring 1500 may be mounted to the wheel 112, 116 using clamps as described above with reference to FIGS. 11-12. Alternatively, the ring 1500 may be secured to the wheel 112, 116 using clips as described in further detail hereinafter.

Figure 15:
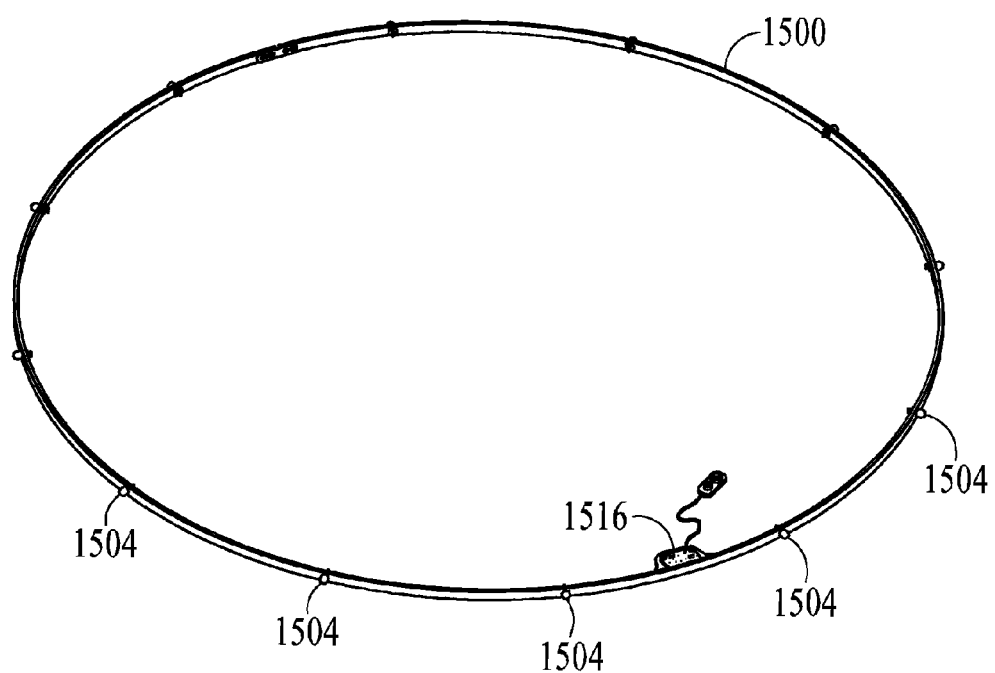
FIG. 15 is a perspective view of an illumination ring of a bicycle light system according to one embodiment of the invention.

The bicycle lighting system 100 also includes a controller 1516. As shown in FIG. 15, the controller 1516 is positioned on the ring 1500. A thin cable (e.g., a flex circuit cable) (not shown) connects the lights 1504 to the controller 1516. In some embodiments, a common ground wire runs to each of the lights, and a voltage source wire is connected to each of the lights and is controlled by the controller 1516. The controller 1516 is configured to control the on/off state of each of the lights 1504 by controlling the voltage supplied to the lights 1504 via the thin cable. In some embodiments, the controller 1516 controls the on/off state of the lights 1504 in accordance with the methods described above with reference to, for example, FIGS. 5 and 6. The controller 1516 may include an accelerometer and/or index sensor. In one embodiment, a magnet is also mounted to the fork of the bicycle to provide the signal used by the index sensor to time the wheel rotation as described above.

The bicycle lighting system 100 also includes a power source. In one embodiment, the power source is a battery pack of three AAA batteries in series. It will be appreciated that the power source need not be the battery pack and can be any power source that provides sufficient voltage and current for the bicycle lighting system 100 to operate. In some embodiments, the power source is mounted to the ring 1500. Alternatively, the power source may be mounted in the hub as described above.

Figure 16:
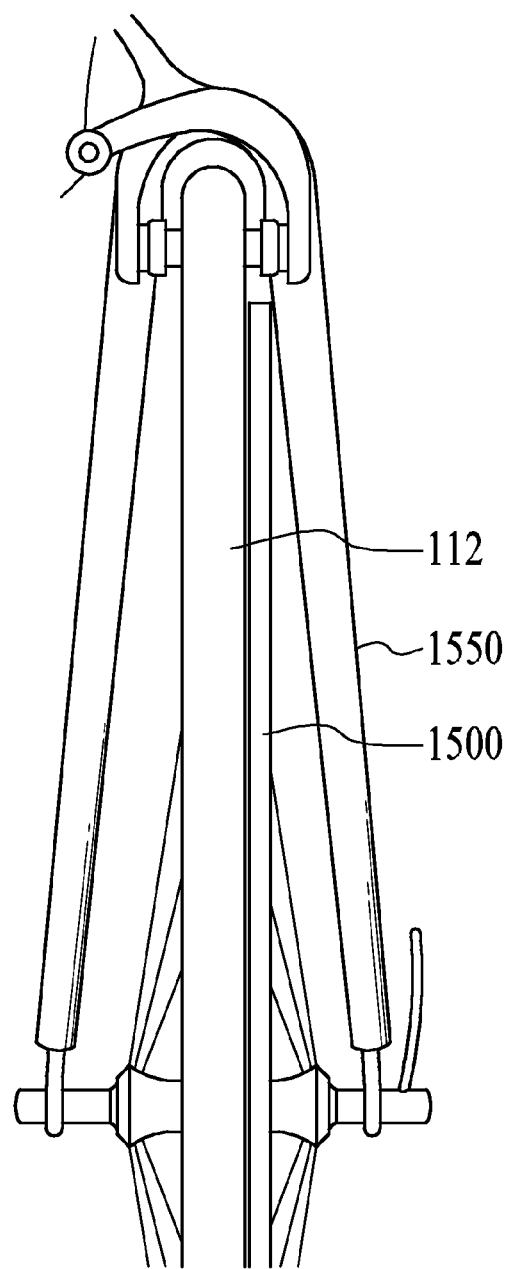
FIG. 16 is a front view of the illumination ring coupled to a bicycle wheel according to one embodiment of the invention.
Figure 17:
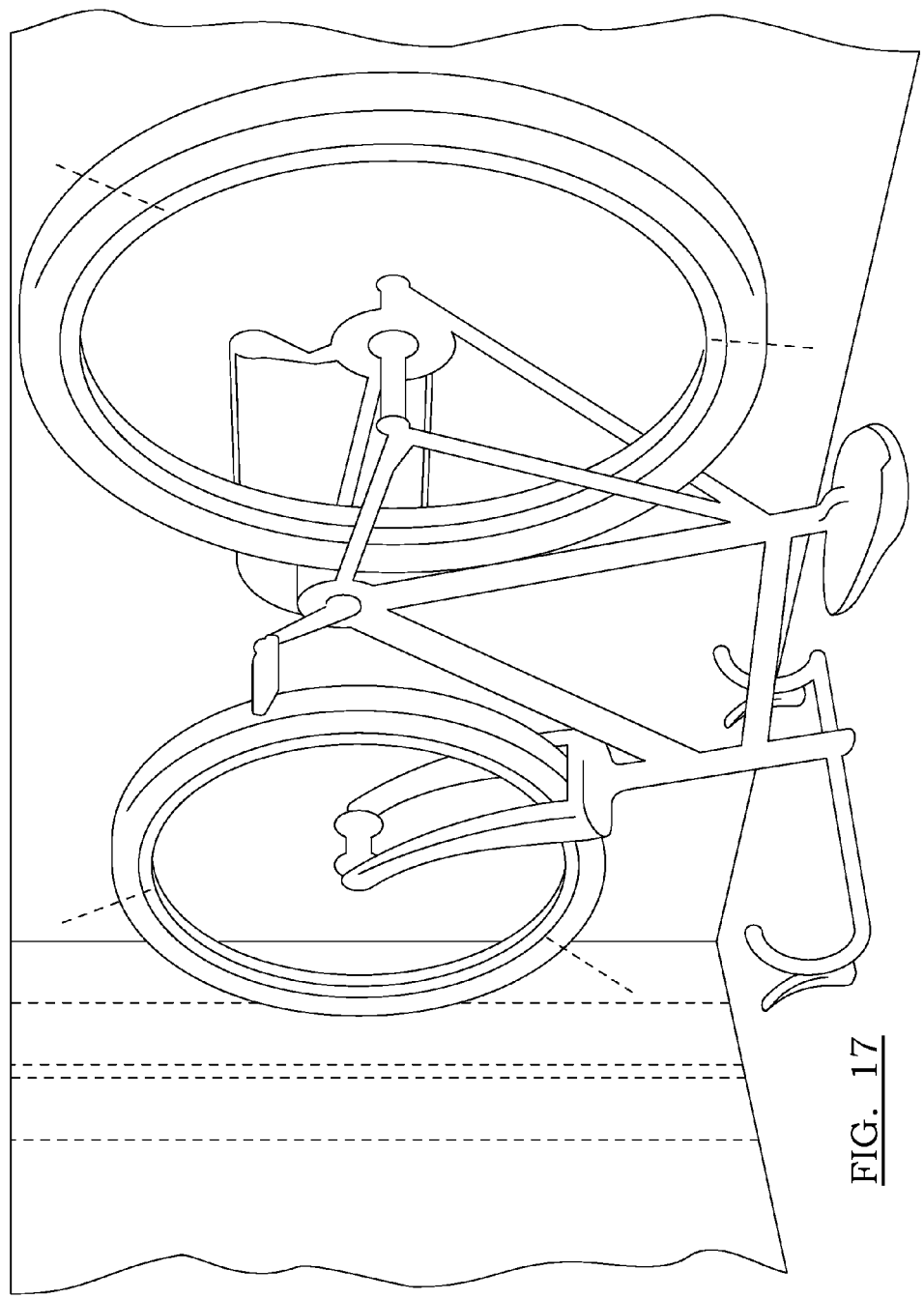
FIG. 17 is a perspective view of the lighting system on the bicycle according to one embodiment of the invention.
Figure 18:
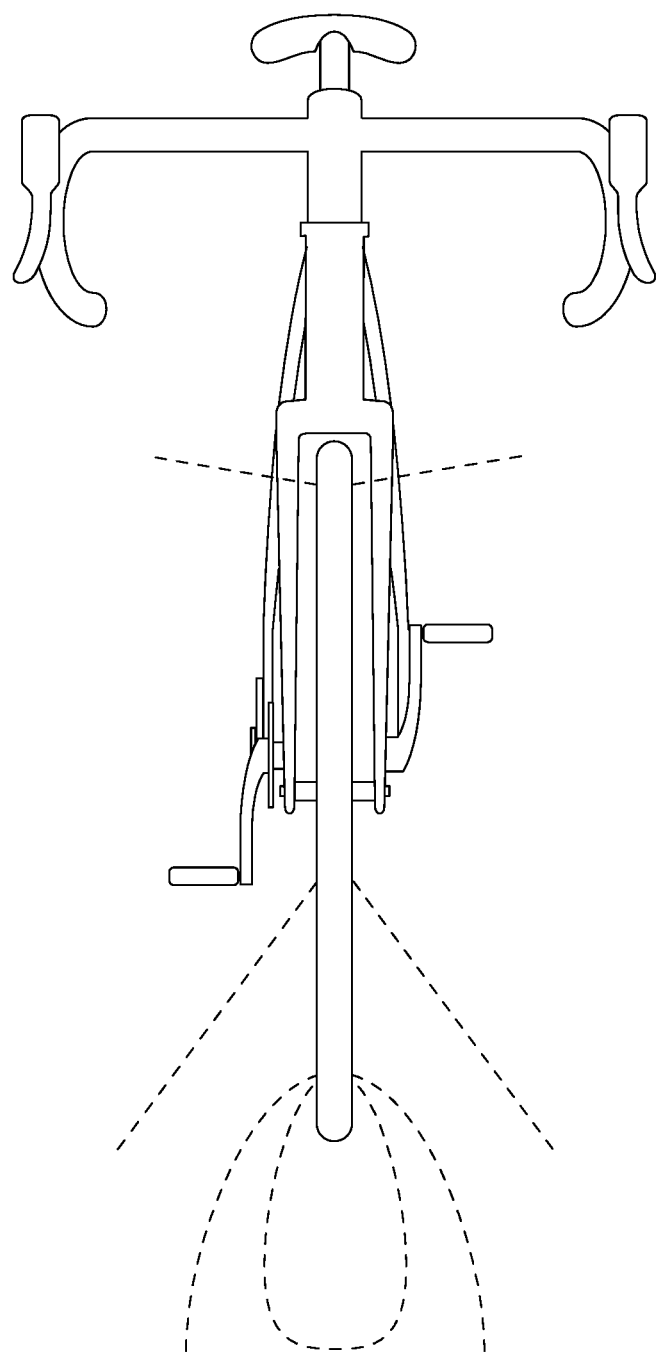
FIG. 18 is an end view of the lighting system on the bicycle according to one embodiment of the invention.

The ring 1500 is advantageous because it can be positioned between the wheel 112 and fork 1550, as shown in FIG. 16. In addition, as shown in FIG. 16, the ring 1500 can be mounted offset from the plane of the wheel 112, 116. As shown in FIGS. 17-18, the offset provides sufficient visibility and light projection (without the wheel blocking the light) forward and to the side for the front wheel 112 and rearward and to the side for the back wheel 112.

FIGS. 17 and 18 illustrate the ring 1500, in operation, and mounted onto a bicycle wheel (the bicycle is upside-down in FIG. 17). FIGS. 17 and 18 both illustrate the ring 1500 while moving (two rings are on either side of each wheel). As explained above, the lights 1504 on the ring 1500 may be controlled so that a certain number of lights (e.g., four lights) are always in the on state so that light is projected as a continuous arc of light. It will be appreciated however that the illumination ring 1500 may be controlled to have different lighting patterns, and that less than or more than four lights may be in the on state at any given time, as described above with reference to FIGS. 5-6. As explained above, in some embodiments, the lights are controlled so that the ring 1500 appears to project a continuous arc of light to an observer.

Figure 19:
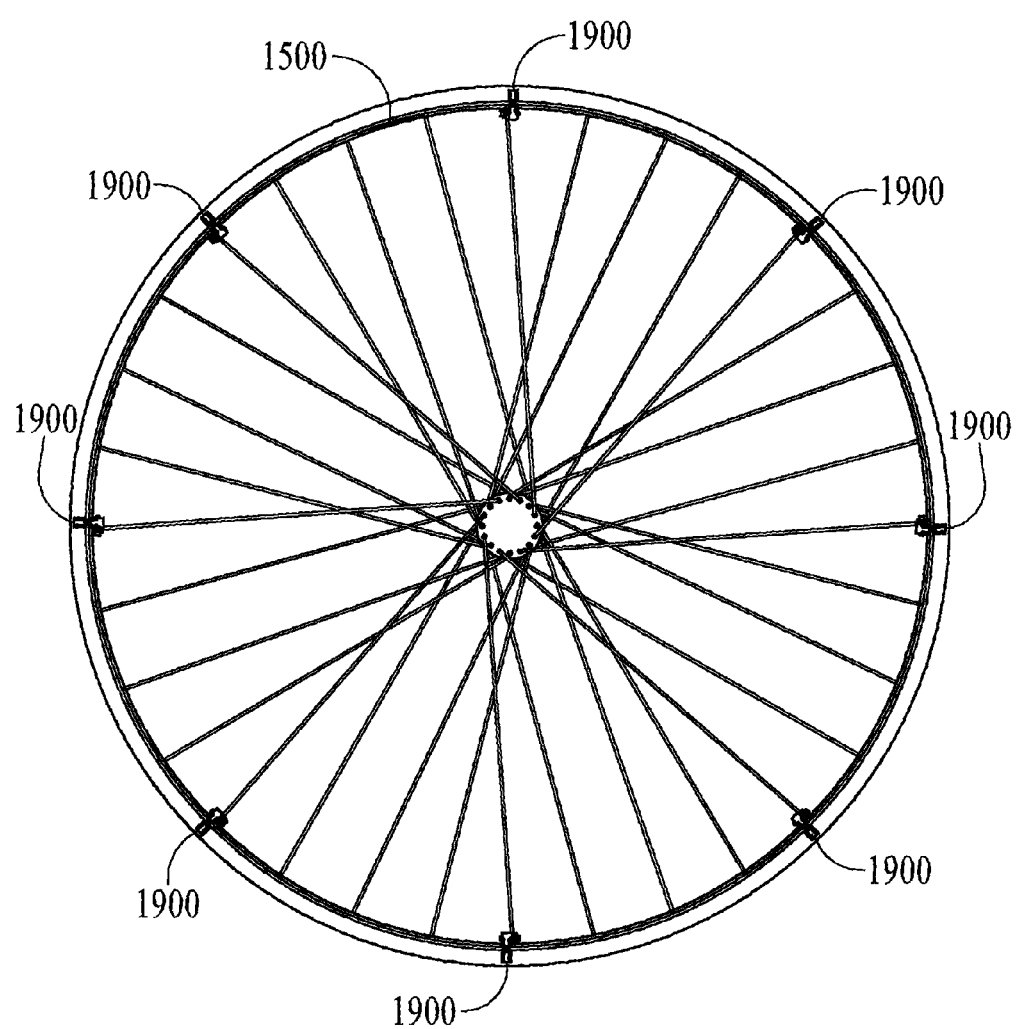
FIG. 19 is a side view of the bicycle wheel with the illumination ring according to one embodiment of the invention.
Figure 20:
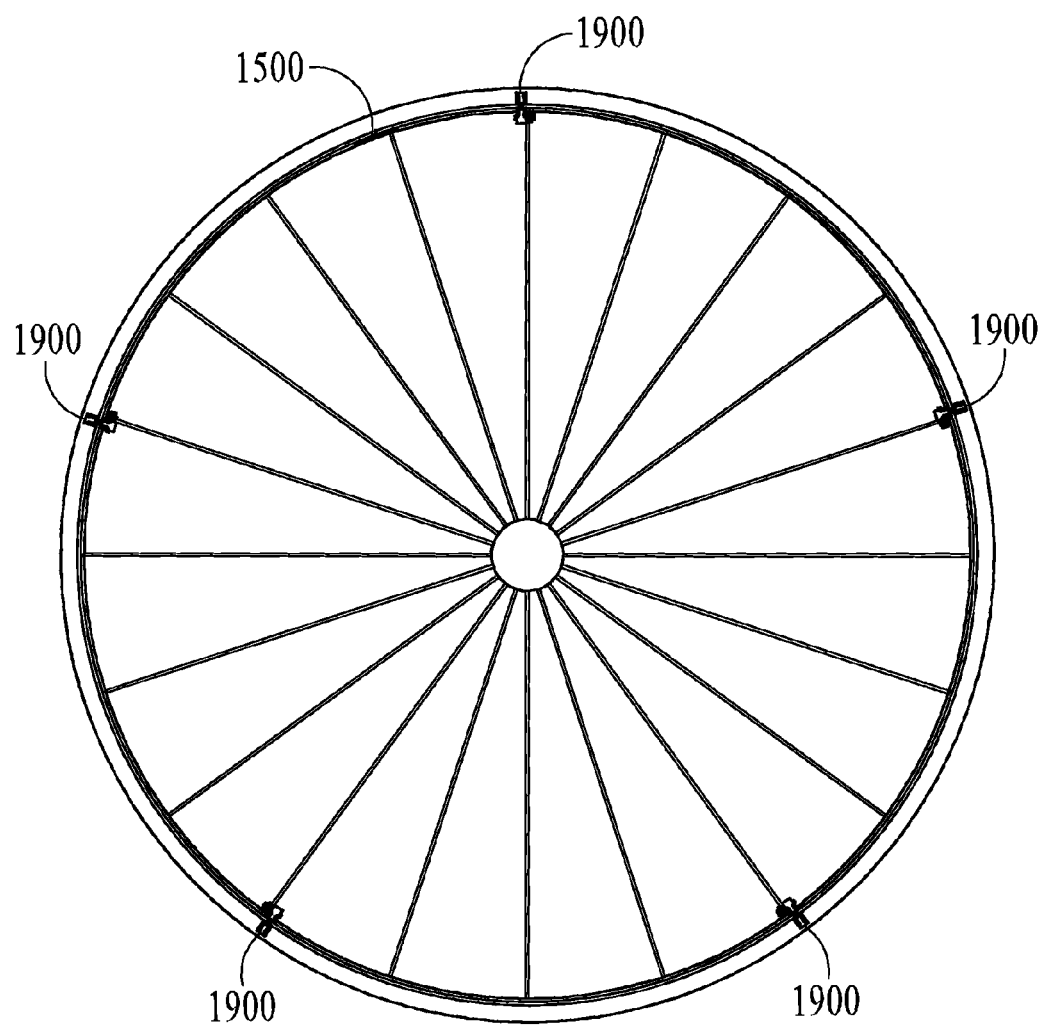
FIG. 20 is a side view of the bicycle wheel with the illumination ring according to one embodiment of the invention.
Figure 21A:
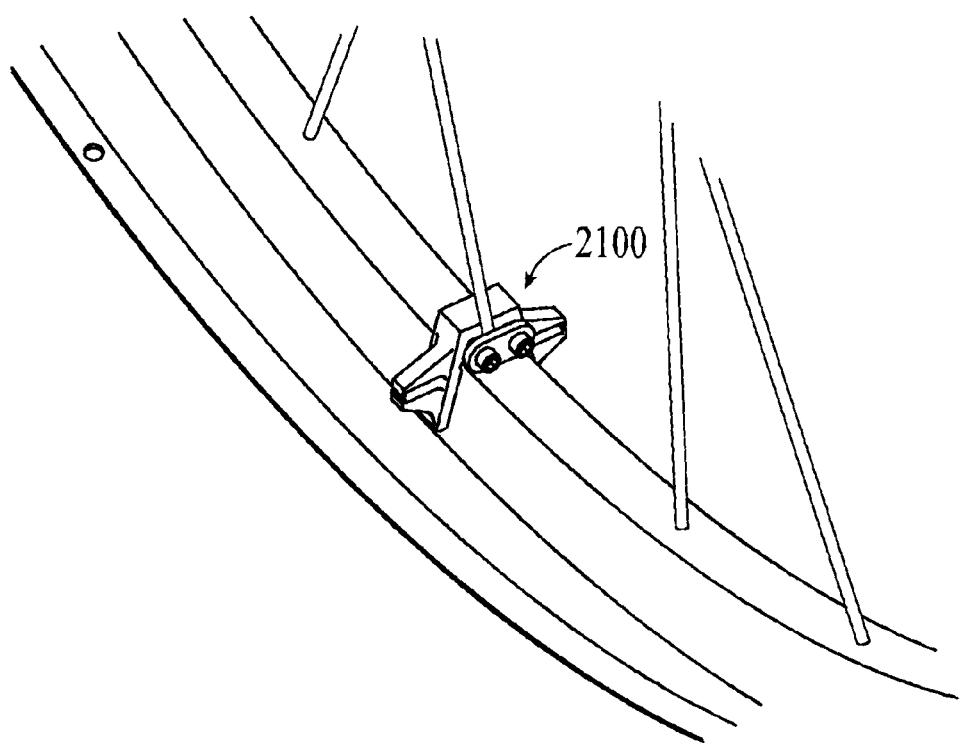
FIGS. 21A and 21B are detailed perspective views of a coupling clip of the bicycle lighting system according to one embodiment of the invention.
Figure 21B:
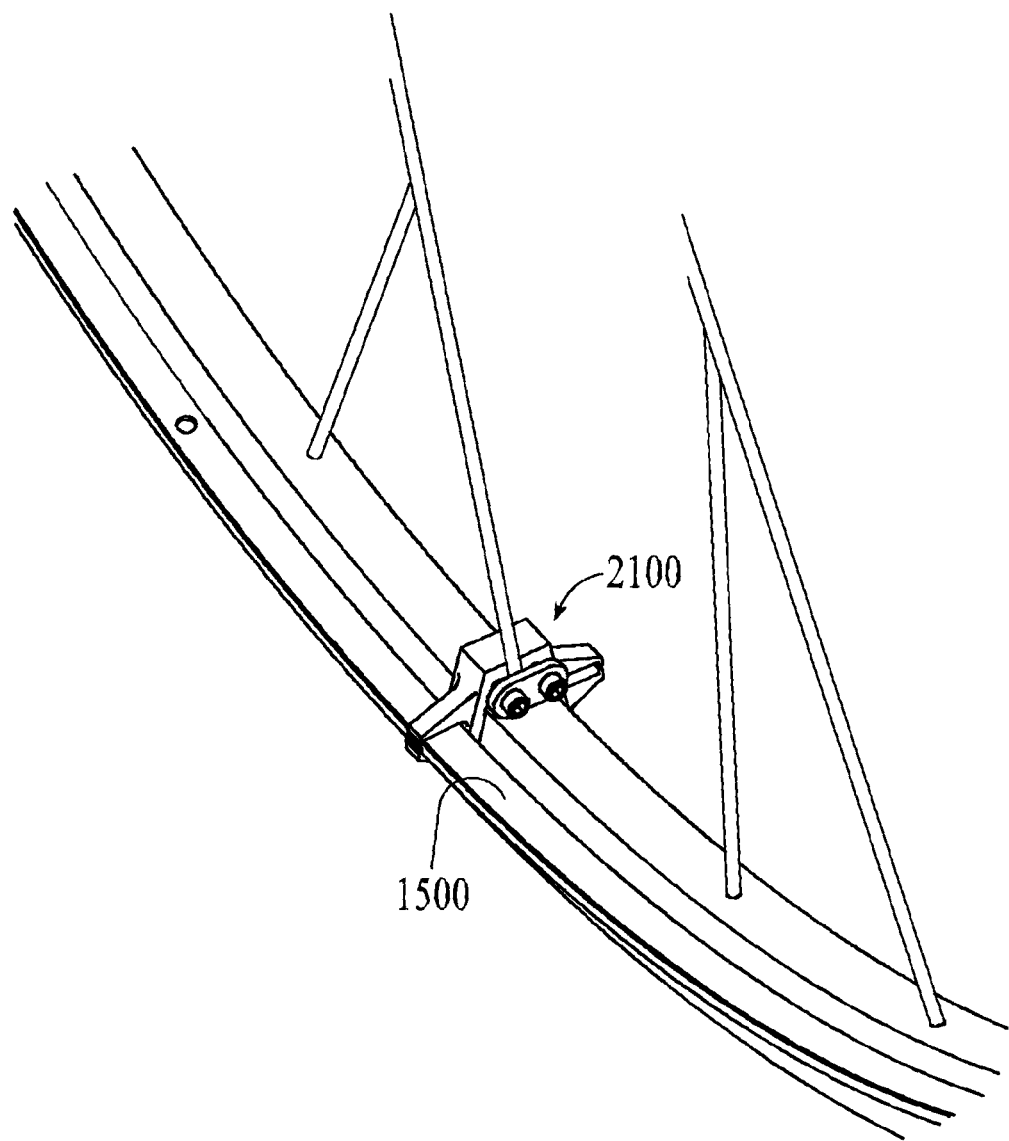
Figure 22:
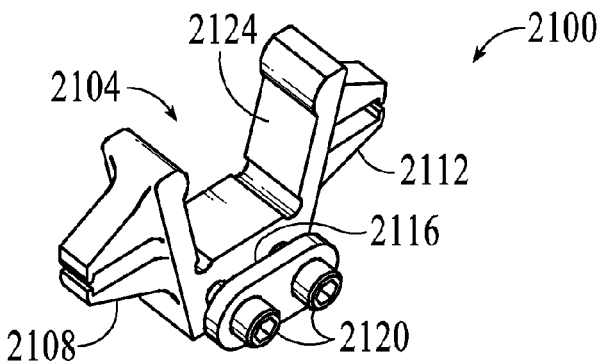
FIG. 22 is a perspective view of the coupling clip according to one embodiment of the invention.
Figure 23:
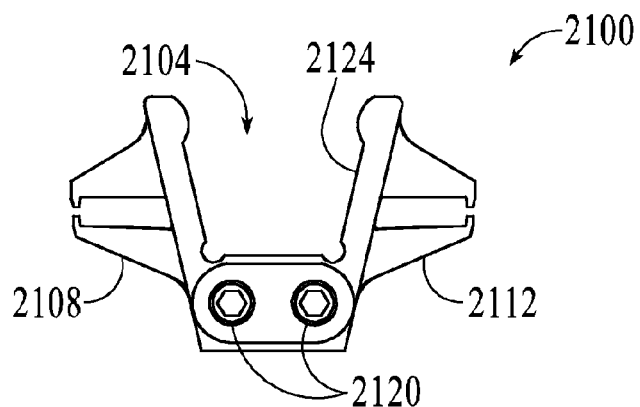
FIG. 23 is an end view of the coupling clip of FIG. 22 according to one embodiment of the invention.
Figure 24:
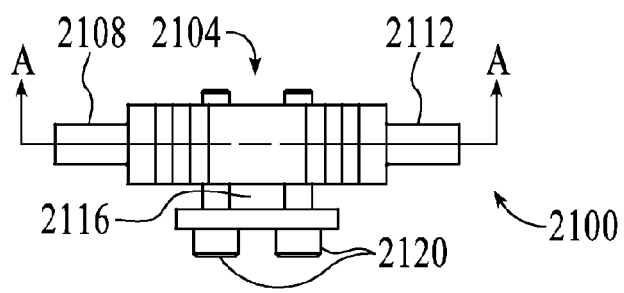
FIG. 24 is a top view of the coupling clip of FIG. 22 according to one embodiment of the invention.
Figure 25:
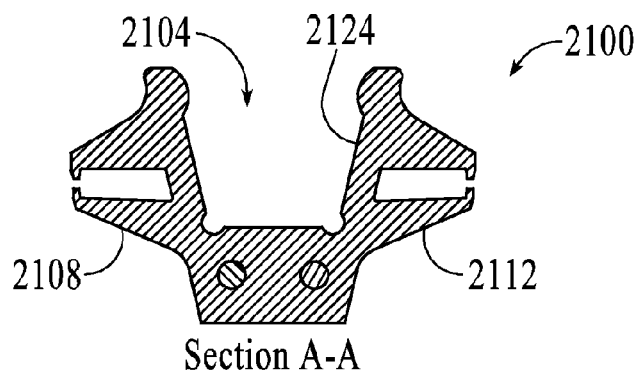
FIG. 25 is a cross-sectional view of the coupling clip of FIG. 22 according to one embodiment of the invention.

In some embodiments, the ring 1500 is mounted to the wheel 104, 108 using a mechanical fastener 1900 that allows the ring 1500 to be coupled to various types of wheels, as shown in FIGS. 19-20. Bicycle wheels, for example, are typically defined by the rim cross-sectional shape, the thickness of the rim, the number of spokes connecting the hub to the rim, and the diameter. In some embodiments, the fasteners 1900 are positioned equally around the circumference of the bicycle wheel 112, 116. It will be appreciated that any number of fasteners may be positioned on the wheel 112, 116, including, for example, any number or range of numbers between about four fasteners and about fifty fasteners, and, more particularly, between about eight fasteners and about sixteen fasteners. It will be appreciated that the number of fasteners may be less than four fasteners or more than fifty fasteners. It will also be appreciated that the fasteners need not be positioned equally around the circumference of the wheel 112, 116. The fasteners 1900 may secure the ring to the spokes of the wheel 112, 116 and/or the rim of the wheel 112, 116.

The fasteners 1900 are used to consistently mount the illumination ring 1500 to the bicycle wheel 112, 116. It will be appreciated that the ability to consistently mount a ring to a bicycle wheel with a high degree of concentricity is advantageous for balancing (since a bicycle wheel spins at a relatively high rate during use, any unbalanced mass can cause very unsafe eccentric vibration of the wheel). In addition, a concentrically mounted ring results in a very smooth and uniform illumination strip during operation.

In some embodiments, the fasteners 1900 are secured to the rim of the wheel 112, 116. Because the rim of the wheel 112, 116 is concentric about the rotation axis of the wheel 112, 116, the fasteners 1900 can be concentrically mounted about the axis of rotation. Because the fasteners 1900 use the spokes as a securing surface and contact the rim of the wheel 112, 116, the ring(s) 1500 can be concentrically mounted about the rotation axis of the wheel 112, 116.

In some embodiments, the fasteners are configured so that two illumination rings can be mounted to the wheel 112, 116. One illumination ring 1500 is positioned on one side of the wheel 112, 116, and the other illumination ring is positioned on the other side of the bicycle. This arrangement (two rings 1500 on either side of the bicycle) allows for side visibility of the rider from either the left or right side of the bicycle. In addition, the rings 1500 can be positioned on the front wheel 112 and rear wheel 112 to provide 360 degrees of visibility (visibility from the front, back and both sides).

FIGS. 21-32 illustrate exemplary clips 2100 that can be used as the fasteners 1900 to mount the illumination ring to the bicycle wheel in accordance with some embodiments of the invention. In some embodiments, the clips 2100 mount the illumination ring 1500 to the wheel 112, 116 using a clamping force around the spokes and/or rim of the wheel 112, 116. The clips 2100 include a wheel securing portion 2104, first ring securing portion 2108 and second ring securing portion 2112.

The wheel securing portion 2104 is used to clamp the clip 2100 to the spoke and/or bicycle rim. The wheel securing portion 2104 includes an opening 2116 and bolts 2120. The spoke is aligned in the opening 2116. The clip may be secured with a pair of bolts 2120 that engage with openings in the wheel securing portion 2104 to apply a clamping force against the spoke. The step of securing the clip against the spoke functions to mechanically couple the clip to the spoke of the wheel. In addition, or as an alternative, the spoke may be inserted into a pre-cut slot (not shown) in the wheel securing portion 2104. It will be appreciated that other coupling mechanisms may be used to secure the clip 2100 to the spoke including, for example, magnets, screws, adhesives, and the like. In an alternative embodiment, the clip 2100 may use a friction fit to securely fit on the spoke (i.e., no additional coupling mechanism needed). The wheel securing portion 2104 also includes an opening 2124. The opening 2124 is configured to be aligned with and contact the rim of the wheel 112, 116.

The illumination ring(s) 1500 are secured to first ring securing portion 2108 and second ring securing portion 2112. The illumination rings are preferably held static by applying a sufficient clamping force by the ring securing portions 2108, 2112. The ring securing portions 2108, 2112 are dimensioned to provide the clamping force. It will be appreciated that other techniques may be used to secure the ring in the ring securing portions 2108, 2112 including, for example, adhering the ring to the ring clip, mechanical fasteners, magnets, utilizing a high-friction interface between the ring and ring clip, and the like.

Figure 26:
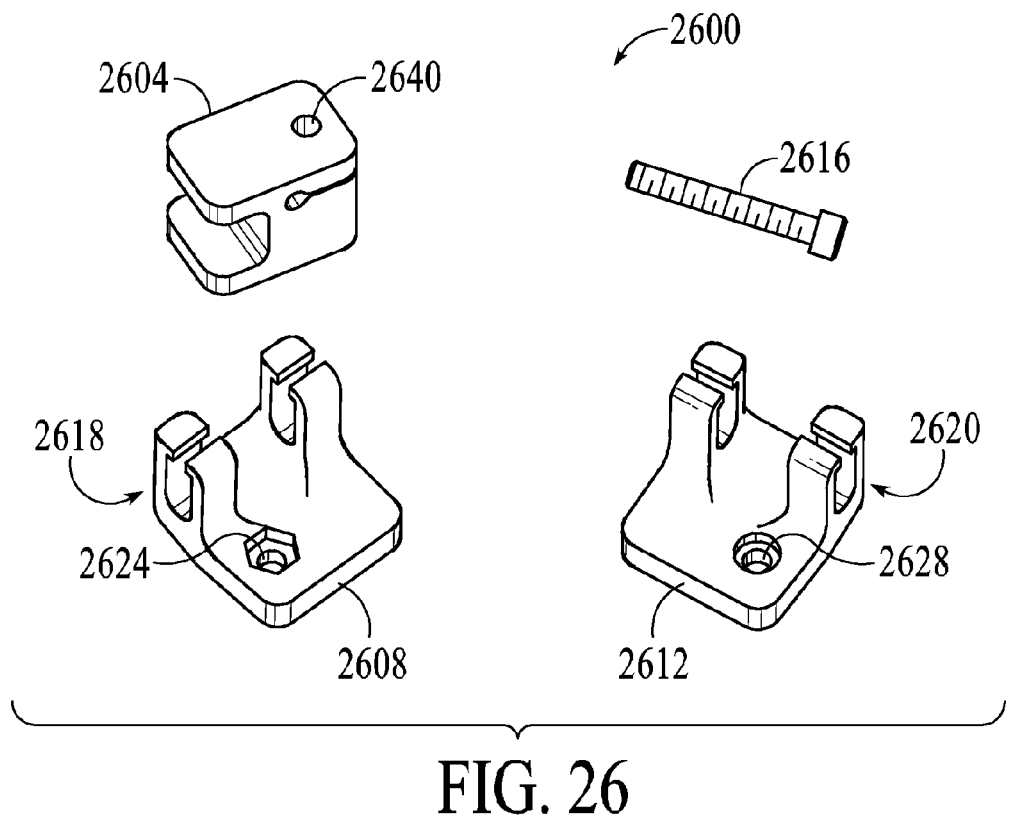
FIG. 26 is a perspective view of a coupling clip according to one embodiment of the invention.
Figure 27:
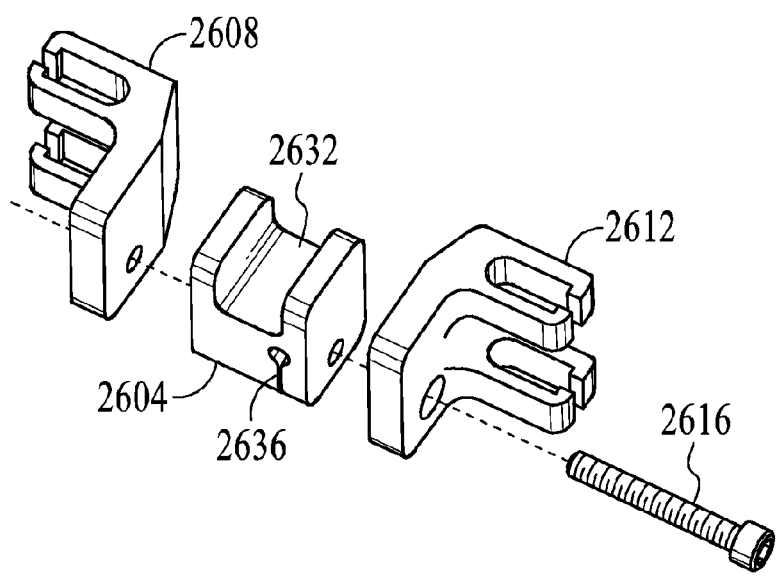
FIG. 27 is a perspective view of the coupling clip according to one embodiment of the invention.
Figure 28:
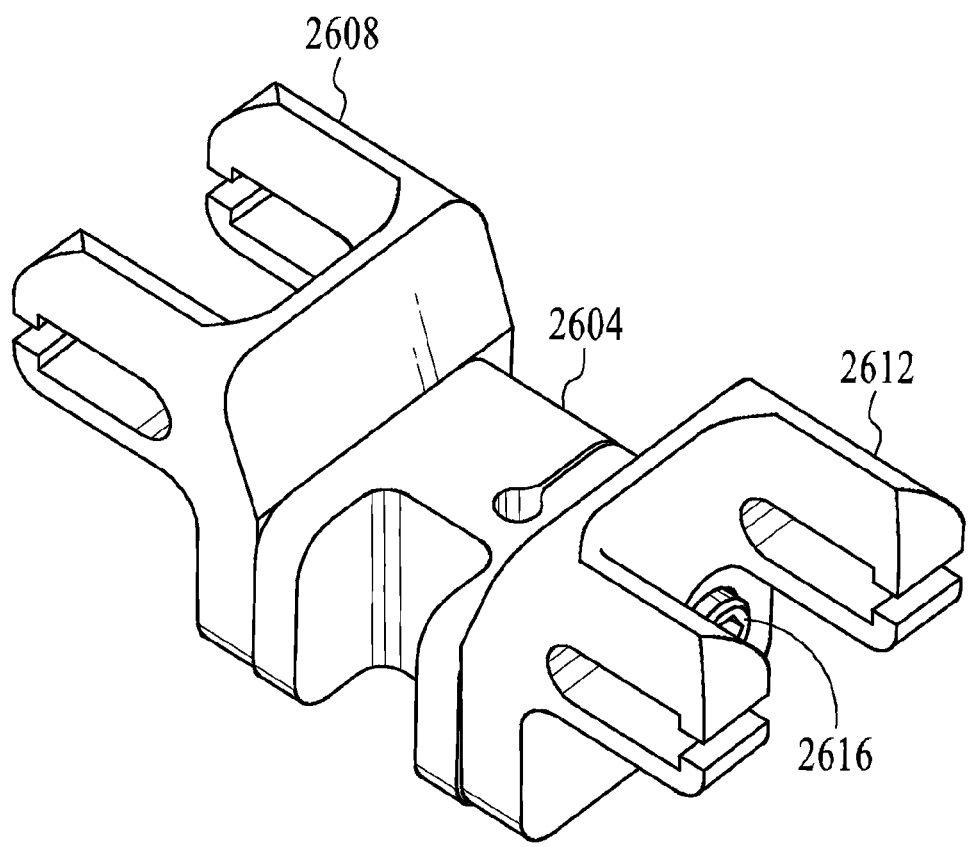
FIG. 28 is a perspective view of the coupling clip of FIG. 28 assembled according to one embodiment of the invention.

As shown in FIGS. 26-28, the fasteners 1900 are clips 2600 that are made of three components 2604, 2608, 2612 that are assembled together using a mechanical fastener 2616 (e.g., screw, bolt, etc). Components 2608, 2612 include ring supports 2618, and 2620 that are configured to receive and support an illumination ring 1500. Components 2608, 2612 also include openings 2624, 2628 through which the fastener 2616 is inserted. As shown in FIG. 27, component 2604 includes an opening 2632, a spoke opening 2636 that is configured to receive a spoke of the wheel 112, 116, and a fastener opening 2640 through which the fastener 2616 is inserted. The opening 2632 is configured to allow the user to squeeze the base to open the spoke opening 2636 so the spoke can more easily fit into the spoke opening 2636. As shown in FIG. 28, the components 2604, 2608 and 2612 are fastened together using the fastener 2616, which is inserted through the openings 2624, 2628 and 2640.

Figure 29:
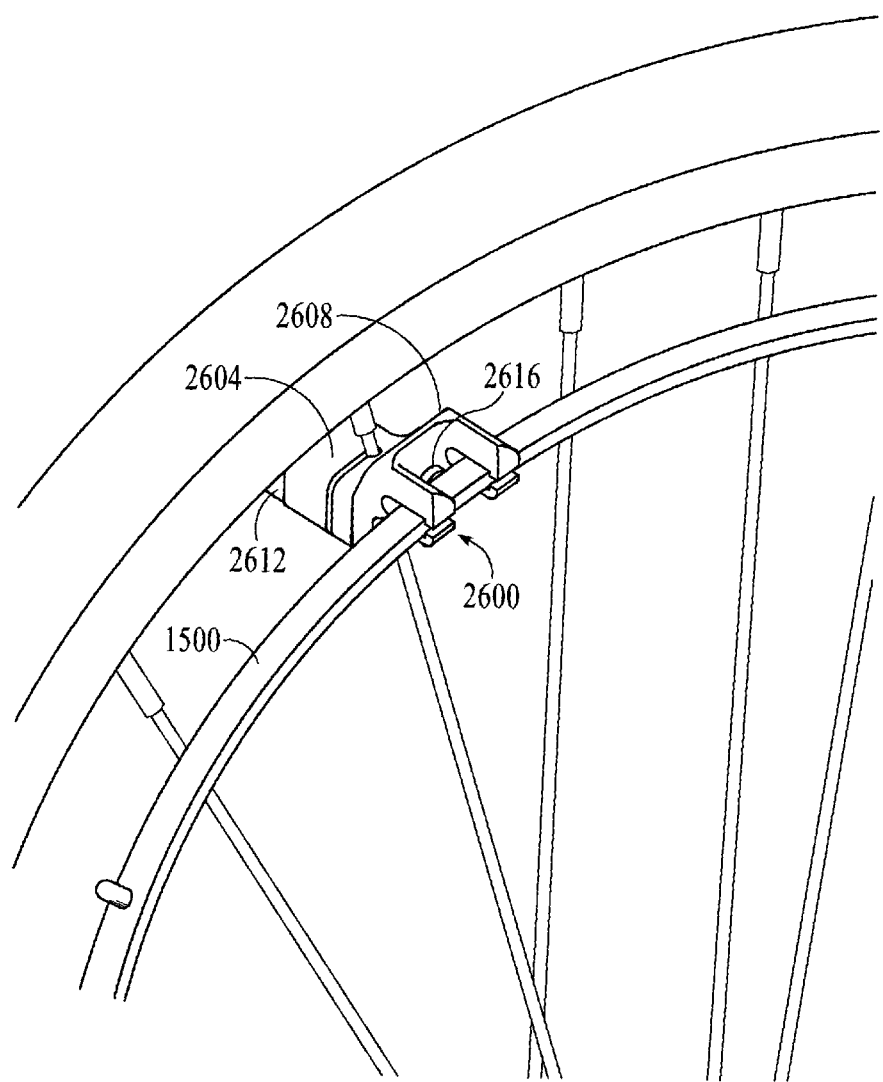
FIG. 29 is a detailed perspective view of the illumination ring secured to the bicycle wheel with the coupling clip according to one embodiment of the invention.
Figure 30:
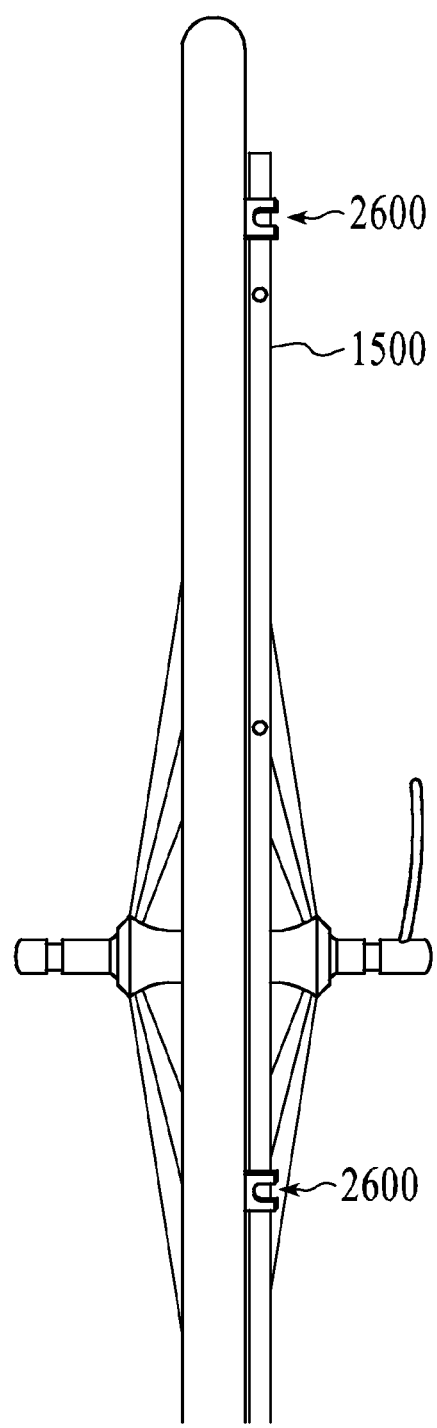
FIG. 30 is a detailed rear view of the illumination ring secured to the bicycle wheel with the coupling clip according to one embodiment of the invention.
Figure 31:
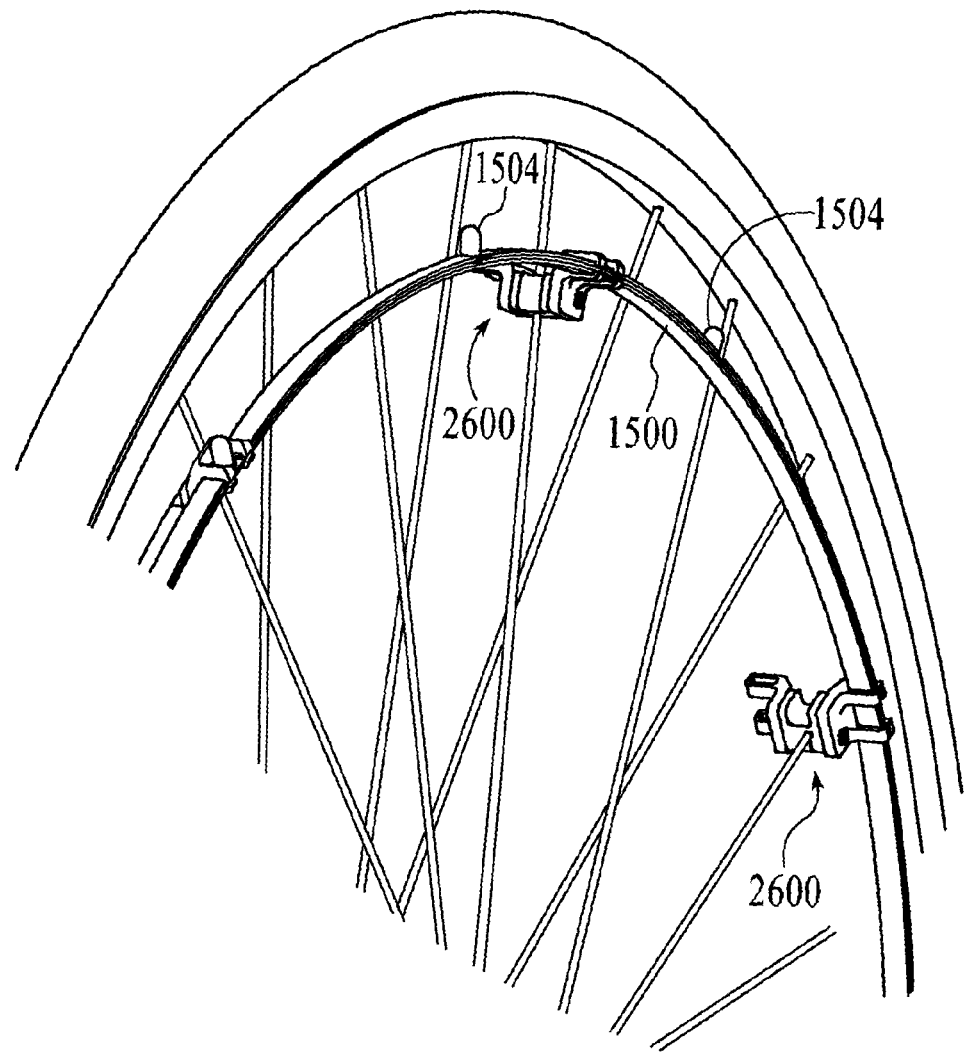
FIG. 31 is a detailed perspective view of the illumination ring secured to the bicycle wheel with several coupling clips according to one embodiment of the invention.

The components 2604, 2608 and 2612 are assembled together and secured to the wheel 108, 112, as shown in FIGS. 29-31. In particular, a spoke of the wheel is inserted into the spoke opening 2636. The fastener 2616 is then used to secure the components 2604, 2608 and 2612 together and provide a clamping force to secure the clip 2600 in place.

As shown in FIGS. 29-31, the clips 2600 are used to secure the illumination ring 1500 so that it is offset from the center plane of the wheel 112, 116. As shown in FIGS. 29-31, the offset provides sufficient visibility and light projection (without the wheel blocking the light) forward and to the side for the front wheel 112 and rearward and to the side for the back wheel 112. In addition, one illumination ring 1500 can be positioned on one side of the wheel 112, 116, and the other illumination ring is positioned on the other side of the bicycle in the ring supports 2616, 2618. This arrangement (two rings 1500 on either side of the bicycle) allows for side visibility of the rider from either the left or right side of the bicycle. The bicycle lighting system 100 can, therefore, provide 360 degrees of visibility (visibility from the front, back and both sides).

Figure 32:
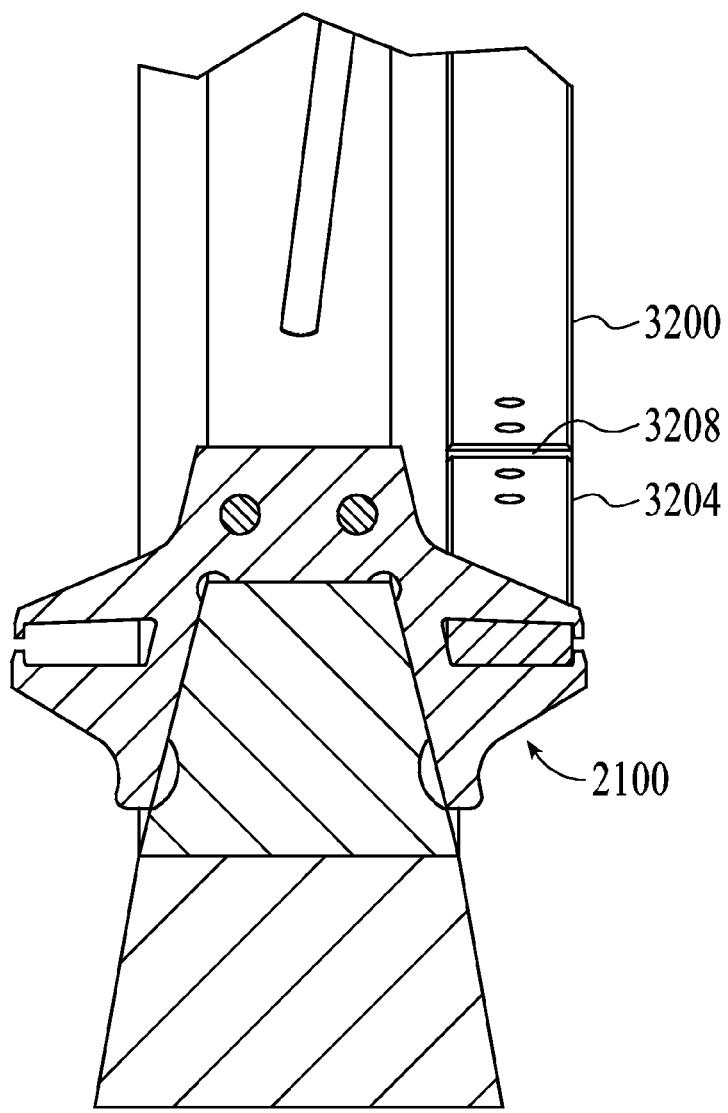
FIG. 32 is a detailed cross-sectional view illustrating the coupling clip attached to the bicycle wheel and supporting the illumination ring according to one embodiment of the invention.
Figure 33:
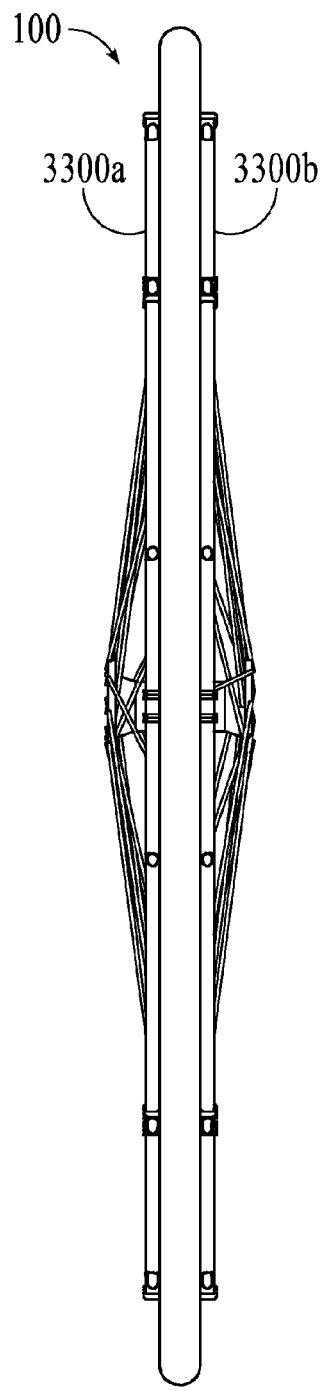
FIG. 33 is an end view of a bicycle wheel with illumination rings coupled to both sides of the bicycle wheel according to one embodiment of the invention.
Figure 34:
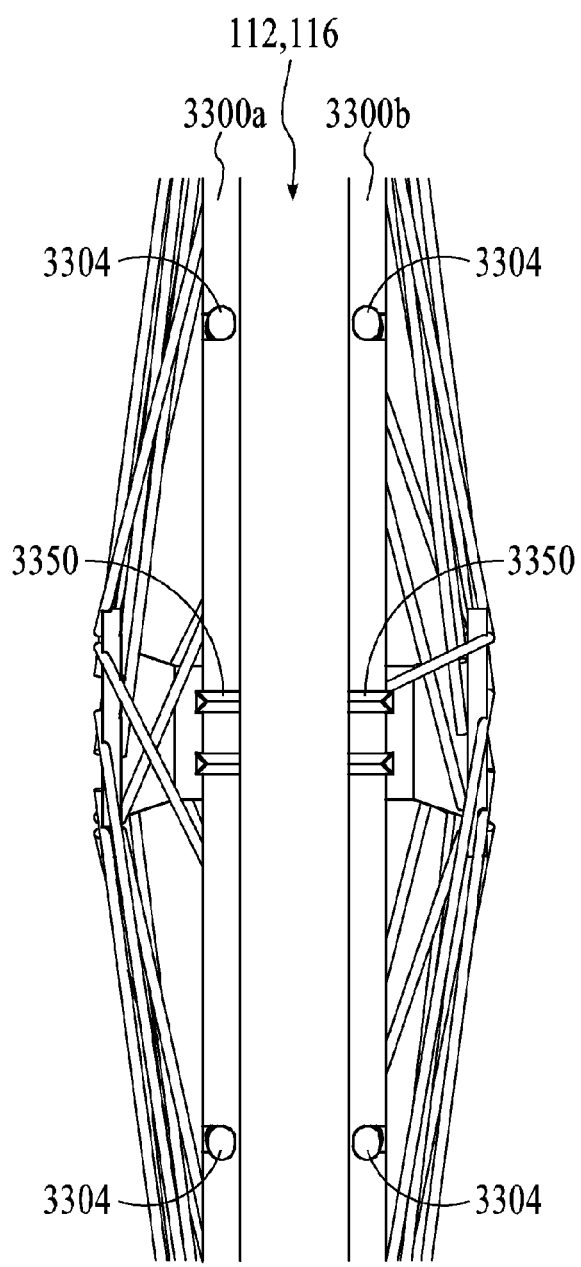
FIG. 34 is a detailed end view of the bicycle wheel with illumination rings coupled to both sides of the bicycle wheel according to one embodiment of the invention.
Figure 35:
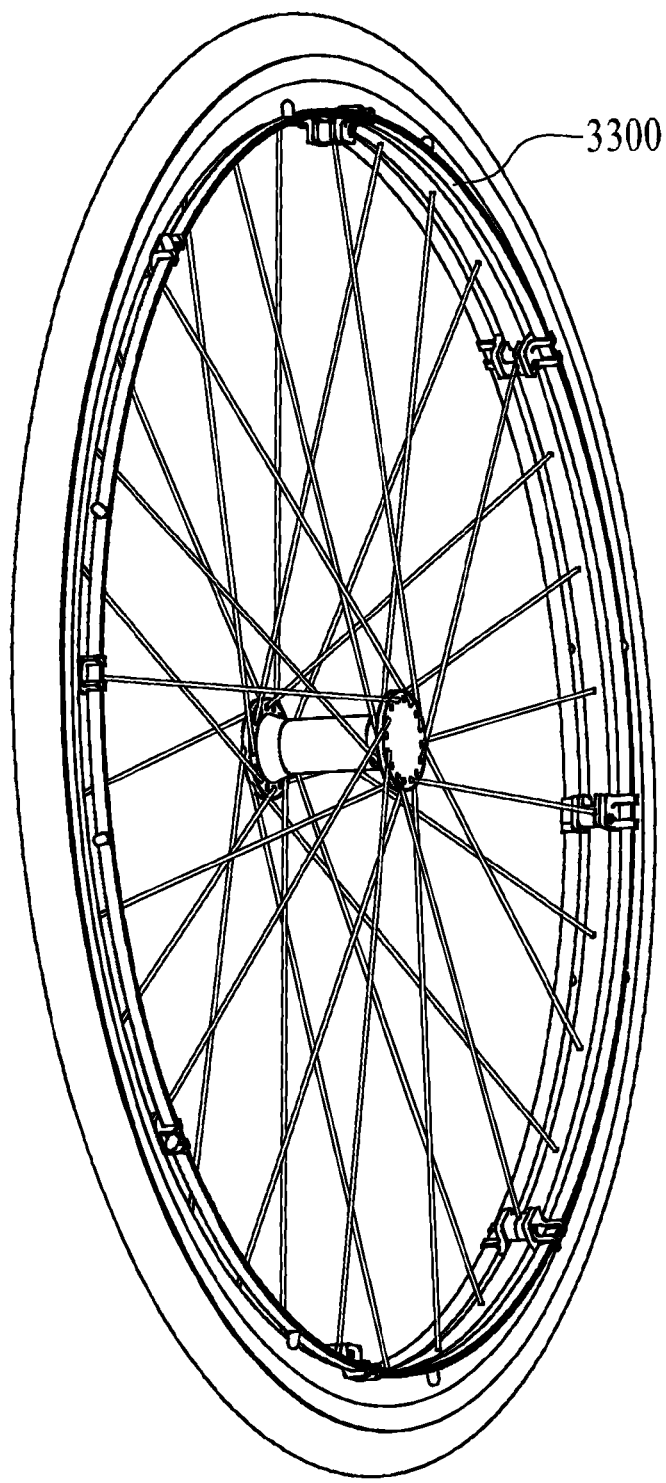
FIG. 35 is a perspective view of the illumination ring coupled to the rim of the bicycle wheel according to one embodiment of the invention.
Figure 36:
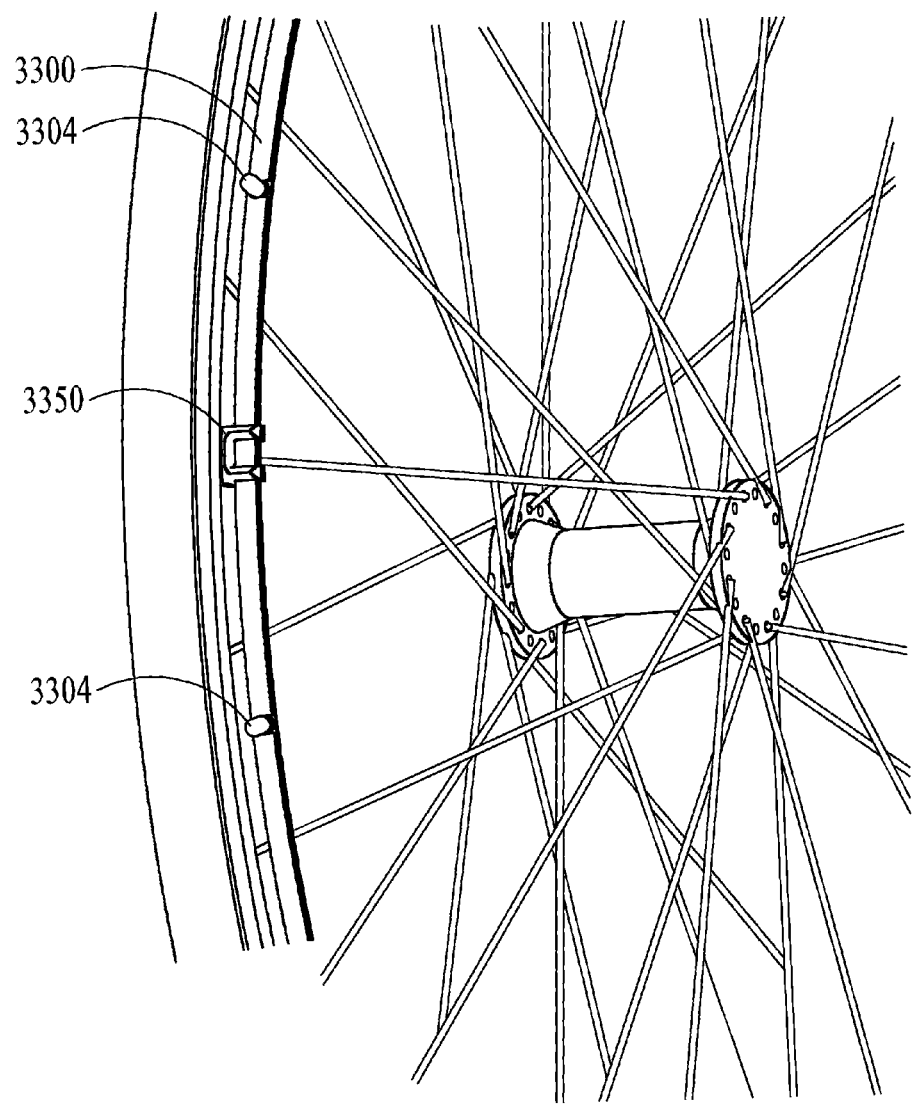
FIG. 36 is a detailed perspective view of the illumination ring coupled to the rim of the bicycle wheel according to one embodiment of the invention.
Figure 37:
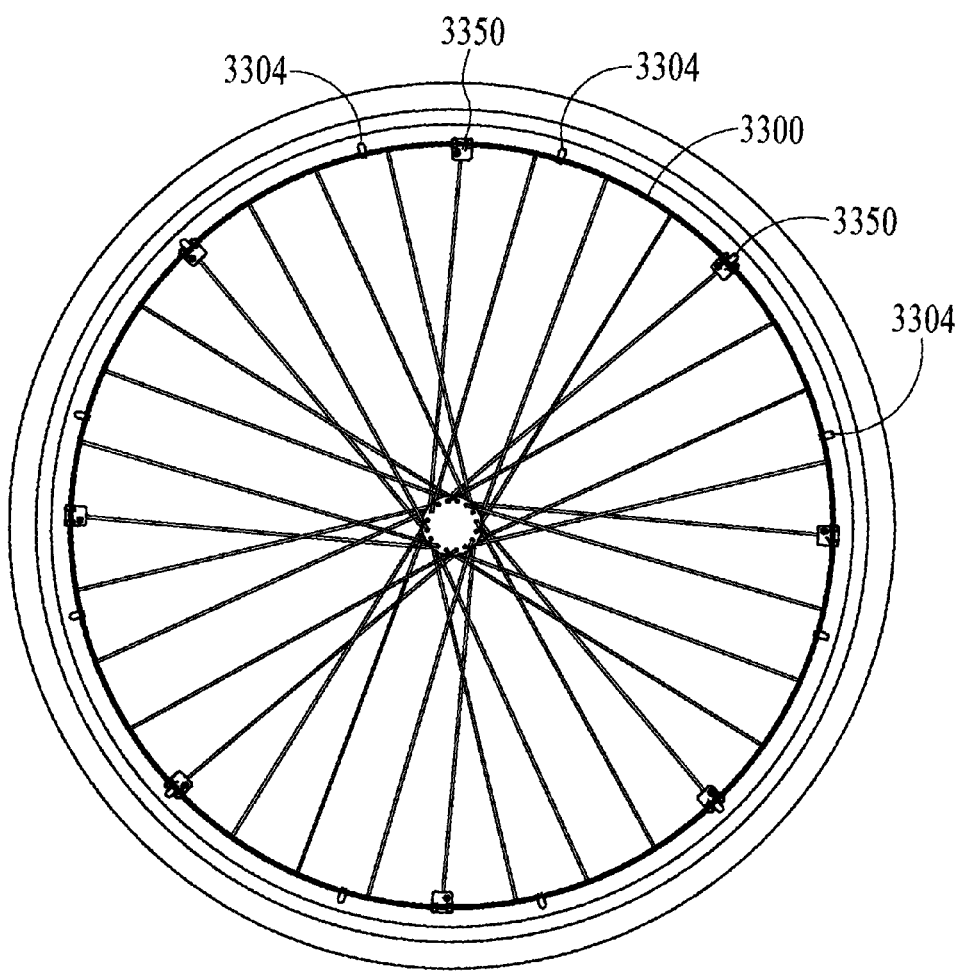
FIG. 37 is a side view of the illumination ring coupled to the rim of the bicycle wheel according to one embodiment of the invention.

To account for bicycle wheels of varying diameters, in some embodiments, the diameter of the illumination ring may be adjustable, as shown in FIG. 32. An adjustable diameter illumination ring 3200 is adjustable by an amount sufficient to account for common differences in radial positions of clip mounting. In some embodiments, this is achieved by making the illumination ring as a non-continuous circle. The illumination ring may include a small overlapping section 3204 which may be secured using mechanical fasteners 3208 at the illumination ring break. In operation, the mechanical fastener can be loosened, the illumination ring diameter expanded or contracted, the ring attached to the wheel spoke clips (e.g., clips 2100), and the mechanical fasteners secured to lock the illumination ring.

FIGS. 33-37 illustrate a bicycle lighting system 100 in accordance with another embodiment of the invention. The bicycle lighting system 100 shown in FIGS. 33-37 includes two illumination rings 3300a, 3300b (collectively, illumination ring 3300) mounted to the wheel 112, 116. The illumination ring 3300 provides a support structure for the lights 3304. In some embodiments, the ring 3300 is a rolled aluminum sheet metal ring. It will be appreciated that the ring 3300 may be made of other metals or hard plastics that provide sufficient rigidity.

Multiple lights 3304 are positioned on the ring 3300. In some embodiments, the lights 3304 are positioned equally around the circumference of the bicycle wheel 112, 116. It will be appreciated that any number of lights 3304 may be positioned on the ring, including, for example, any number or range of numbers between about four lights and about fifty lights, and, more particularly, between about eight lights and about sixteen lights. It will be appreciated that the number of lights 3304 may be less than four lights or more than fifty lights. It will also be appreciated that the lights need not be positioned equally around the circumference of the bicycle wheel 112, 116. In one embodiment, each ring has eight lights, and each light may provide about 16 lumens of light. It will be appreciated that the ring may have less than or more than eight lights, and that each light may provide less than or more than 16 lumens.

In some embodiments, the lights 3304 are affixed to the ring 3300 using a mechanical fastener (e.g., screws, bolts, etc) or adhesives. In other embodiments, the ring 3300 may include openings for each of the lights 3304, and the lights 3304 are secured in the openings by a friction fit or interference fit. It will be appreciated that other means may be used to secure the lights 3304 to the ring 3300.

The bicycle lighting system 100 also includes a controller described in further detail with reference to FIGS. 41-42 hereinafter. The bicycle lighting system 100 also includes a power source. In one embodiment, the power source is a battery pack of three AAA batteries in series. In some embodiments, the bicycle lighting system includes polymer lithium-ion batteries that are bracket-mounted to the front and rear hub to supply power to the lights and/or controller. The batteries are slim and lightweight, and can be charged via a USB interface. It will be appreciated that the power source need not be the battery pack and can be any power source that provides sufficient voltage and current for the bicycle lighting system 100 to operate. In some embodiments, the power source is mounted to the ring 3300. Alternatively, the power source may be mounted in the hub as described above.

Figure 38:
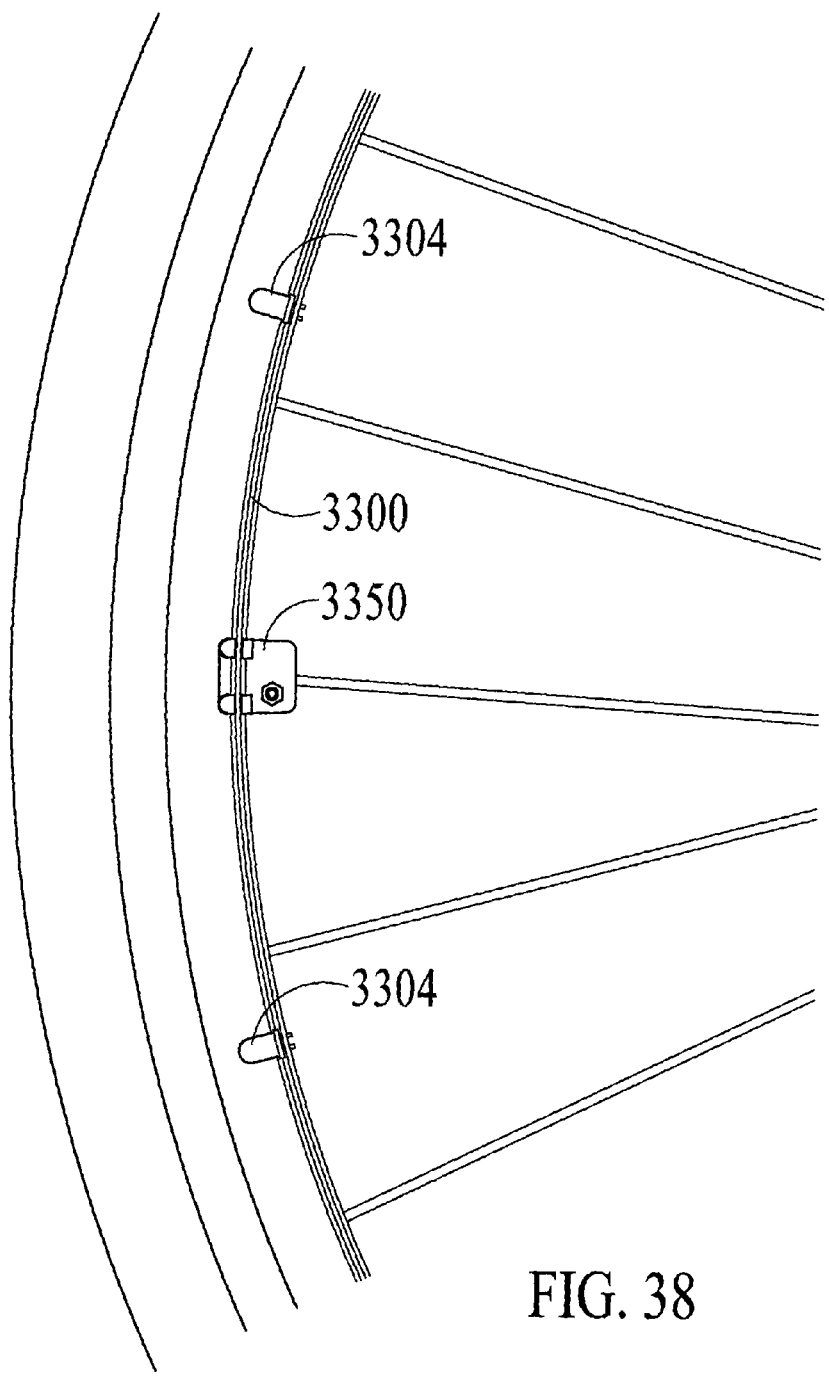
FIG. 38 is a detailed side view of the illumination ring coupled to the rim of the bicycle wheel according to one embodiment of the invention.
Figure 39:
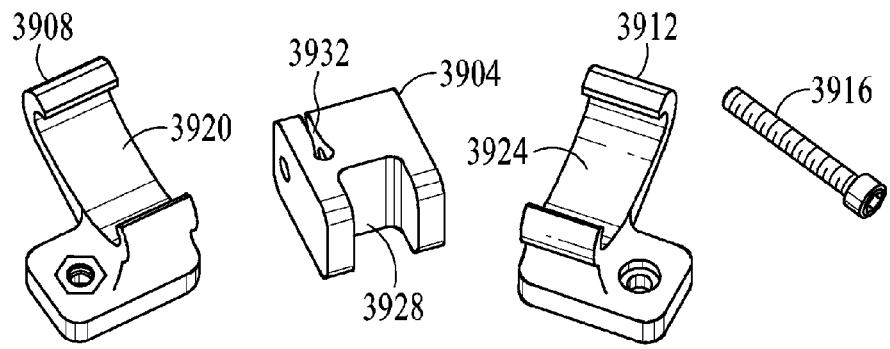
FIG. 39 is a perspective view of components of a coupling clip according to one embodiment of the invention.
Figure 40:
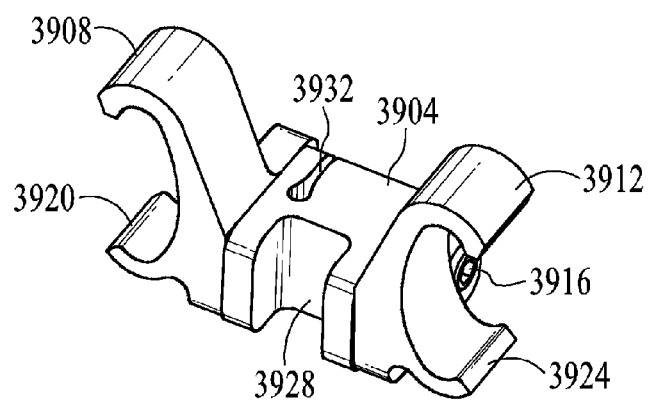
FIG. 40 is a perspective view of an assembled coupling clip according to one embodiment of the invention.

The ring 3300 may be secured to the wheel 112, 116 using fasteners 3350, as shown in FIG. 38. FIGS. 39-40 illustrate fasteners 3350 for mounting the illumination ring 3300 on various sizes and styles of bicycle wheel rims. The fastener 3350 may be a clip 3900. The clip 3900 includes three separate portions: a core 3904, a first side component 3908 and a second side component 3912. The core 3904, first side component 3908 and second side component 3912 are assembled together via a single screw 3916. The ring 3300 may be mounted to the wheel 112, 116 using clamps as described above with reference to FIGS. 11-12. Alternatively, the ring 3300 may be secured to the wheel 112, 116 using clips as described in further detail hereinafter. The clip portions 3904-3912 can rotate to account for different spoke angles. The illumination rings 3300 can be snapped into place into the side components 3908, 3912, respectively.

Figure 41:
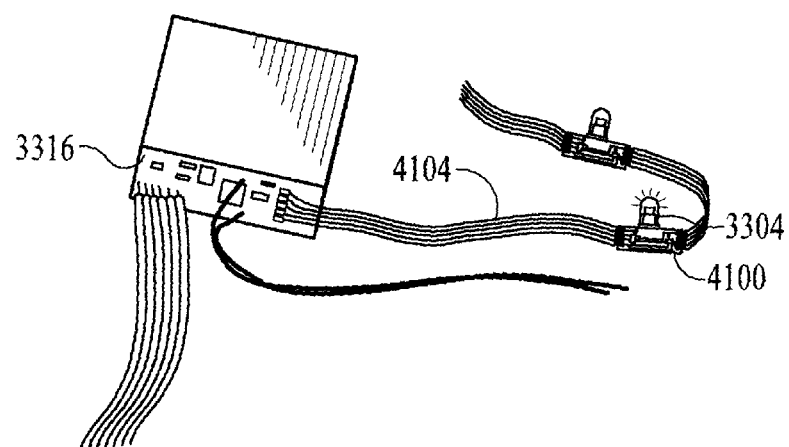
FIG. 41 is a detailed perspective view of a controller for the illumination ring according to one embodiment of the invention.
Figure 42:
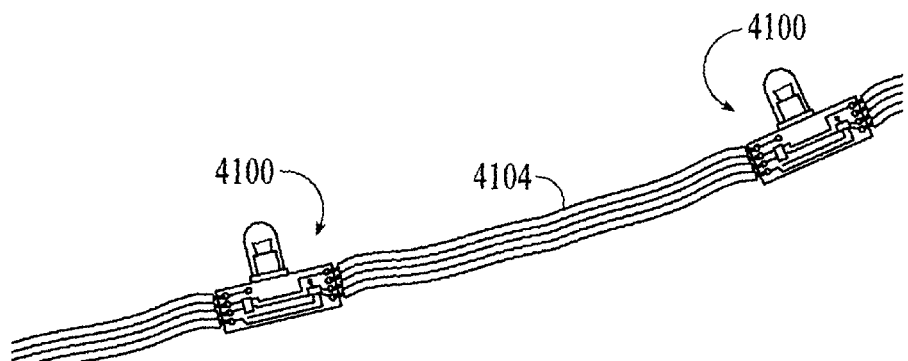
FIG. 42 is a detailed perspective view of the lights of the illumination ring according to one embodiment of the invention.

FIGS. 41-42 illustrate a controller 3316 that is mounted to the ring 3300. The controller 3316 is connected to light controllers 4100. A thin cable (e.g., a flex circuit cable) 4104 connects the light controllers 4100 and the controller 3316. In one embodiment, the controller 3316 is a master switch, and the light controllers 4100 are switches that are individual to each light. In one embodiment, the controller 3316 controls the illumination pattern of the ring 3300 by sending pattern data to the light controllers 4100. The light controllers 4100 then switch the lights 3304 on and off in accordance with the pattern data.

In some embodiments, the controller 3316 controls the on/off state of the lights 1504 in accordance with the methods described above with reference to, for example, FIGS. 5 and 6. The controller 3316 may include an accelerometer and/or index sensor. In one embodiment, a magnet is also mounted to the fork of the bicycle to provide the signal used by the index sensor to time the wheel rotation as described above. As explained above, the controller is programmed, in some embodiments, so that the lights of the illumination ring appear as an arc of light to an observer of the bicycle.

As described above, the power source may be a battery that is mounted to the ring 3300 or mounted in the hub and coupled to the ring 3300. In other embodiments, the ring 3300 itself may include the power source. For example, one or more copper coils may be embedded in the ring 3300. A magnet may be positioned on the frame of the bicycle so that an electric field is generated perpendicular to the plane of the coils, so that the coils can generate power. A capacitor coupled to the coil(s) can store the power generated and be connected to the lights 3304 and controller 3316. Additional details are disclosed with reference to FIGS. 52A-52F.

Figure 43:
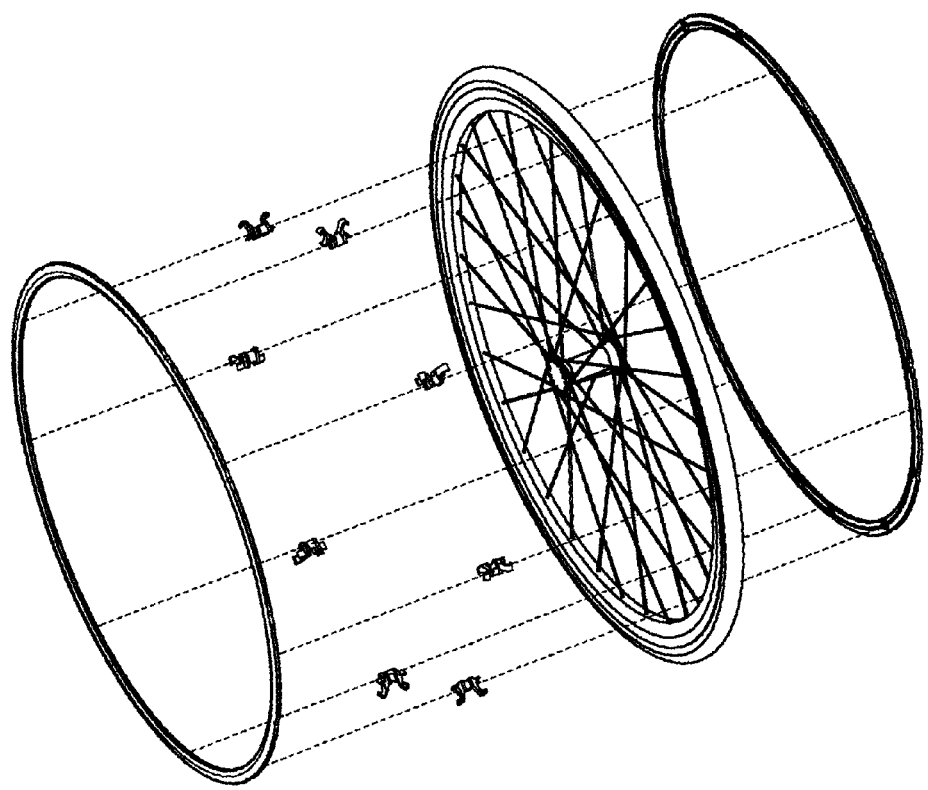
FIG. 43 is a perspective exploded view of the bicycle lighting system according to one embodiment of the invention.

As shown in FIG. 43, clips are attached to the spokes rim of the bicycle wheels. The illumination rings are then snapped into the clips to that are mounted onto the bicycle wheel. In some embodiments, the clips are secured to the bicycle wheel, and then the one or two illumination rings are attached to the clips. In other embodiments, the illumination ring may be mounted to the clips before the clips are mounted to the bicycle wheel. In still other embodiments, the clips may be integral with the illumination ring so that the illumination ring can be directly attached to the bicycle wheel. Similarly, in some embodiments, the lights may be integrated with the illumination ring prior to mounting. Alternatively, the lights may be secured to the illumination ring after mounting.

Figure 44A:
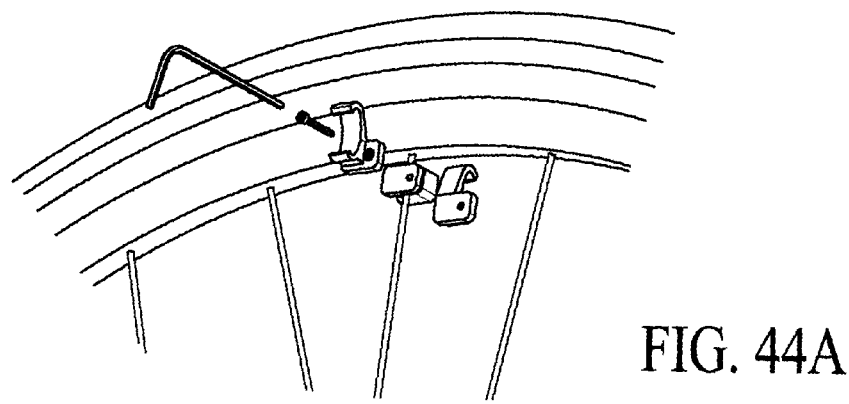
FIGS. 44A-C are detailed perspective views illustrating installation of the illumination rings on the bicycle wheel according to one embodiment of the invention.
Figure 44B:
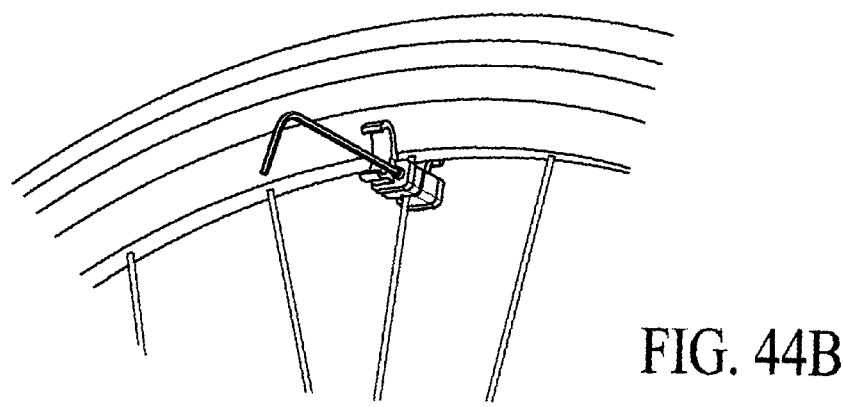
Figure 44C:
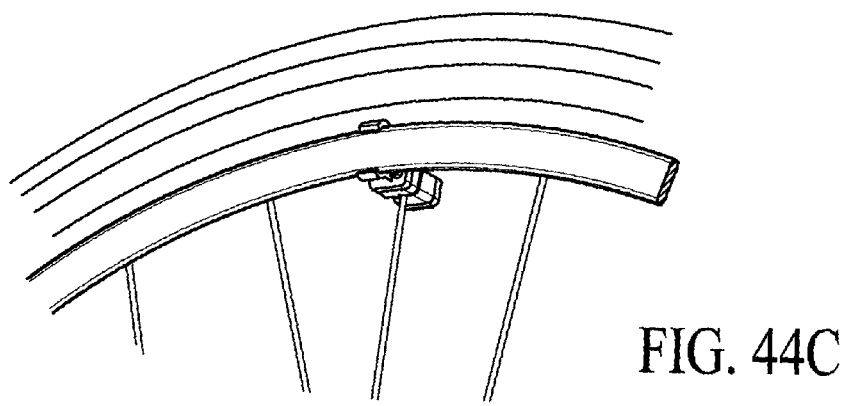
Figure 45:
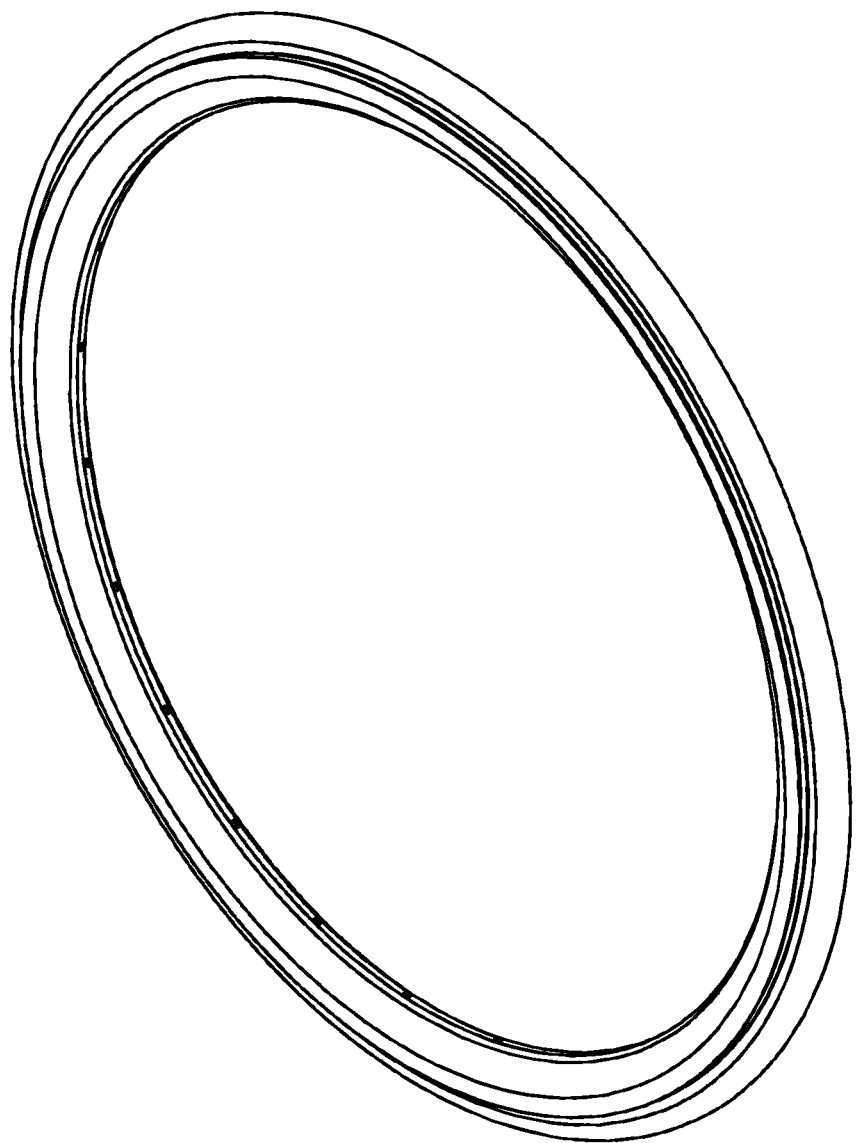
FIG. 45 is a perspective view of the bicycle lighting system built-in to the bicycle frame according to one embodiment of the invention.

FIGS. 44A-C illustrate attachment of the illumination ring to the wheel 112, 116 in further detail according to one embodiment of the invention. Installation of the bicycle lighting system 100 may begin by aligning the clips with the spokes and/or rim, as shown in FIG. 44A. The screws are then tightened to secure the clips to the wheel, as shown in FIG. 44B. The rings are then snapped into the clips, as shown in FIG. 44C. The installation may further include connecting a wire down the length of one spoke of the wheel to connect the lights of the illumination ring to a battery bracket, which is electronically coupled to a battery, and clipping the batteries into the battery bracket. Alternatively, the batteries may be connected to the ring before or after installation, as described above.

Figure 46:
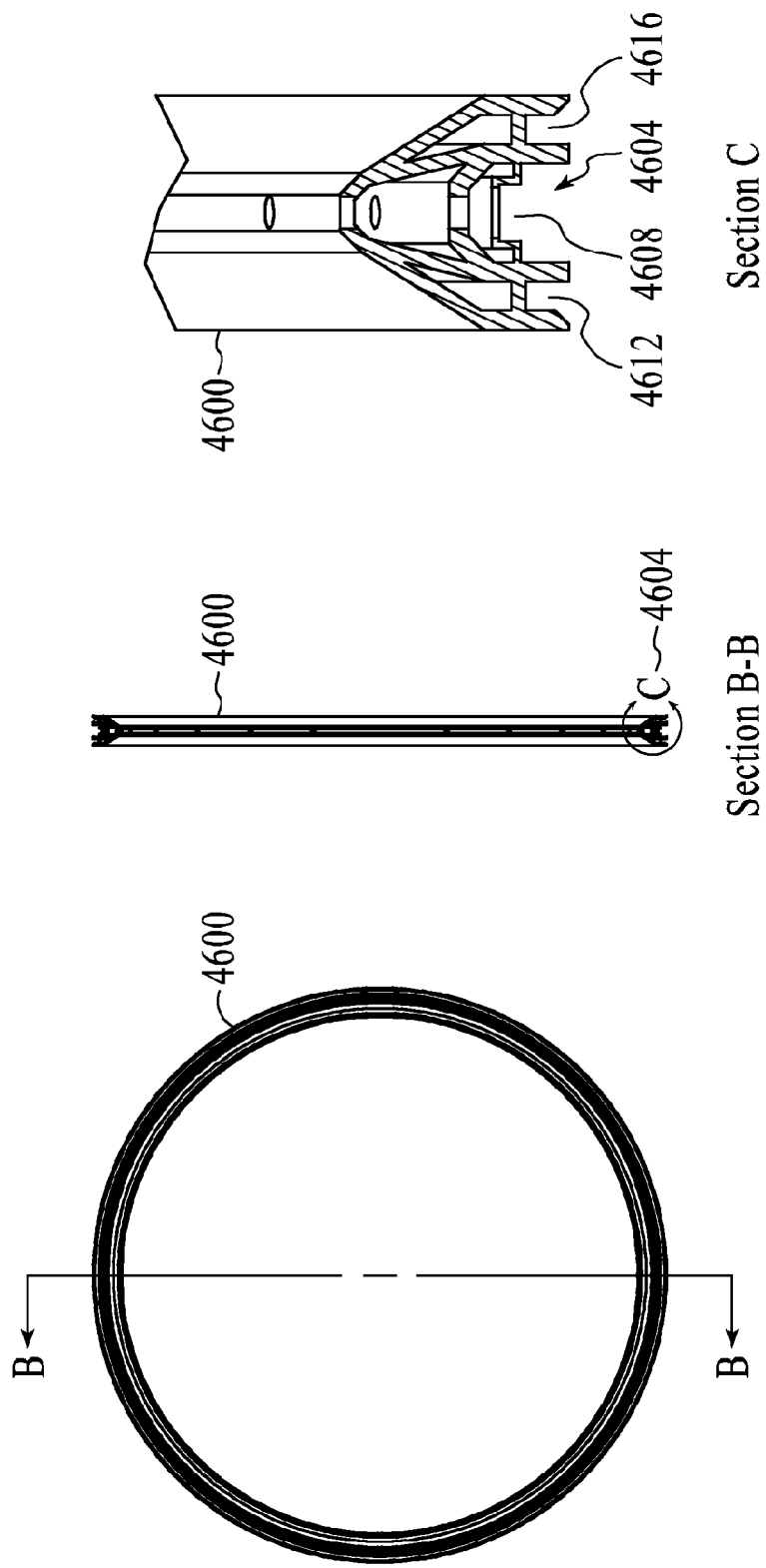
FIG. 46A is a side view of a bicycle wheel having a built-in bicycle lighting system according to one embodiment of the invention.
FIG. 46B is a cross-sectional view of the bicycle wheel having a built-in bicycle lighting system according to one embodiment of the invention.
FIG. 46C is a detailed cross-sectional view of the bicycle wheel having a built-in bicycle lighting system according to one embodiment of the invention.
Figure 47:
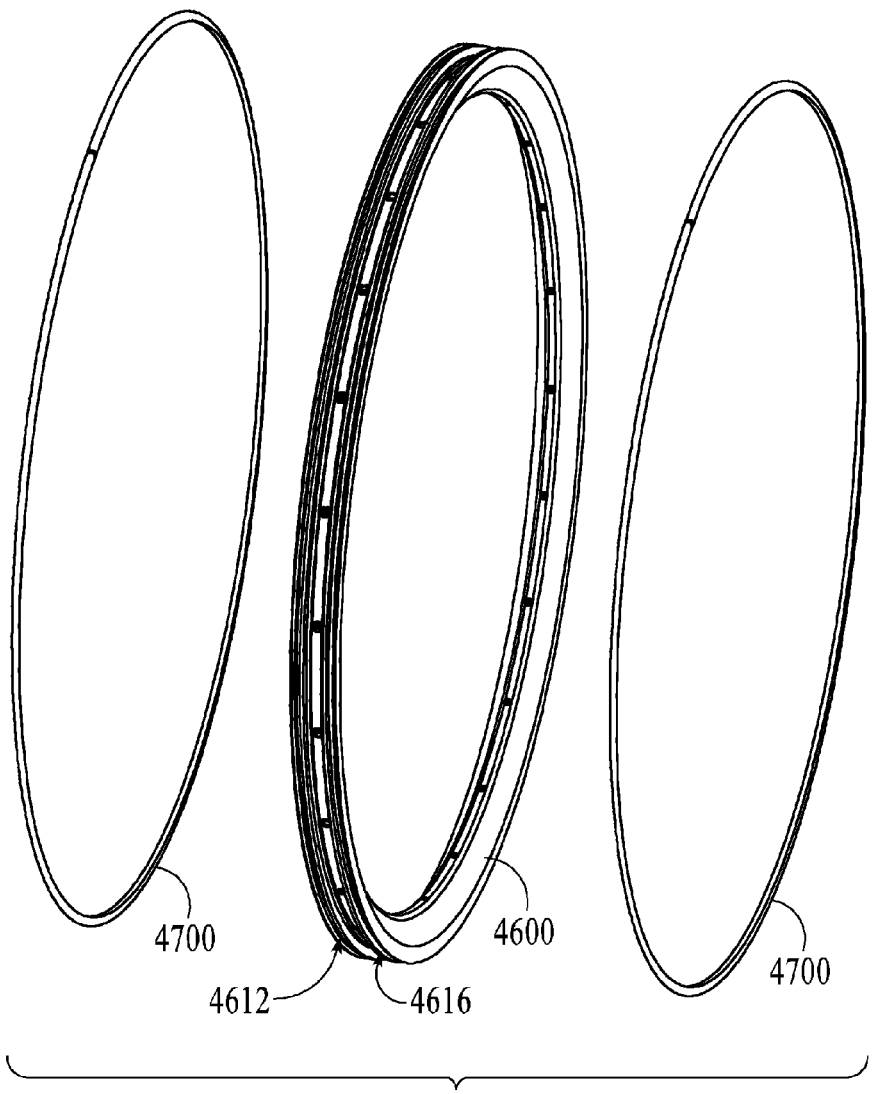
FIG. 47 is an exploded perspective view showing the built-in bicycle lighting system according to one embodiment of the invention.
Figure 48:
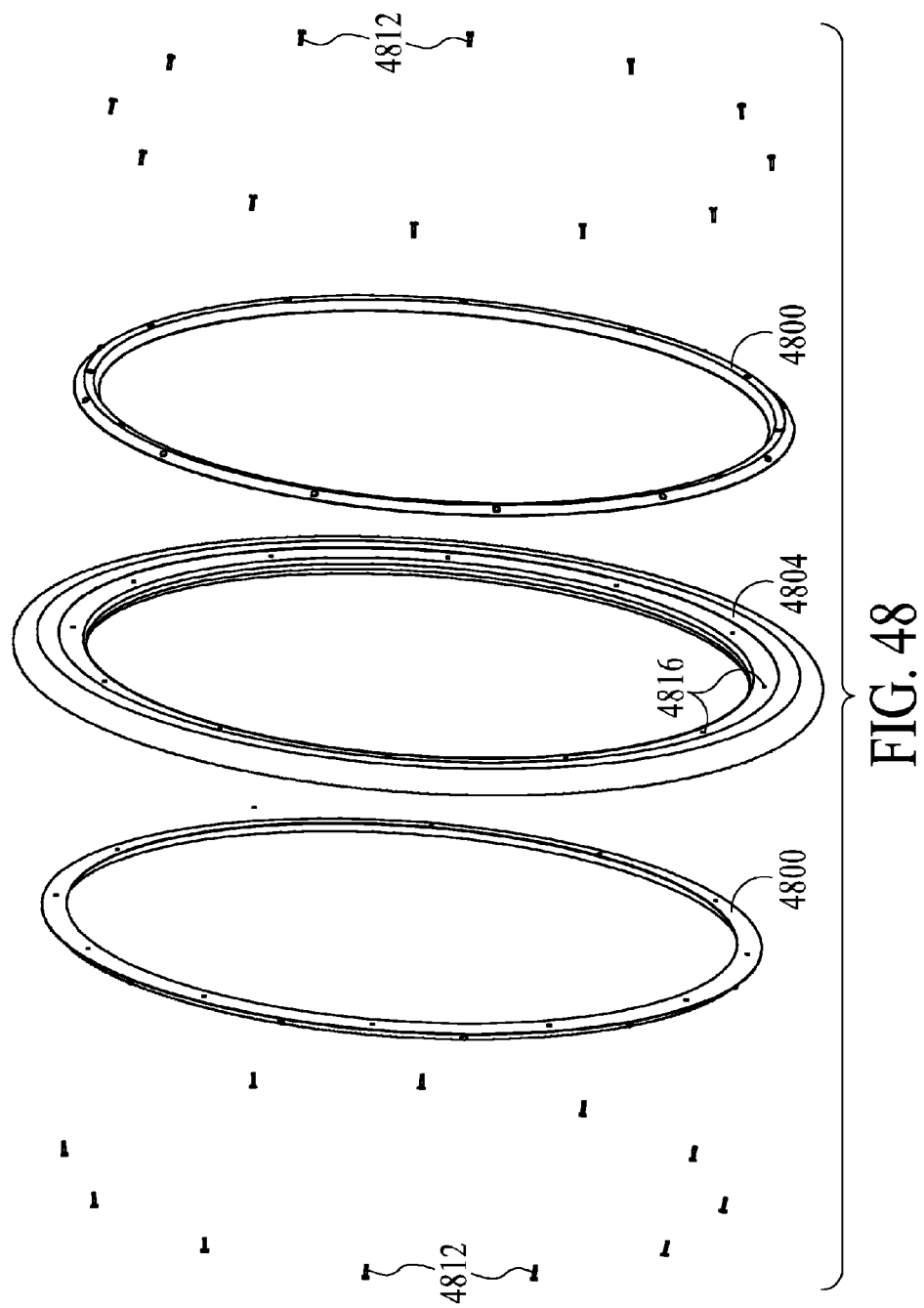
FIG. 48 illustrates an exploded perspective view showing a bicycle lighting system according to one embodiment of the invention.
Figure 52A:
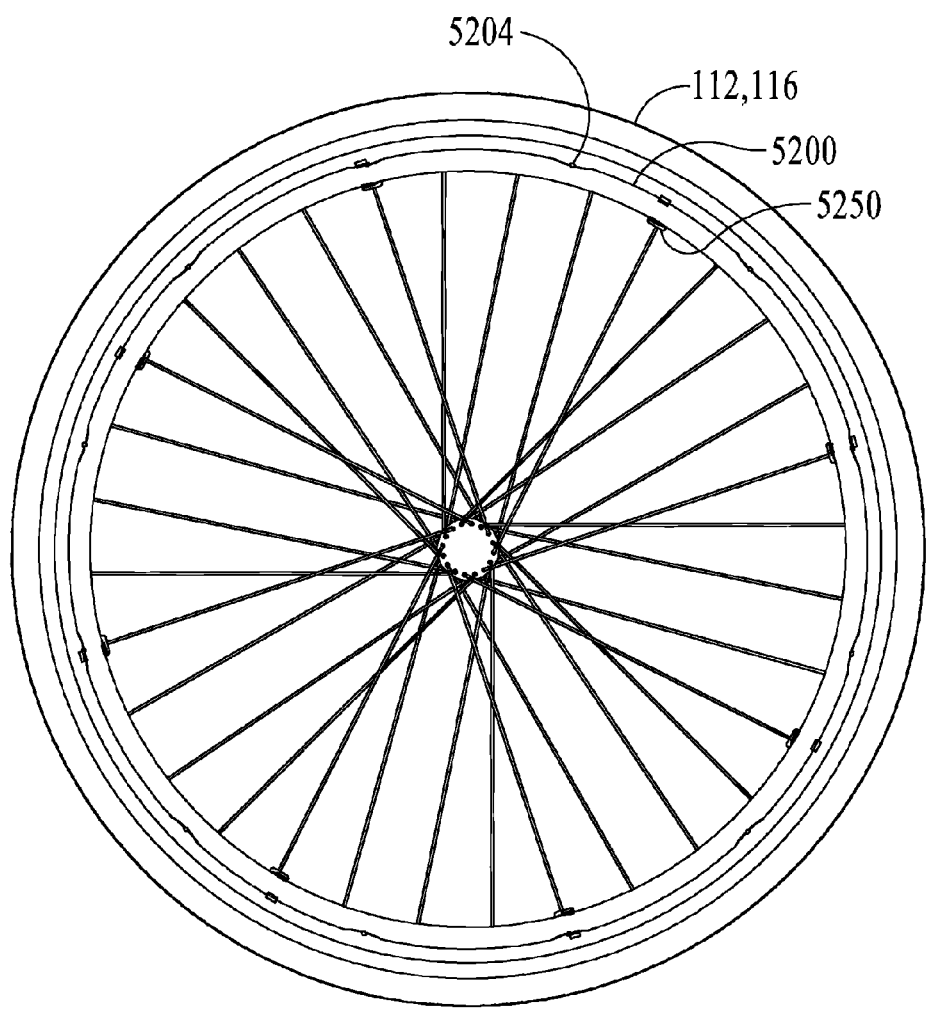
FIG. 52A is a side view of a bicycle wheel with a bicycle lighting system according to one embodiment of the invention.
Figure 52B:
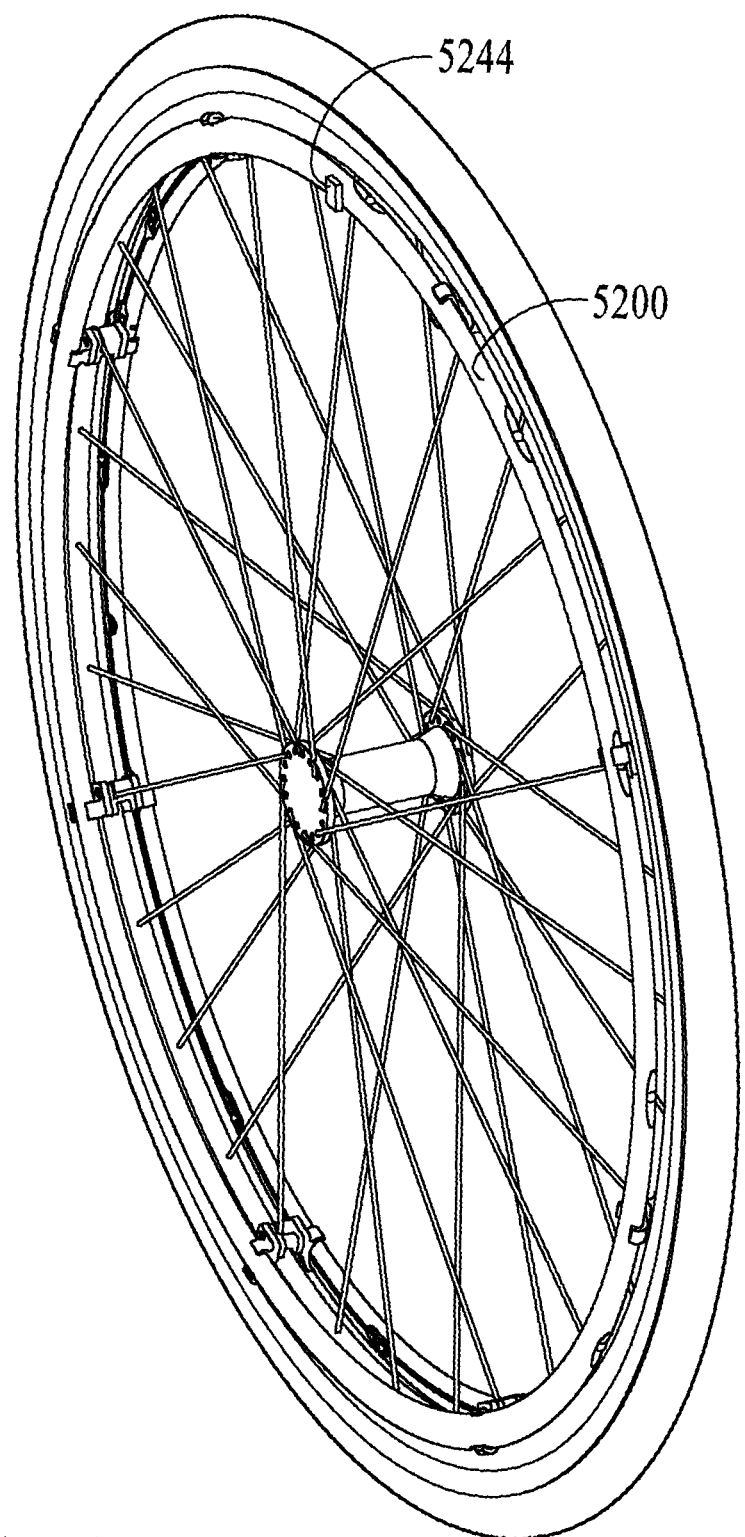
FIG. 52B is a perspective view of the bicycle wheel of FIG. 51A with the bicycle lighting system according to one embodiment of the invention.
Figure 52C:
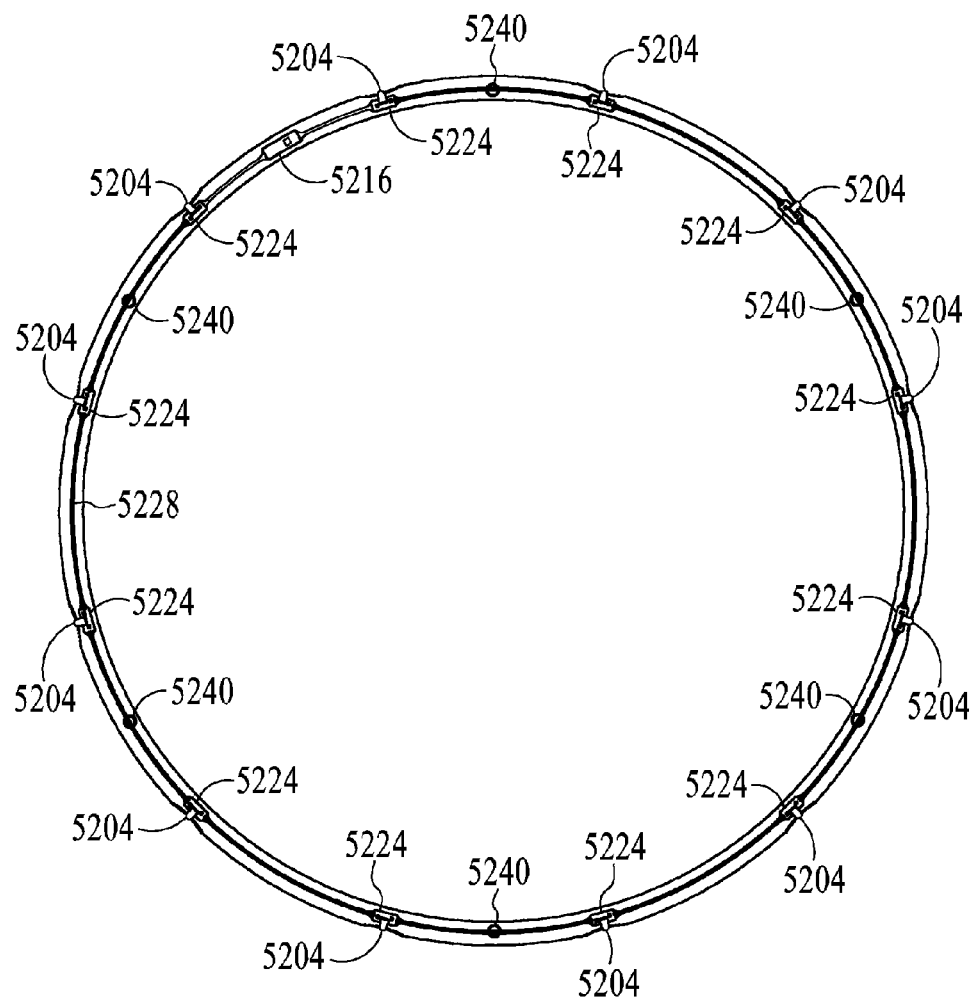
FIG. 52C is a side view of an illumination ring of the bicycle lighting system of FIG. 52A according to one embodiment of the invention.
Figure 52D:
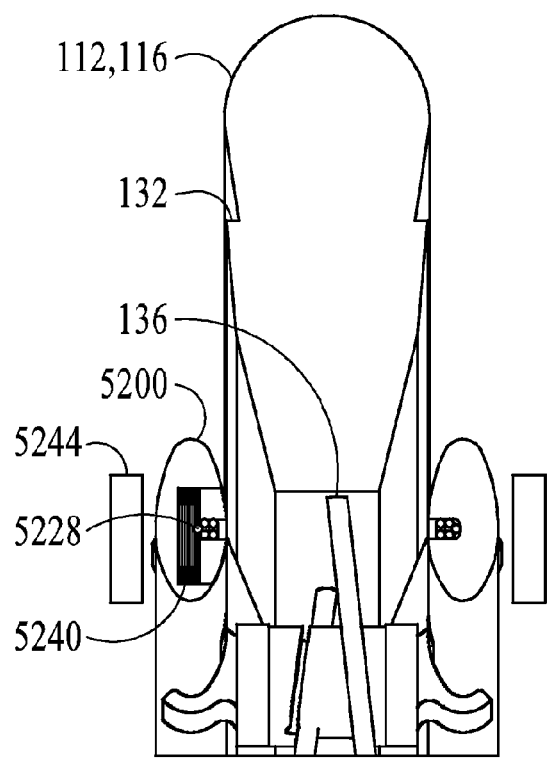
FIG. 52D is a cross-sectional view of the bicycle lighting system of FIG. 52A according to one embodiment of the invention.
Figure 52E:
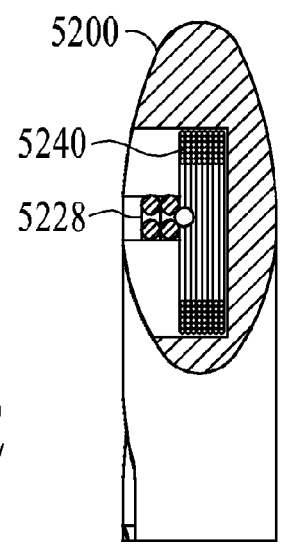
FIG. 52E is a cross-sectional view of the illumination ring of the bicycle lighting system of FIG. 52A according to one embodiment of the invention.
Figure 52F:
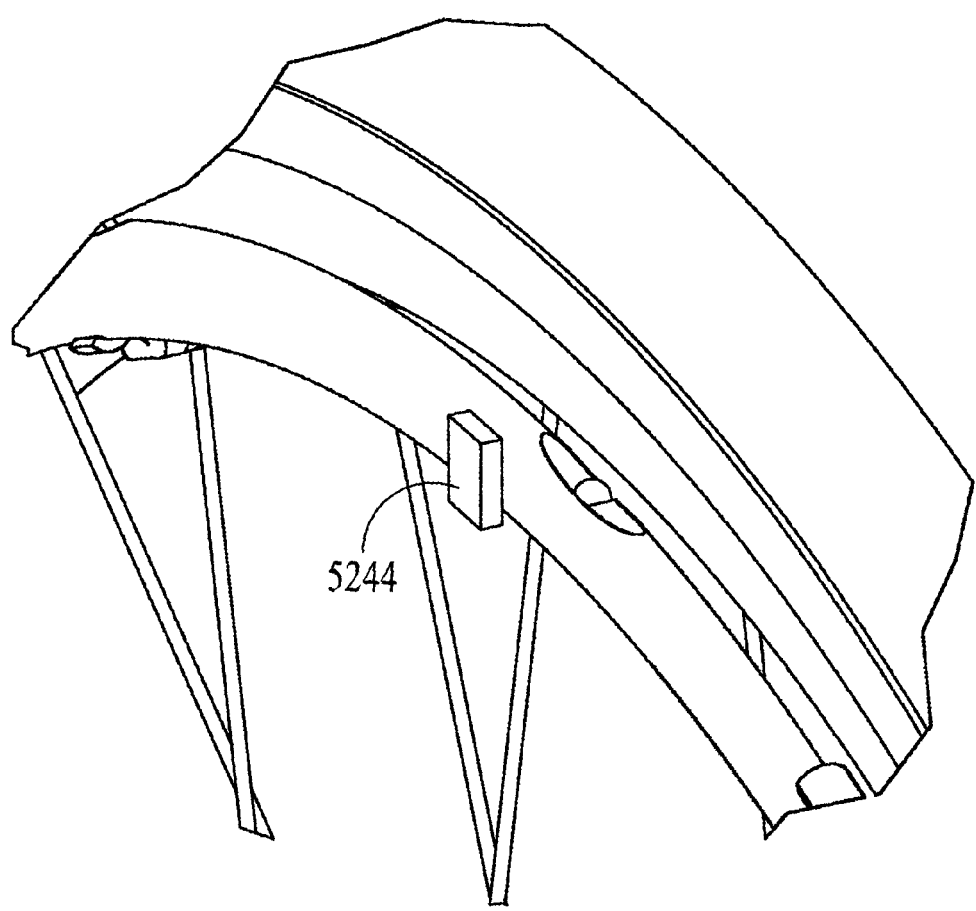
FIG. 52F is a detailed perspective view of the bicycle lighting system of FIG. 52A according to one embodiment of the invention.

FIGS. 45-51A illustrate an alternative embodiment of the bicycle lighting system 100 in which the illumination rings are integrated into the rim of the bicycle wheel. In FIGS. 46A-47, the illumination rings can be snapped into the rim, and, in FIGS. 48-51B, the illumination rings are fastened to the rim using mechanical fasteners. It will be appreciated that other means for securing the illumination rings to the wheel may be employed.

In particular, as shown in FIGS. 46A-46C, the rim 4600 includes a coupling portion 4604. The coupling portion 4604 includes a tire coupling portion 4608, a first illumination ring coupling portion 4612 and a second illumination ring coupling portion 4616. The tire coupling portion 4608 is configured to receive a standard bicycle tire. The illumination ring coupling portions 4612, 4616 are configured to receive illumination rings 4700, as shown in FIG. 47. In one embodiment, the illumination rings 4700 are snap fit into the coupling portions 4612, 4616. An adhesive may be used in addition to as an alternative to a snap fit. In one embodiment, the lights and controller, coupled by the flexible cable, (not the ring itself) may be fit into the coupling portions 4612, 4616.

As shown in FIGS. 48-51C, the illumination rings 4800 may be mounted to the rim 4804 using mechanical fasteners 4812. The rim 4804 includes openings 4816 to receive the fasteners (e.g., screws, bolts, etc.). As shown in FIG. 49B, the rim 4804 includes an attachment area 4900 and a brake area 4904. The attachment area 4900 is separated from the brake area 4904 by a brake clearance area 4912. The brake clearance area 4912 allows the rings 4800 to be attached to the rim 4804 at the attachment area 4900 via the fasteners 4812 without interfering with the bicycle brakes.

FIGS. 52A-52F illustrate an alternative embodiment of the bicycle lighting system 100. The bicycle lighting system 100 of FIGS. 52A-52F includes an illumination ring 5200 having a plurality of lights 5204. The ring 5200 is secured to a wheel 112, 116 by a plurality of fasteners 5250. The ring 5200 may be made of a metal or plastic. In one embodiment, the fasteners 5250 are the clips 3900 described above with reference to FIGS. 39-40. It will be appreciated however that other clips or fasteners may be used to secure the illumination ring to the wheel 112, 116.

Multiple lights 5204 are positioned on the ring 5200. In the embodiment shown in FIGS. 52A-52C, twelve lights 5204 are equally positioned around the circumference of the wheel 112, 116. It will be appreciated that any number of lights 5204 may be positioned on the ring, including, for example, any number or range of numbers between about four lights and about fifty lights, and, more particularly, between about eight lights and about sixteen lights. It will be appreciated that the number of lights 5204 may be less than four lights or more than fifty lights. It will also be appreciated that the lights need not be positioned equally around the circumference of the bicycle wheel 112, 116. In one embodiment, each ring has eight lights, and each light may provide about 16 lumens of light. It will be appreciated that the ring may have less than or more than eight lights, and that each light may provide less than or more than 16 lumens.

The illumination ring 5200 also includes a controller 5216 coupled to a plurality of light controllers 5224 by wiring 5228. The illumination ring 5200 also includes one or more induction coils 5240 that are coupled to the controller 5216 by wiring 5228. In the embodiment shown in FIGS. 52A-52F, the ring 5200 includes six induction coils 5240. It will be appreciated that the ring 5200 may include fewer than or more than six induction coils 5240. The bicycle lighting system 100 also includes one or more magnets 5244.

In some embodiments, the coils 5240 are embedded into the ring 5200. The coils 5240 may have any number of turns, including, for example, any value or range of values between one turn and hundreds of turns. In some embodiments, the coils 5240 are offset radially from a circumference on which the lights 5204 are mounted. In other embodiments, the coils 5240 may be positioned on the same circumference as the lights 5204.

The controller 5216 is connected to the light controllers 5224. In one embodiment, the controller 5216 is a master switch, and the light controllers 5224 are switches that are individual to each light. In one embodiment, the controller 5216 controls the illumination pattern of the ring 5200 by sending pattern data to the light controllers 5224. The light controllers 5224 then switch the lights 5204 on and off in accordance with the pattern data. Wiring 5228 may connect the controller 5216 and controllers 5224. The wiring 5228 may also connect the coils 5240 to the controller 5216, which can modify and store the power generated by the coils 5240. In one embodiment, the controller 5216 includes a capacitor to store energy generated by the coils 5240. In other embodiments, a separate capacitor may be coupled to the controller 5216 to store the energy generated by the coils 5240. It will be appreciated that a battery may be provided to store the energy generated by the coils 5240.

The one or more magnets 5244 are attached to the bicycle fork or frame 108. In use, the magnets 5244 pass the coils 5240 while the wheel is spinning will cause spikes in voltage on the power line 5228 as each coil 5240 passes through the magnetic field of the magnet 5244. The spikes in voltage generated by the coils 5240 can be smoothed out via circuitry and either stored in a capacitor or utilized directly by the controller 5216 and/or light controllers 5224 (or a combination thereof). The bicycle lighting system 100 shown in FIGS. 52A-52F is able to generate power directly from the rider and store the generated power on the ring 5200. The bicycle lighting system 100 shown in FIGS. 52A-52F is advantageous because it does not require a battery (or the associated wiring to connect the battery to the ring).

It will be appreciated that the illumination ring may project light in any color. This can be accomplished by selecting a light source that projects light in a desired color. Exemplary colors include white, red, orange, yellow, green, blue, violet and purple. In some embodiments, all of the illumination rings may project light in the same color. In other embodiments, each of the illumination rings may project light in a different color. In still other embodiments, the illumination rings on the front wheel may project light in a different color than the illumination rings on the rear wheel. For example, the illumination rings on the front wheel may project white light, while the illumination rings on the rear wheel may project red light. In another example, more than one color light may be on the same wheel and/or ring (e.g., red and white alternating lights on the same ring).

It will also be appreciated that although the illumination ring has been depicted as a continuous ring in the Figures, the ring may be dis-continuous. It will also be appreciated that the ring may be manufactured as multiple components that are assembled together to form a ring. It will also be appreciated that although the ring has been depicted as having a generally circular shape, the ring may be other shapes, such as oval, crescent-shaped, wave-shaped, elliptical, circular segment (s), or other round shapes.

It will also be appreciated that the lights may be positioned on any support that allows for lights to project light both radially in front of or behind and to the side of the bicycle wheel, as described herein. It will be appreciated that the shape of the support need not be ring-shaped or round, and that the shape of the support may be any rectangular or polygonal shape.

The controllers described herein include a computer-readable medium on which is stored one or more sets of instructions (e.g., software) embodying any one or more of the methodologies or functions described herein. The software may also reside, completely or at least partially, within memory and/or within a processor within the controller during execution thereof by the controller, the memory and the processor also constituting computer-readable media. The software may further be transmitted or received over a network via a network interface device or over any other communication means.

The term "computer-readable medium" should be taken to include a single medium or multiple media that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It should be noted that the controller has been described herein as performing particular functions. It will be appreciated that the controller includes executable software code which is stored on a computer-readable medium for execution on the controller. The various functions can be performed by hardware and/or software stored on a computer-readable medium in any manner. It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. Those skilled in the art will appreciate that many different combinations of hardware, software, and firmware will be suitable for practicing the present invention. The controller may be any type of device or combination of devices which can carry out the disclosed functions in response to computer readable instructions recorded on media.

Although the invention has been described with reference to bicycle wheels, it will be appreciated that the lighting systems described herein may be used with other vehicles having wheels to provide improved lighting and/or sighting. For example, the lighting systems disclosed herein can be provided on wheelchair wheels, car/truck wheels, toy wheels, motorcycle wheels, and the like.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

I claim:

1. A hub for a bicycle wheel, the bicycle wheel including a plurality of light emitting elements that rotate with the bicycle wheel, the hub comprising:
    a controller mounted to the hub that controls each of the light emitting elements to operate between:
        a lit mode wherein the light emitting element projects light radially outward of the wheel when the light emitting element is within an arcuate area defined from a reference point, the arcuate area having an arc length of less than 360 degrees; and
        a dim mode when the light emitting element is outside the arcuate area; and
    an electrical connector that connects the controller to the light emitting elements.

2. The hub of claim 1, wherein the wheel has a central plane extending through the wheel circumference and a midpoint of the wheel width, wherein each light emitting element projects light in a vector substantially parallel to the central plane when in the lit mode.

3. The hub of claim 2, wherein each light emitting element projects light in a vector that intersects the central plane when in the lit mode.

4. The hub of claim 1, wherein the electrical connector comprises a power wire.

5. The hub of claim 4, wherein the power wire extends along a spoke of the wheel.

6. The hub of claim 4, wherein the controller is individually wired to each light emitting element.

7. The hub of claim 6, wherein the controller is individually wired to each light emitting element by a wire pair comprising the power wire and a ground wire.

8. The hub of claim 1, wherein the controller comprises an index sensor that indexes the reference point.

9. The hub of claim 8, wherein the index sensor comprises a contact switch.

10. The hub of claim 8, wherein the reference point is defined by an emitter statically coupled to a vehicle frame, wherein the hub rotatably couples to the vehicle frame.

11. The hub of claim 10, wherein the controller switches a light emitting element to the lit mode in response to the index sensor passing the emitter.

12. The hub of claim 11, wherein the controller applies a voltage across a light emitting element to place the light emitting element in the lit mode.

13. The hub of claim 12, wherein the controller electrically connects a power source with the light emitting element in the lit mode.

14. The hub of claim 11, wherein the controller switches off a light emitting element in the dim mode.

15. The hub of claim 14, wherein the controller disconnects the power source from the light emitting element in the dim mode.

16. The hub of claim 1, wherein the controller is mounted to an arcuate surface of the hub.

17. The hub of claim 16, wherein the controller is mounted within the hub.

18. The hub of claim 1, wherein the controller is integrated with a disk that is coaxially mounted an end of the hub.

19. A wheel comprising a hub and a plurality of light emitting elements, the wheel comprising:
    an emitter configured to statically mount to a vehicle frame, thereby defining a reference position;
    a controller mounted to the hub and electrically connected to the light emitting elements by a wire extending along a spoke of the wheel, the controller comprising an index sensor, the controller configured to switch each light emitting element between:
        a lit mode wherein the light emitting element projects light radially outward of the wheel when the light emitting element is within an arcuate area defined from a reference point, the arcuate area having an arc length of less than 360 degrees; and
        a dim mode when the light emitting element is outside the arcuate area;
    wherein the controller switches the light emitting element to the lit mode in response to the index sensor passing the emitter.

20. A hub for a wheel, the hub including a hub shell and an axle extending coaxially through an interior of the hub shell, the wheel including a plurality of lights mounted to rotate with the wheel, the hub comprising:
    a controller mounted to the hub shell interior that controls each of the light emitting elements to operate between:
        a lit mode, wherein the light emitting element projects light radially outward of the wheel when the light emitting element is within an arcuate area defined from a reference point, the arcuate area having an arc length of less than 360 degrees; and
        a dim mode when the light emitting element is outside the arcuate area;
    an emitter configured to statically mount to a vehicle frame in rotatable relation to the controller and define the reference position; and
    an electrical connector configured to transmit signals from the controller to the light emitting elements.

* * * * *